(12) United States Patent
Jain

(10) Patent No.: US 9,858,584 B2
(45) Date of Patent: Jan. 2, 2018

(54) ADVISING MANAGEMENT SYSTEM WITH SENSOR INPUT

(71) Applicant: YP LLC, Tucker, GA (US)

(72) Inventor: Mehul Jain, Foster City, CA (US)

(73) Assignee: YP LLC

(*) Notice: Subject to any disclaimer, the term of this patent is extended or adjusted under 35 U.S.C. 154(b) by 719 days.

(21) Appl. No.: 14/271,336

(22) Filed: May 6, 2014

(65) Prior Publication Data

US 2014/0337093 A1    Nov. 13, 2014

Related U.S. Application Data

(60) Provisional application No. 61/820,552, filed on May 7, 2013, provisional application No. 61/820,554, filed on May 7, 2013, provisional application No. 61/820,559, filed on May 7, 2013, provisional application No. 61/820,565, filed on May 7, 2013.

(51) Int. Cl.
| | |
|---|---|
| G06Q 10/00 | (2012.01) |
| G06Q 30/02 | (2012.01) |
| H04L 29/08 | (2006.01) |
| H04L 29/06 | (2006.01) |

(52) U.S. Cl.
CPC ......... *G06Q 30/0201* (2013.01); *H04L 67/16* (2013.01); *H04L 67/306* (2013.01); *H04L 67/38* (2013.01)

(58) Field of Classification Search
None
See application file for complete search history.

(56) References Cited

U.S. PATENT DOCUMENTS

| 270,108 | A | 1/1883 | Pennington |
| 7,023,979 | B1* | 4/2006 | Wu ............... H04M 3/5233 |
| | | | 379/265.11 |
| 8,332,517 | B2 | 12/2012 | Russell |
| 9,247,470 | B2 | 1/2016 | Jain et al. |

(Continued)

OTHER PUBLICATIONS

Schwartz, Karen D. Speech Analytics: Effective, but Underused, Jun. 8, 2010, http://www.crmsearch.com/callcenterspeechanalytics. php, p. 1-2.*

(Continued)

*Primary Examiner* — Beth V Boswell
*Assistant Examiner* — Joseph Waesco
(74) *Attorney, Agent, or Firm* — Alston & Bird LLP

(57) ABSTRACT

Systems and methods to facilitate advising management are provided. A communication connection between an advisor and an advisee may be facilitated. First data captured via an end-user communication device may correspond to one or more sensor inputs. A set of qualification rules that includes a set of criteria for qualifying advisees based at least in part on captured data relating to advisees may be accessed. A first set of information for the first advisee may be derived based at least in part on the first data and the set of qualification rules. The first set of information may include a first characterization of the first advisee. Indication, to a computing device of the advisor, of the first characterization of the first advisee may be caused at a time corresponding to the communication connection between the advisor and the first advisee.

17 Claims, 19 Drawing Sheets

(56) References Cited

U.S. PATENT DOCUMENTS

| | | | | |
|---|---|---|---|---|
| 2002/0091607 A1* | 7/2002 | Sloan | G06Q 30/02 | 705/36 R |
| 2002/0095363 A1* | 7/2002 | Sloan | G06Q 40/02 | 705/36 R |
| 2002/0194003 A1* | 12/2002 | Mozer | G06F 21/32 | 704/270.1 |
| 2005/0138216 A1* | 6/2005 | Giles | G06Q 40/06 | 710/1 |
| 2006/0074788 A1* | 4/2006 | Grizack | G06Q 40/00 | 705/35 |
| 2008/0062895 A1* | 3/2008 | Chapman | G06Q 10/10 | 370/270 |
| 2008/0147741 A1* | 6/2008 | Gonen | G06Q 10/06 | |
| 2008/0262901 A1* | 10/2008 | Banga | G06Q 10/06375 | 705/14.53 |
| 2009/0055242 A1* | 2/2009 | Rewari | G06Q 10/06 | 705/7.34 |
| 2010/0114748 A1* | 5/2010 | Duke | G06Q 40/02 | 705/35 |
| 2010/0191846 A1 | 7/2010 | Raleigh | | |
| 2010/0299277 A1* | 11/2010 | Emelo | G06Q 50/20 | 705/319 |
| 2011/0010173 A1* | 1/2011 | Scott | H04M 3/42221 | 704/235 |
| 2011/0066470 A1* | 3/2011 | Goyal | G06F 17/30899 | 705/7.14 |
| 2011/0106660 A1 | 5/2011 | Ajjarapu et al. | | |
| 2011/0302117 A1 | 12/2011 | Pinckney et al. | | |
| 2013/0016816 A1* | 1/2013 | Odinak | H04M 3/5175 | 379/88.01 |
| 2013/0016823 A1* | 1/2013 | Odinak | H04M 3/5175 | 379/265.02 |
| 2013/0124268 A1* | 5/2013 | Hatton | G06Q 50/01 | 705/7.38 |
| 2013/0246053 A1* | 9/2013 | Scott | H04M 3/42221 | 704/201 |
| 2014/0189802 A1 | 7/2014 | Montgomery | | |
| 2014/0207532 A1* | 7/2014 | Thapliyal | G06Q 10/06398 | 705/7.42 |
| 2014/0270108 A1* | 9/2014 | Riahi | G06N 99/005 | 379/88.01 |
| 2014/0270109 A1* | 9/2014 | Riahi | G06N 99/005 | 379/88.01 |
| 2014/0270146 A1* | 9/2014 | Riahi | G06N 99/005 | 379/265.13 |
| 2014/0337094 A1 | 11/2014 | Jain | | |
| 2014/0337527 A1 | 11/2014 | Jain | | |
| 2014/0343991 A1* | 11/2014 | Hofstee | G06Q 30/0601 | 705/7.18 |
| 2015/0006259 A1* | 1/2015 | Yoo | G06Q 10/06393 | 705/7.39 |
| 2015/0066593 A1* | 3/2015 | Huang | G06Q 30/0202 | 705/7.31 |
| 2015/0127628 A1* | 5/2015 | Rathod | H04W 4/206 | 707/710 |
| 2015/0189085 A1* | 7/2015 | Riahi | G06N 99/005 | 379/265.09 |
| 2015/0373196 A1* | 12/2015 | Scott | H04M 3/42221 | 704/235 |

OTHER PUBLICATIONS

United States Patent and Trademark Office, Notice of Allowance for U.S. Appl. No. 14/271,347, dated May 5, 2016, 18 pages, U.S.A.

United States Patent and Trademark Office, Office Action for U.S. Appl. No. 14/271,347, dated Feb. 25, 2016, 7 pages, U.S.A.

"Personal Information Management", Aug. 10-11, 2016, SIGIR 2006 Workshop, p. 1-121.

United States Patent and Trademark Office, Office Action for U.S. Appl. No. 14/271,339, dated Jan. 12, 2017, 10 pages, U.S.A.

United States Patent and Trademark Office, Office Action for U.S. Appl. No. 14/271,339, dated Mar. 6, 2017, 9 pages, U.S.A.

United States Patent and Trademark Office, Notice of Allowance for U.S. Appl. No. 14/271,339, dated Jun. 2, 2017, 9 pages, U.S.A.

* cited by examiner

ADVISING MANAGEMENT SYSTEM WITH SENSOR INPUT

CROSS-REFERENCES TO RELATED APPLICATIONS

The present application claims the benefit of the following U.S. Provisional patent applications: U.S. Provisional Patent Application No. 61/820,552, filed May 7, 2013, entitled "ADVISING MANAGEMENT SYSTEM;" U.S. Provisional Patent Application No. 61/820,554, filed May 7, 2013, entitled "GAMING ASSISTANCE SYSTEMS AND METHODS;" U.S. Provisional Patent Application No. 61/820,559, filed May 7, 2013, entitled "ACCREDITED ADVISOR MANAGEMENT SYSTEM;" and U.S. Provisional Patent Application No. 61/820,565, filed May 7, 2013, entitled "PLATFORM SHAPE SHIFTER;" the entire disclosure of each of which is hereby incorporated by reference for all purposes.

BACKGROUND OF THE DISCLOSURE

The present disclosure relates in general to advising, and, more specifically, but not by way of limitation, to advising management systems.

As value, use, access, and demand corresponding to information continue to increase, consumers demand more of the products and services they use than ever before. Companies are expected to compete to provide greater and greater levels of accuracy and more tailored service offerings. Accessing sources of information that have traditionally been unavailable is now expected. There is a need for advising services to provide enhanced access to information.

BRIEF SUMMARY

Certain embodiments of the present disclosure relate generally to systems and methods of facilitating advising, and more particularly to accredited advisor management systems.

In one aspect, an advising management system is provided. The advising management system may include any one or combination of the following. One or more network interfaces may be configured to provide access to a network. One or more processors may be coupled to the one or more network interfaces to enable communication with an advisor through the network. The one or more processors may execute instructions to perform any one or combination of the following. An indication of a selection of a user-selectable option may be processed. The indication of the selection may come via the network from an end-user communication device corresponding to a first advisee. The user-selectable option may relate to communicating with the advisor. Consequent to the indication of the selection, a communication connection between the advisor and the first advisee may be facilitated. Identification information enabling identification of the first advisee may be processed. First data captured via the end-user communication device and received via the network may be processed. The first data may correspond to one or more sensor inputs from the end-user communication device. A set of qualification rules that includes a set of criteria for qualifying advisees based at least in part on captured data relating to advisees may be accessed. A first set of information for the first advisee may be derived based at least in part on the first data and the set of qualification rules. The first set of information may include a first characterization of the first advisee. Indication, to a computing device of the advisor, of the first characterization of the first advisee may be caused at a time corresponding to the communication connection between the advisor and the first advisee. One or more of the first data, the first set of information, and/or the first characterization may be retained in association with the identification information enabling identification of the first advisee. One or more storage media may be coupled to the one or more processors to retain the instructions.

In another aspect, a method to facilitate advising management is provided. The method may include any one or combination of the following, and any one or combination of the following may be performed by a computer system. An indication of a selection of a user-selectable option may be processed. The indication of the selection may come via the network from an end-user communication device corresponding to a first advisee. The user-selectable option may relate to communicating with the advisor. Consequent to the indication of the selection, a communication connection between the advisor and the first advisee may be facilitated. Identification information enabling identification of the first advisee may be processed. First data captured via the end-user communication device and received via the network may be processed. The first data may correspond to one or more sensor inputs from the end-user communication device. A set of qualification rules that includes a set of criteria for qualifying advisees based at least in part on captured data relating to advisees may be accessed. A first set of information for the first advisee may be derived based at least in part on the first data and the set of qualification rules. The first set of information may include a first characterization of the first advisee. Indication, to a computing device of the advisor, of the first characterization of the first advisee may be caused at a time corresponding to the communication connection between the advisor and the first advisee. One or more of the first data, the first set of information, and/or the first characterization may be retained in association with the identification information enabling identification of the first advisee.

In yet another aspect, one or more non-transitory, machine-readable media having machine-readable instructions thereon for facilitating advising management are provided. The instructions, when executed by one or more computers or other processing devices, may cause the one or more computers or other processing devices to perform any one or combination of the following. An indication of a selection of a user-selectable option may be processed. The indication of the selection may come via the network from an end-user communication device corresponding to a first advisee. The user-selectable option may relate to communicating with the advisor. Consequent to the indication of the selection, a communication connection between the advisor and the first advisee may be facilitated. Identification information enabling identification of the first advisee may be processed. First data captured via the end-user communication device and received via the network may be processed. The first data may correspond to one or more sensor inputs from the end-user communication device. A set of qualification rules that includes a set of criteria for qualifying advisees based at least in part on captured data relating to advisees may be accessed. A first set of information for the first advisee may be derived based at least in part on the first data and the set of qualification rules. The first set of information may include a first characterization of the first advisee. Indication, to a computing device of the advisor, of the first characterization of the first advisee may be caused at a time corresponding to the communication connection between the advisor and the first advisee. One or more of the first data, the first set of information, and/or the first characterization may be retained in association with the identification information enabling identification of the first advisee.

In various embodiments, a recommendation for the advisor may be identified. The recommendation may be a function of at least the first characterization of the first advisee and a set of advisor information relating to the advisor. The set of advisor information may be retained for the advisor. Indication, to the computing device of the advisor, of the recommendation may be caused. In various embodiments, the causing indication, to the computing device of the advisor, of the recommendation may be during the communication session of the advisor and the first advisee. The recommendation may be presented during the communication session.

In various embodiments, a second set of information for the first advisee may be accessed. The first set of information for the advisee and the second set of information for the first advisee may be compared. One or more metrics of the first advisee may be determined, based at least in part on one or more of the first set of information for the advisee, the second set of information for the first advisee, and/or the comparing of the first set of information and the second set of information. In various embodiments, indication, to the computing device of the advisor, of the one or more metrics of the first advisee may be caused.

In various embodiments, the deriving the first set of information for the first advisee may include performing a voice analysis corresponding to the first advisee, and the first characterization may be based at least in part on the voice analysis.

In various embodiments, the deriving the first set of information for the first advisee may include performing an environmental analysis corresponding to the first advisee, and the first characterization may be based at least in part on the environmental analysis.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
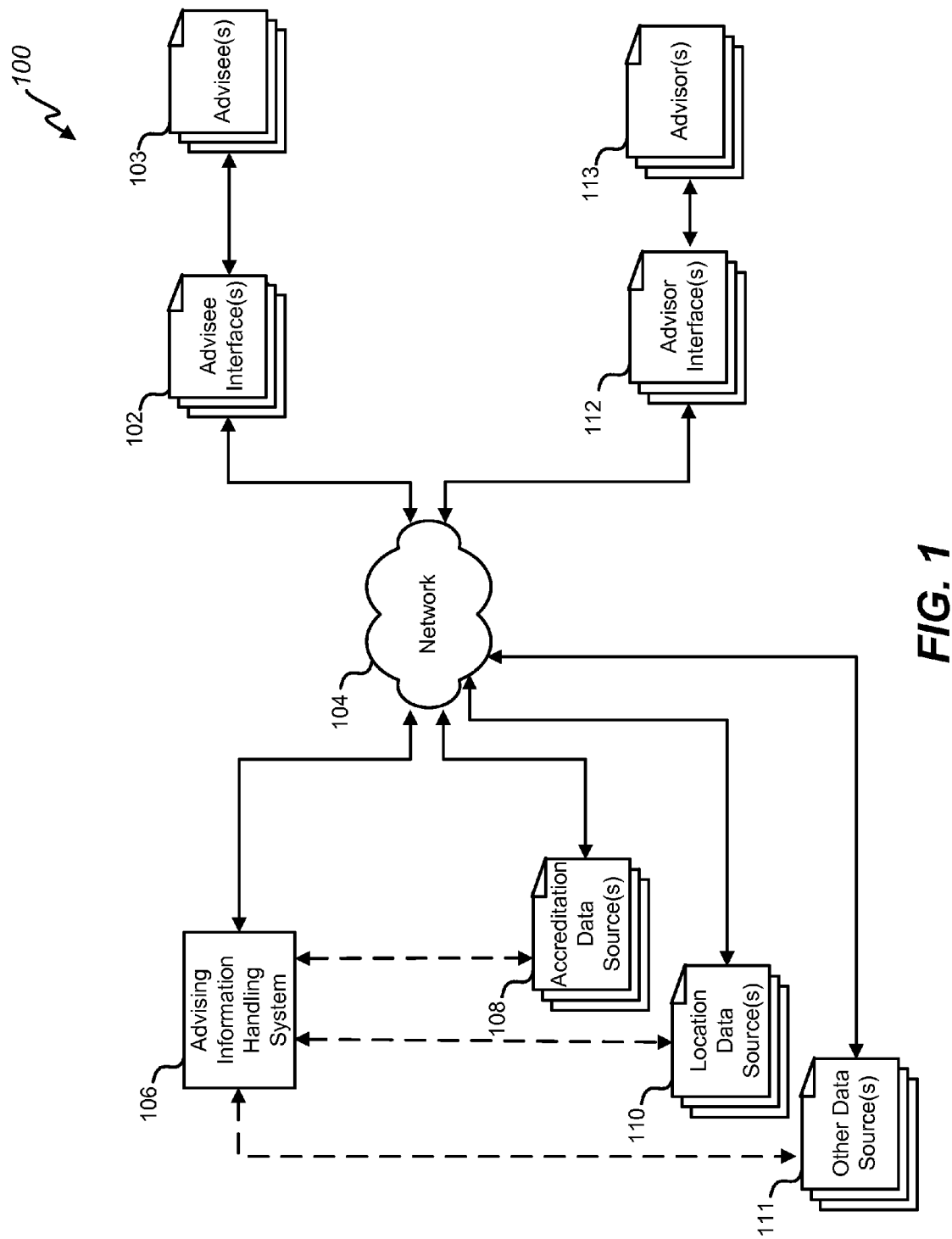
FIG. 1 depicts a high-level block diagram of a system, in accordance with certain embodiments of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In various embodiments, any suitable means of communication may be employed to enable an advisor and advisee to hold a dialogue in order to both identify the advisee's need and provide the best response to it. The advisor and/or advisee may use an image, a video, a live stream, etc. to facilitate communication. Certain embodiments provide for means to collect and retain informative content regarding an advisee. Certain embodiments may provide an advisor platform that may provide service-valuable information for viewing by an advisor. Certain embodiments may provide service-valuable information in real time. Certain embodiments may provide features that allow an advisor to manage a communication flow with an advisee and advisee context to facilitate identification of an advisee's need and provision of advice regarding the advisee's need.

Certain embodiments according to the present disclosure may provide for an advising platform that facilitates interaction between advisors and advisees. Certain embodiments may provide for a fundamentally new advising experience by anonymizing an advisor, yet facilitate any one or combination of: verifying his/her credentials; exposing credentials to an advisee; verifying insurance; providing insurance; and/or having connections with legal authorities to provide assurances, so that an advisee may avoid difficulties in seeking assistance from an advisor. As used herein, an advisee may include a user who is a current or past advisee, a potential advisee, such as one searching for an advisor, a consumer shopping on behalf of another advisee or potential advisee, and/or the like. Certain embodiments may allow for increased trust and confidence in an advising platform and particular advisors facilitated by the platform. Certain embodiments may allow for coordination of information with legal entities, licensing authorities, certification authorities, and/or the like.

An advisor may include an individual or set of multiple individuals who make themselves available to provide advice, assessments, opinions, and/or other information to others. Various embodiments according to the present disclosure may apply to any licensed and/or certified profession, practice area, and/or service area. Certain embodiments may apply to therapy providers. Therapy may include any actions directed to attempts to diagnose and/or heal. Therapy may include medical and/or biotherapy. Therapy may include counseling, such as marriage counseling and/or the like. In many instances, an individual may hold oneself out to the public as a licensed therapist.

A number of different professions, practices, and services involve licensing/certification requirements from an authority which may impart licenses/certifications for working in a particular jurisdiction. For example, a number of different therapy practices involve certifications to practice various therapy methods. Certification could be a prerequisite to becoming a licensed therapist in some cases. However, in certain instances, a license and/or certification may not be required. For instance, a life coach may not need a license to provide life coaching services to individuals in certain jurisdictions. With certain embodiments, advisors requiring credentials may be identified, and one or more accrediting organizations may be checked with respect to a certain advisor to confirm that the advisor possesses the required license(s) and/or certification(s) to practice the particular therapy services. In some embodiments, accrediting organizations may be checked with respect to a certain advisor to determine if and/or confirm that the advisor possess a non-required credential, certificate, degree, and/or license. The platform may present an indication of confirmation/verification to the advisee that the advisor is accredited.

Certain embodiments may provide for tracking of information regarding not only advisors, but also advisees. Tracked information could include information relating to equipment that an advisee uses and/or has used to interface with one or more advisors. For example, information about the specific devices, device configurations, and/or device capabilities that a given advisee uses could be tracked and retained in a repository. As another example, information about particular advisees, such as information relating to biographical data, health conditions, life conditions, problems, advice provided, any suitable facts associated with particular advisees, etc., could be tracked and retained in one or more repositories. Such tracked information for a particular advisee could be made available to an advisor before, during, and/or after an advising session for the advisee. An advising session could be any suitable interfacing between advisor and advisee, for example, via the advising platform. In some embodiments, such advisee-related information could be provided by the advisee, the advisor, and/or via automatic detection by the system. For each advisee, a dossier could be compiled and made available to an advisor to facilitate advising the advisee.

In various embodiments, the advising platform may track calls, messages, billing, etc., and enable advisors to interact with the platform to retrieve, see, and use the data. A feed of information and/or a dashboard could be in a web portal and/or provided via a mobile application. The advisor could customize the dashboard and/or the feeds and can, for example, identify portions of the dashboard and/or feeds that can be ignored. In some embodiments, for example, default templates may be supplied.

In some embodiments, an advisor and/or an advisee may use a computing device executing an application module (an "app") via which the computing device may communicate via the advising platform. An advisor and/or an advisee could download an app to his or her computing device that can function to facilitate advising sessions. With certain embodiments, a mobile app may be made available for execution on an advisor's/advisee's computing device, which could be a mobile computing device (such as a smartphone, tablet, and/or the like), to provide various features described herein. Various embodiments may include a specific purpose-based mobile app or a mobile app integrated with various other mobile application features.

Various embodiments may provide for advisee data collection and/or representation through different media. In some embodiments, certain of the advisee information could be provided automatically by the advisee's computing device to the advising information handling system. Certain embodiments may automatically detect an advisee's location and present that information to an advisor. Certain embodiments may automatically analyze inputs coming from individual media and capture related information, which could be retained in an advisee profile such that that profile could be retrievable for later sessions with the advisee. For example, the system and/or the advisor may capture information about an advisee's facial expressions, which may include micro-expressions, voice, speaking, body language, gestures, emotional indicia, writing, environmental context, and/or the like.

Certain embodiments may provide for facial expression analysis. Certain embodiments may provide for parsing techniques that identify and measure movements and/or various physical aspects of imagery provided via the advisee's computing device. For example, movements and/or various physical aspects of the advisee's face, eyes, and/or the like may be identified and measured. Physical aspects could be correlated to the geometrical shapes, recorded, and measured against reference information which can include, for example, previously captured information for the same subject and/or other reference information.

Captured image information may be analyzed to determine a state and/or a characteristic of an advisee. In some embodiments, the captured image information may include a portion of the advisee, such as the advisee's face, eyes, hands, chest, etc. By analyzing the captured image information, the advisor and/or the system may determine a state and/or a characteristic. In one example, captured information of the advisee's chest may be analyzed to determine that the advisee's breathing rate has slowed down beyond a threshold value or increased beyond a threshold value, indicating various states/responses of stress, agitation, emotion, anxiety, excitement, etc. In another example, captured information of the advisee's blood vessel(s)/veins may be analyzed to determine that the advisee's heart rate has sped up or slowed down, indicating various states/responses of stress, agitation, emotion, anxiety, excitement, etc. Some embodiments may also analyze captured information from the advisee's eyes (e.g., eyelids, pupils) to determine various indicia of states/responses.

Captured image information may be analyzed to determine whether there is a change in the advisor's states. In some embodiments, any one or combination of triggers may be detected (e.g., rapid change in eye movement and/or facial movement). Upon detecting the trigger(s), the advisor and/or the system may determine various characteristics.

Certain embodiments may provide for voice analysis. Certain embodiments may provide for a voice and/or language analysis engine that analyzes voice input provided by the advisee. Certain embodiments may provide for detecting and characterizing an advisee's voice. Spectral analysis techniques may be applied to indicate, for example, an advisee's emotional state. The platform could analyze the advisee's voice and present certain analysis results to the advisor. For example, such information may be presented to the advisor via an advisor dashboard. Any suitable voice analysis techniques may be employed. In some embodiments, various alternative and well-established analysis techniques may be presented as options to the advisor such the advisor may choose one or more of the techniques to be employed for a particular advisee. In some embodiments, an analysis for an advisee may be compared to data retained from one or more past advising sessions for the advisee. The detected voice data may be assigned a score and compared to reference information for the advisee and/or other reference information. The advisor may have the ability to annotate the advisee profile according to the advisor's judgment and such information may be retained and for subsequent reference and comparison.

Certain embodiments may provide for advisee environmental analysis. Certain embodiments may provide for detecting and characterizing an advisee's environment. In some embodiments, an environmental analysis for an advisee may be compared to data retained from one or more past advising sessions for the advisee. A normal environmental state may be identified for an advisee. Changes with the respect to the normal state may be identified and presented to the advisor, for example, via the dashboard. Environmental information may be detected through the media used. For example, background noise may be detected and measured and/or characterized during a phone call or video session. The background noise may be assigned a score and compared to reference information for the advisee and/or other reference information. Environmental information may be more specifically identified. For example, noise from a TV, other people, traffic, sirens, trains, pets, etc. may be more particularly identified. The advisor may have the ability to annotate the advisee profile according to the advisor's judgment and such information may be retained and for subsequent reference and comparison.

Certain embodiments may provide for advisee history analysis. Certain embodiments may provide for an advisee history engine that manages, collects, retrieves, updates, and/or retains information relevant to a particular advisee. Certain embodiments may automatically identify a caller, correlate the caller to an advisee profile, and provide advisee profile information to the advisor to enrich the advising session by making advisee profile information available to the advisor. Advisee profile information may provide the advisor with valuable context.

Certain embodiments may allow an advisor to record advisee information in a repository for later reference. Such provision of historical information particular to an advisee may allow the advisor to provide information appropriate for the advisee's specific needs. Certain embodiments may provide system features that automatically analyze and present historical information for an advisee, for example, via the advisor dashboard. The analysis of the information may include comparison of current information to past information for the advisee.

Certain embodiments may provide for advisee equipment configuration analysis. The particular information available to an advisor may depend on the capabilities and configuration of the media used. In some embodiments, the platform may retrieve and/or identify information about the capabilities of the advisee's computing device and/or communication medium, assess the capabilities against various analytical possibilities of a given advisor, and present capability information to the advisor. For example, a computing device with voice over IP capabilities may enable analysis of voice and speaking. For example, based on the advisee's configuration information, it may or may not be possible for certain aspects of the advisee's facial expressions, which may include micro-expressions, voice, speaking, body language, gestures, emotional indicia, writing, environmental context, etc. to be analyzed. For example, the resolution of the camera on the advisee's computing device may limit the extent to which certain image-based aspects may be analyzed. The effectiveness of an analysis of the advisee's iris may, for example, be enhanced when a minimum threshold of resolution is exceeded. The advisee's computing device may or may not have writing capabilities to allow for the advisee's writing to be readily analyzed. For example, the advisee's computing device may allow the advisee to write on the device screen with a finger, stylus, or other tool of the advisee.

Certain embodiments may provide for one- or two-way video communication between advisor and advisee. In some embodiments, a video chat session could be established between advisor and advisee. A video chat session may include a two-way, interactive live communication stream in which images from at least one camera on one computing device are sent for display to an opposite end of the communication path in order to be displayed. A video chat session can include video that is transmitted only in one direction but with live communication, such as audio voice or text messaging, capable of being sent in both directions.

In some embodiments, for higher cost, an advisee can request a video chat with an advisor in order to facilitate more effective advising sessions. An interface may be provided to the advisee so that the advisee can initiate a video chat session, for example, by selecting an interface element. The initiation of the chat session could correspond to a proposed chat session being indicated to the advisor. The advisor could be presented with a user-selectable option to accept the proposed chat session such that two-way chat can be established. A selectable option to decline a proposed video chat session could be presented to the advisor.

Similarly, an interface may be provided to the advisor so that the advisor can initiate a video chat session, for example, by selecting an interface element. The initiation of the chat session could correspond to a proposed chat session being indicated to the advisee. A selectable option to decline a proposed video chat session could also be presented to the advisee.

In some embodiments, a live stream video or a still image of an awaiting advisor or advisee could be presented to the advisee or advisor. The advisee or advisor could view the live stream video or still image prior to a two-way chat session or other two-way communication session being initiated. Accordingly, a real-time, interactive video chat can be provided to facilitate and enhance advising sessions. In some embodiments, the communication and/or initiation between advisor and advisee may involve sending an electronic mail message, text (SMS) messages, social media messages, text chat, voice chat, video chat, and/or the like as a message with the interface element to initiate the video chat session. Consequent to user selection, a message could be sent from the computing device through the network, which could include, for example, cellular telephone stations, web servers, etc., and relaying therebetween. A web server could open a new port of communication between a video conferencing server and the computing device so that live video of the advisor and advisee may be exchanged.

With the provision of video of the advisee to an advisor, the advisor can observe the advisee. During the consultation, an advisor may be able to determine any suitable characteristics of the advisee based at least in part on such observations. In some embodiments, a live video of the advisee may be shown on the display of the advisee's computing device so that the advisee can see what the advisor sees during the chat session.

In some embodiments, an advisor and/or the system may utilize face, biometric and/or similar recognition (e.g., using pattern classification techniques) to determine characteristics of the advisee. In some embodiments, an application may provide reference indicia, such as cross-hairs and/or a target aperture, so that the advisor may focus the video on various aspects of the subject imagery provided by the advisee, such as the advisee's face or other physical aspects. For example, the advisor may wish to closely examine any suitable physical feature of the advisee to facilitate the advising session. An advisor in the area of iridology, for instance, may wish to closely focus on the iris of the subject in order to analyze and/or explain aspects based on thereon.

In some embodiments, an advisor and/or the system may detect characteristics of an advisee's body via image capture of movements or sensing of movement with one or more sensors of the advisee's computing device. For example, an advisee's computing device may include an accelerometer, gyroscope, inertial measurement unit, or other such elements to detect motions of the device. Other such senses may include ultraviolet sources and sensors, acoustic or ultrasound sources and sound reflection sensors, any electromagnetic radiation sensor, or any other such device capable of detecting movement and/or positioning of an advisee and/or advisee computing device. In some embodiments, a remote detection of the device may comprise wireless communication with the device to receive accelerometer and gyroscope data that indicates movement of the phone. This movement may be associated with the display surface by an input or selection of the user or system, which sets a starting location and an orientation matched to a current content position, and then adjusts the current content position in response to movement and orientation changes identified by accelerometer and gyroscope measurements. Movement data may be analyzed in view of speed thresholds to determine/characterize jitter or shakiness. Accordingly, certain embodiments may provide an advisor with the ability to sense stress, nervousness, jitteriness, fidgetiness, etc.

Various embodiments will now be discussed in greater detail with reference to the accompanying figures, beginning with FIG. 1.

FIG. 1 depicts a high-level block diagram of a system 100, in accordance with certain embodiments of the present disclosure. The system 100 allows for interaction between two or more of advisee interface(s) 102, advisee(s) 103, advisor interface(s) 112, advisor(s) 113, an advising information handling system 106, accreditation data source(s) 108, and/or location data source(s) 110. As depicted, various elements of the system 100 may be communicatively coupled or couplable to a network 104.

The network 104 may be any suitable means to facilitate data transfer in the system 100 and could include multiple networks and/or network components. In various embodiments, the network 104 may be implemented with, without limitation, one or more of the Internet, a wide area network (WAN), a local area network (LAN), a wireless local area network (WLAN), a metropolitan area network (MAN), a cellular network, such as through 4G, 3G, GSM, etc., another wireless network, a gateway, a conventional telephone network, or any other appropriate architecture or system that facilitates the communication of signals, data, and/or message. The network 104 may transmit data using any suitable communication protocol. The network 104 and its various components may be implemented using hardware, software, and communications media such as wires, optical fibers, microwaves, radio waves, and other electromagnetic and/or optical carriers; and/or any combination of the foregoing. The advisee interface(s) 102, advisee(s) 103, advisor interface(s) 112, advisor(s) 113, an advising information handling system 106, and/or accreditation data source(s) 108 may be communicatively coupled or couplable to the network 104 via any suitable communication paths that support the communication protocol(s) used in the various embodiments.

The advising information handling system 106 (which may also be referenced herein as an advertising information handling system) may facilitate searching of one or more information repositories in response to information received over the network 104 from the advisee interfaces 102 and/or advisor interfaces 112. In various embodiments, the advising information handling system 106 may include any device or set of devices configured to process, send, receive, retrieve, detect, generate, compute, organize, categorize, qualify, store, display, present, handle, or use any form of information and/or data suitable for the embodiments described herein.

The advising information handling system 106 may include a single computing device or multiple computing devices, which, in some embodiments, may be implemented in or with a distributed computing and/or cloud computing environment. The advising information handling system 106 may include one or more processing resources communicatively coupled to one or more storage media, random access memory (RAM), read-only memory (ROM), and/or other types of memory. The advising information handling system 106 may include any one or combination of various input and output (I/O) devices, network ports, and display devices.

In certain embodiments, the advising information handling system 106 may be communicatively coupled or couplable to one or more accreditation data sources 108. The one or more accreditation data sources 108 may include any suitable source of data. In various embodiments, the one or more accreditation data sources 108 may include one or more of a database, a website, any repository of data in any suitable form, and/or a third party. In various embodiments, the accreditation data sources 108 may include any entity, organization, institution, and/or authority that provides for, administers, examines, oversees, issues, reviews, authorizes, regulates, investigates, recommends, and/or otherwise deals with licensing, certification, and/or permits related to any profession, business, position, practice, and/or service. The one or more accreditation data sources 108 may retain and/or have access to data relating to licensing, certification, and/or permits related to any profession, business, position, practice, and/or service, and may be one or more sources of such information. One or more accreditation data sources 108 may have web site/portals giving access to such information, for example, a portal that can be tapped to gather information.

An accreditation data source 108 may be linked to the advising information handling system 106 via the network 104 or directly so that information retained by the accreditation data source 108 may be accessed by/transferred to the advising information handling system. An accreditation data source 108 may include any suitable input/output module or other system/device operable to serve as an interface between the accreditation data source 108 and the network 104 and/or advising information handling system 106. The interface may facilitate communication over the network 104 using any suitable transmission protocol, standard, and/or encryption. In some embodiments, the advising information handling system 106 may include and/or provide the interface, for example, by making available one or more of a website, a web page, a web portal, a web application, a mobile application, enterprise software, and/or any suitable application software.

In certain embodiments, the advising information handling system 106 may be communicatively coupled or couplable to one or more location data sources 110. With some embodiments, the one or more location data sources 110 may include one or more mobile computing device locator services that provide information regarding the location of one or more advisee interfaces 102. With some embodiments, the location data sources 110 may provide various details relating to call data. With some embodiments, the location data sources 110 may provide caller name information from calling name delivery (CNAM), also known as caller identification or caller ID, which information may be used to determine particular details about the caller. With some embodiments, the location data sources 110 may provide information about the area from which a caller is located. With some embodiments, the accreditation data sources 108 may provide demographic data about an area.

In certain embodiments, the advising information handling system 106 may be communicatively coupled or couplable to one or more other data sources 111. The one or more data sources 111 may include any suitable source of data. In various embodiments, the one or more data sources 111 may include one or more of a database, a website, any repository of data in any suitable form, and/or a third party. In various embodiments, the one or more data sources 111 may facilitate at least in part a background check process of an advisor, such as for an advisor onboarding process described further herein. A background check process may include one or more of criminal record checks, identity validation, e.g., via social security numbers, sex offender background checks, insurance validation, and/or the like. A background check process could be performed at least in part by a third party, such a data source 111, in some embodiments.

In various embodiments, the data from one or more of the data sources 108, 110 may be retrieved and/or received by the advising information handling system 106 via the network 104, API calls, and/or through any other suitable means of transferring data. For example, in some embodiments, the advising information handling system 106 and the data sources 108, 110 could use any suitable means for direct communication. According to certain embodiments, data may be actively gathered and/or pulled from one or more data sources 108, 110, for example, by accessing a third party repository and/or by "crawling" various repositories. With some embodiments, certain of the data pulled and/or pushed from one or more of the data sources 108, 110 may be made available by the advising information handling system 106 for user(s) of the advisee interfaces 102 and/or advisor interfaces 112.

The advisee interfaces 102 and/or advisor interfaces 112 may allow for transfer of and/or access to information in accordance with certain embodiments disclosed herein. In various embodiments, the advisee interface(s) 102 and/or advisor interface(s) 112 may include any suitable input/output module or other system/device operable to serve as an interface between advisors 113, advisees 103, and/or the advising platform. The advisee interfaces 102 and/or advisor interfaces 112 may facilitate communication over the network 104 using any suitable transmission protocol and/or standard. In various embodiments, the advising information handling system 106 may include, provide, and/or be configured for operation with the advisee interfaces 102 and/or advisor interfaces 112, for example, by making available and/or communicating with one or more of a website, a web page, a web portal, a web application, a mobile application, enterprise software, and/or any suitable application software. In some embodiments, an advisee interface 102 and/or advisor interface 112 may include an application programming interface (API).

In some embodiments, an advisee interface 102 and/or an advisor interface 112 may include a web interface. In some embodiments, the advisee interface 102 and/or advisor interface 112 may include or work with an application made available to one or more interfaces, such as a mobile application. In some embodiments, the advisee interface 102 and/or advisor interface 112 may cause a web page to be displayed on a browser of an advisor 113. The web page(s) may display output and receive input from a user (e.g., by using Web-based forms, via hyperlinks, electronic buttons, etc.). A variety of techniques can be used to create the web pages and/or display/receive information, such as JavaScript, Java applications or applets, dynamic HTML and/or AJAX technologies. Accordingly, the advising information handling system 106 may have web site/portals giving access to such information, such as a service provider portal.

In various embodiments, an advisee interface 102 and/or an advisor interface 112 may include providing one or more display screens that may each include one or more user interface elements. A user interface may include any text, image, and/or device that can be displayed on a display screen for providing information to a user and/or for receiving user input. A user interface may include one or more widgets, text, text boxes, text fields, tables, grids, charts, hyperlinks, buttons, lists, combo boxes, checkboxes, radio buttons, and/or the like.

In certain embodiments, an advisee interface 102 and/or an advisor interface 112 may include a computing device of an advisee 103 and/or an advisor 113. In certain embodiments, an advisee interface 102 and/or an advisor interface 112 may include a mobile computing device that may be any portable device suitable for sending and receiving information over a network in accordance with embodiments described herein. In one non-limiting exemplary embodiment, the computing device may include one or more devices variously referenced as a desktop computer, mobile phone, a cellular telephone, a smartphone, a handheld mobile device, a tablet computer, a web pad, a personal digital assistant (PDA), a notebook computer, a handheld computer, a laptop computer, and/or the like. Some embodiments include a landline phone that may not be a computing device.

In some embodiments, the advising information handling system 106 may provide for the selection and provision of advertisements to one or more of advisee interfaces 102, and/or advisees 103. In certain embodiments, one or more advisors 113 may have advertisements that may be placed in a web page made available to one or more advisee interfaces 102. In certain embodiments, one or more advisors 113 may have advertisements that may be displayed with an application made available to one or more advisee interfaces 102, such as a mobile application. The placement of the advertisements may be in accordance with one or more paid placement arrangements and one or more advertising models.

In some embodiments, advisors 113 and advisees 103 may communicate via Voice Over Internet Protocol (VoIP) technology with their respective interfaces. An advisee 103 and an advisor 113 may, in some embodiments, be communicatively coupled through switches of the network 104, which may include switches of a public telephone network, switches of the advising information handling system 106, and/or the like. In some embodiments, one or more advisors 113 could be contacted by an advisee 103 and/or the advising information handling system 106 via various media channels, such as email, chat, instant message, etc., and an advisor 113 could respond via various media channels including, for example, the above listed various media channels. Communication between advisors 113 and advisees 103 may be established via telephonic connection, chat connection, game voice chat, private chat, video chat, videoconferencing, videophone calls, web conferencing, and/or the like.

Figure 2:
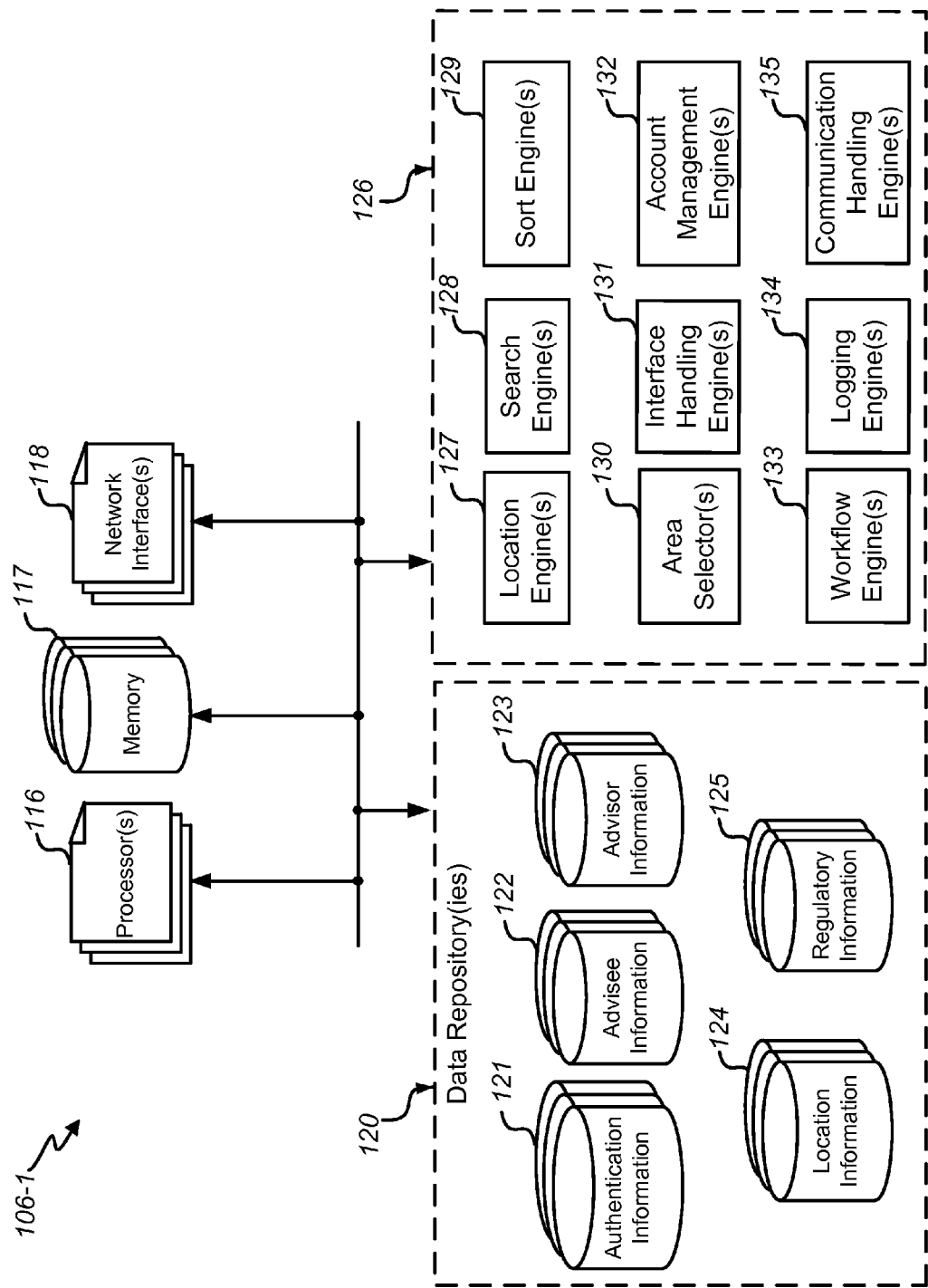
FIG. 2 shows a high-level block diagram of an advising information handling system, in accordance with certain embodiments of the present disclosure.

FIG. 2 shows a high-level block diagram of an advising information handling system 106-1, in accordance with certain embodiments of the present disclosure. The system 106-1 may correspond to the system 106 of FIG. 1, with one embodiment of the advising information handling system 106-1 being shown in more detail. While engines, repositories, and other components are described separately herein, it should be appreciated that the components may be combined and/or implemented differently in any combination to provide certain features in various embodiments. In various embodiments, different processes running on one or more shared computers may implement some of the components.

The advising information handling system 106-1 may include one or more servers. The one or more servers may include one or more network interfaces 118 communicatively coupled to processors 116. The network interface(s) 118 may include any suitable input/output module or other system/device operable to serve as an interface between one or more components of the service information handling system 106-1 and the network 104. The advising information handling system 106-1 may use the network interfaces 118 to communicate over the network 104 using any suitable transmission protocol and/or standard. In some embodiments, the one or more servers may include one or more web servers, one or more email gateways, one or more instant messaging gateways, one or more telephone gateways, one or more other gateways, such as television gateways, and/or one or more other types of servers, such as an application gateway to interface with different servers. Some embodiments may use one type of communication server, such as a web server, to receive search requests and another type of communication server to provide the search results. Some embodiments may use different types of communication servers to service different types of interfaces 102, 112.

Certain embodiments may provide a multi-channel communication regime to coordinate multiple communication channels used by consumers and service providers. Multiple communication pipes within a communication pipe could be implemented according to certain embodiments. Some embodiments may implement a greater number of communication channels. For example, one set of channels could be used for a consumer to request help, and one set of channels could be used for a service provider to respond to the consumer. The system can use web communication, text communication, voice communication, e-mail communication, push notification, and/or the like.

In some embodiments, a server may communicate with a computing device 102 via HyperText Transfer Protocol (HTTP) and/or other types of communication protocols, such as File Transfer Protocol (FTP), Wireless Application Protocol (WAP), etc. A web server may provide static web pages, dynamic web pages, and/or web services. In some embodiments, a web server may provide web applications to a computing device 102 for execution in a web browser running on the computing device 102, 112; and the web applications may include scripts for execution within an isolated environment in a browser. In some embodiments, the web server may provide rich-client applications to a computing device 102, 112; and the rich-client application may be programmed to have access to functions of the operating system running on a computing device 102, 112.

The advising information handling system 106-1 may include one or more data repositories 120. In various embodiments, the data repository(ies) 120 may be implemented in various ways. For example, one or more data processing systems may store information. One or more relational or object-oriented databases, or flat files on one or more computers or networked storage devices, may store information. In some embodiments, a centralized system stores information; alternatively, a distributed/cloud system, network-based system, such as being implemented with a peer-to-peer network, or Internet, may store information.

In some embodiments, the one or more data repositories 120 may include one or more authentication information repositories 121. The one or more authentication information repositories 121 may retain any authentication information suitable to facilitate security for embodiments of this disclosure. The authentication information repositories 121 may include database(s), database management system(s), server(s) to facilitate management/provision/transfer of authentication information, and/or the like. The repositories 121 may retain authentication information of one or more particular advisees 103, advisors 113, and/or other data sources 108, 110, 111. The authentication information may include information to check credentials of particular advisees 103, advisors 113, and/or other data sources 108, 110, 111 that may use one of their corresponding interfaces to seek access, transfer information, and/or make service-related transactions with advising information handling system 106. The authentication information may be used to provide security for transactions, restrict the access granted to a certain set of information and/or features, implement certain control and/or features for certain parties, and/or the like.

In some embodiments, the one or more data repositories 120 may include one or more advisee information repositories 122. The advisee information may be associated with the corresponding advisees 103. In some embodiments, an advisee 103 may create corresponding advisee information. In some embodiments, a computing device 102, 112 may store advisee information. In some embodiments, both the computing device 102, 112 and the online advisee data repository(ies) 122 may store the advisee information for a particular advisee 103. In some embodiments, when there is a data communication connection between the computing device 102, 112 and the online advisee data repository(ies) 122, the computing device 102, 112 and the online advisee data repository(ies) 122 may synchronize their copies of the advisee information for the advisee 103.

In some embodiments, the one or more data repositories 120 may include one or more advisor information repositories 123. The one or more advisor information repositories 123 may retain advisor information of particular advisors. The repositories 123 may retain any information related to advisors. For example, one or more advisor information repositories 123 may retain any information related to any one or combination of advisor identification information, advisor profiles, advisor certification information, advisor licensing information, advisor permit information, advisor pricing information, advisor authentication information, advisor statuses, advisor relationships, organization details, payment methods, accounting information, credit information, asset information, collateral information, address information, contact information, user account information, advertisements, announcements, and/or the like. The advisor information 123 may be associated with location information 124, which may have street addresses or other location parameters, such as longitude and latitude coordinates, stored as locations in one or more location information repositories 124. The location information 124 may be part of the advisor information 123, or associated therewith.

In some embodiments, the one or more data repositories 120 may include one or more regulatory information repositories 125. The regulatory information repositories 125 may retain any suitable information related to certification, licensing, and/or permit information. The information may include rules for professions, businesses, positions, practices, and/or services, associated with certification, licensing, and/or permit requirements and accreditation data sources 108, and associated with various jurisdictions.

One or more of engines 126 and/or other modules may be configured to perform any of the steps of methods described in the present disclosure. One or more engines 126 may be used to process a search request and present search results based on the information stored in one or more data repositories 120. The one or more data repositories 120 may include listings information about business entities or public end-user information, or other types of searchable end-user information. The one or more listings information repositories may retain any local listings information suitable for embodiments of this disclosure, such as business, product, and service information. In certain embodiments, the local listings information may correspond to directory information of the kind available via Yellow Pages services and the like.

In various embodiments, one or more of the engines 126 and/or other modules, such as a voice recognition system, may be stored in the one or more memories and may include one or more software applications, executable with the processors, for receiving and processing data requests. In some embodiments, one or more of the engines 126 and/or other modules, may be servers communicating with the communication server(s). The server communication may be over a network, such as a local area network, a wide area network, an intranet, Internet, and/or the like. Any one or combination of the various servers may run on common or separate computers. In some embodiments, there may be one or more layers of application servers between the communication server and the data repository(ies) 120 to process the business logic and data access of the rich client applications. Alternatively, application servers may be integrated with the communication servers, such as the web servers. Certain embodiments are not limited to a particular type of connections among the communication servers, one or more of the engines 126 and/or other modules.

In some embodiments, one computer system implements one or more of the components of the system 106. Alternatively, different processes running on one or more shared computers may implement some of the components. For example, one computing module, thread, or process may implement multiple of the components. In some embodiments, special purpose data processing systems implement the one or more of the components. In some embodiments, processes running according to software instructions on general purpose data processing systems, such as general purpose personal computers or server computers, can implement the components. Thus, the implementations are not limited to particular hardware, software, or particular combinations of hardware and software.

In some embodiments, the location engine(s) 127 may include one or more engines and may use GPS coordinates, cellular tower triangulation techniques, Wi-Fi-based location information, carrier-provided location information, and/or other location determination systems to identify a location of the computing device 102. In some embodiments, the location engine 127 determines a location of interest to the advisee 103 related to a search request or a phone call initiated with the computing device 102. The location of interest may be based on a location of the computing device 102. In some embodiments, the advisee 103 may explicitly specify the location of interest in a search request; and the location engine 127 extracts the location of interest from the search request. In some embodiments, a location of interest may be based on advisee information stored for a particular advisee 103 and associated with identification information of the advisee 103 or the computing device 102. In some embodiments, the advisee 103 may specify some or all of the advisee information.

In some embodiments, the location engine 127 may automatically identify the location of interest based on determining the current location of the computing device 102 that is used to submit a search request and/or initiate a phone call. For example, the location engine 127 may determine the location of the computing device 102 based on a connection point the computing device 102 used to access the network 104 (e.g., based on the location of a wireless network access point, a base station of a cellular communication system, or a connection point to a wired network). In some embodiments, the computing device 102 automatically determines its current position (e.g., via a satellite positioning system, or a cellular positioning system) and can transmit the determined or estimated position to the system 106 with the search request, or provides the position in response to a request from the location engine 127.

In some embodiments, the search engine 128 may retrieve information from the data repository(ies) 120 according to a search request. The search engine 128 may include logic for implementing searching of one or more information repositories. Other engines 126 may include and/or utilize the search engine 128 in various embodiments. The searching may be in response to information received over the network 104 from a user. Responsive to a query, the search engine 128 may search, retrieve, modify, and/or cause transfer of particular information from one or more information repositories.

A sort engine 129 may rank the information in accordance with embodiments discussed herein. In various embodiments, the area selector 130 may be configured to select areas of interest in accordance with various embodiments described herein. In some embodiments, the area selector 130 may select a first geographic area based on the location of interest identified by the location engine 127. The search engine 128 may then retrieve a first set of advisor information that have corresponding locations within the selected first geographic area and that satisfies the search criteria. In some embodiments, the search engine 128 may search for advisor information in a target area to obtain a set of search results; the area selector 130 may select geographic areas and may select groups of results that are within the selected geographic areas respectively.

In some embodiments, the interface handling engine(s) 131 may include logic to send, present, and receive information, with one or more of the interfaces to/from one or more advisees, advisors, and/or data sources. The interface handling engine(s) 131, with one or more the processors 116, may utilize one or more network interfaces 118 to transceive information through the network 104. The system 106 may pull and/or push information from those entities in any suitable way.

In some embodiments, the account management engine(s) 132 may include logic for implementing account features in various embodiments. By way of example without limitation, the account management engine(s) 132 may include logic for one or more aspects of: handling user registration; managing account creation, updates, authentication, handling; handling buyer deposit accounts; handling buyer credit accounts; and/or the like. The account management engine(s) 132 may be configured for acquiring, processing, formatting, and/or storing authentication information in the one or more authentication repositories 121.

In some embodiments, the service management workflow engine(s) 133 may include logic for implementing service management workflow features in various embodiments. By way of example without limitation, the service management workflow engine(s) 133 may include logic for one or more aspects of: creating, changing, and storing advisee and advisor profiles; presenting and handling advisor options; handling advisee requests; and/or the like. Some embodiments may include a notification engine (not shown).

In some embodiments, notification engine(s) may include logic for implementing notification features in various embodiments. By way of example without limitation, the notification engine(s) may include logic for one or more aspects of: generating and sending notifications to platform users; receiving responses from platform users; coordinating responses and extracting pertinent information therefrom; alerting consumers and advisors regarding events of interest; and/or the like. The notification engine(s) may be configured to check consumer and/or advisor notification profiles for handling notifications in accordance therewith. In some embodiments, the service management workflow engine(s) 133 may include the notification engine(s).

In some embodiments, the logging engine(s) 134 may include logic for implementing information logging features in various embodiments. By way of example without limitation, the logging engine(s) 134 could process data pulled and/or pushed from various entities. The logging engine(s)

134 could handle process, extracting, formatting, and/or storing data may in one or more of the aforementioned repositories.

In some embodiments, the call handling module(s) 136 may be configured to one or more of decode, route, and redirect calls from advisees to advisors. Aspects of the call handling module(s) 136 are further discussed herein.

Figure 3:
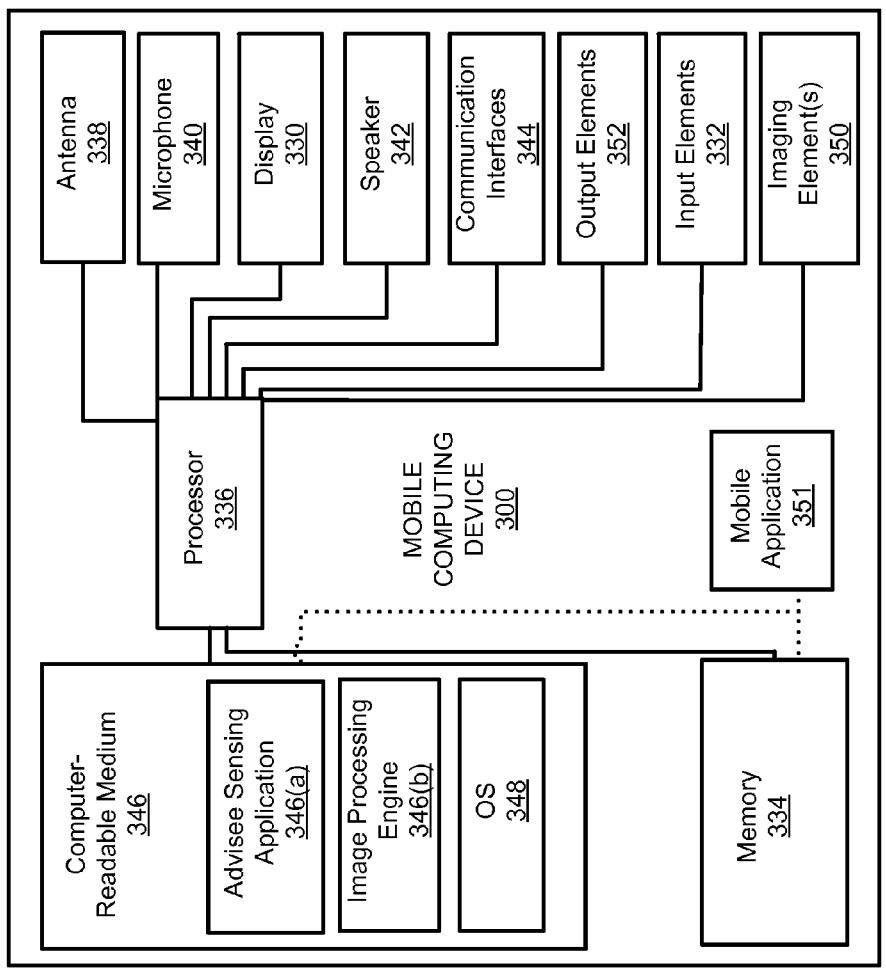
FIG. 3 depicts a functional block diagram of a computing device, in accordance with certain embodiments of the present disclosure.

FIG. 3 is a functional block diagram of a computing device 300, which may correspond to one or more of interfaces 102 and/or 112, according to certain embodiments of the present disclosure. In some embodiments, the computing device 300 may be mobile computing device. In some embodiments, the computing device 300 may be provided with a mobile application 351 configured to run on the computing device 300 to facilitate various embodiments of this disclosure. The computing device 300 may be any portable device suitable for sending and receiving information over a network in accordance with embodiments described herein. For example without limitation, in various embodiments, the computing device 300 may include one or more of a mobile phone, a cellular telephone, a smartphone, a handheld mobile device, a tablet computer, a web pad, a personal digital assistant (PDA), a notebook computer, a handheld computer, a laptop computer, a vehicle computer, or the like.

As shown in FIG. 3, the computing device 300 includes a display 330 and input elements 332 to allow a user to input information into the computing device 300. By way of example without limitation, the input elements 332 may include one or more of a keypad, a trackball, a touchscreen, a touchpad, a pointing device, a microphone, a voice recognition device, or any other appropriate mechanism for the user to provide input. The display 330 may include a resistive or capacitive screen. The display 330 may be configured for stylus sensitivity which allows movement of the stylus on the screen to be detected. The touch-screen capability may be achieved via an electronic position location system capable of determining a location of a selected region of the display screen. A commercially available electronic position location system like the ones that are used in many commercially available devices such as personal digital assistants, tablet PCs, and smartphones, may be used. An exemplary system may comprise a glass or plastic plate with a metallic coating facing a metallic coating on an underside of a layer of Mylar™ above the glass or plastic plate. Pressing the screen with the stylus brings the plate and the Mylar™ layer in contact with each other so that an electrical current flows through them. By measuring the electrical current from two sides of the display screen, a computer program then determines the vertical and horizontal position of the stylus. By sampling contact locations at a predetermined rate, such as, 100 times a second or faster, the display screen can detect the position of the stylus. In other examples, there can be a grid of wires under the display screen that can be activated after interaction with the stylus. The x-y position can be determined with a processor inside the apparatus.

The input elements 332 may include one or more of: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like. The input elements 332 may include a set of one or more of the following physiological sensors: bioimpedance, respiration, respiration rate variability, heart rate (average, minimum, maximum), heart rhythm, heart rate variability, respiratory sounds, blood pressure, activity, posture, and/or temperature/heat flux. The input elements 332 may include an activity sensor that may be one or more of the following: a ball switch, an accelerometer, a heart rate sensor, a bioimpedance noise sensor, a skin temperature/heat flux sensor, a blood pressure sensor, a muscle noise sensor, and/or a posture sensor. In some embodiments, heart rate or other physiological aspects may be detected in conjunction with the flash of the camera. For example, an advisee could place his finger over the flash so that heart rate may be detected.

The computing device 300 includes a memory 334 communicatively coupled to a processor 336 (e.g., a microprocessor) for processing the functions of the computing device 300. The computing device 300 may include at least one antenna 338 for wireless data transfer. The computing device 300 may also include a microphone 340 to allow a user to transmit voice communication through the computing device 300, and a speaker 342 to allow the user to hear voice communication, music, etc. In addition, the computing device 300 may include one or more interfaces in addition to the antenna 338, e.g., a wireless interface coupled to an antenna. The communications interfaces 344 can provide a near field communication interface (e.g., contactless interface, Bluetooth, optical interface, etc.) and/or wireless communications interfaces capable of communicating through a cellular network, such as GSM, or through Wi-Fi, such as with a wireless local area network (WLAN). Accordingly, the computing device 300 may be capable of transmitting and receiving information wirelessly through both short range, radio frequency (RF) and cellular and Wi-Fi connections.

Additionally, the computing device 300 can be capable of communicating with a Global Positioning System (GPS) in order to determine the location of the computing device 300. In the embodiment shown in FIG. 3, the antenna 338 may include a cellular antenna (e.g., for sending and receiving cellular voice and data communication, such as through a network such as a 3G or 4G network), and interfaces 344 may include one or more local communication interfaces. The antenna 338 may include GPS receiver functionality. In other embodiments contemplated herein, communication with the computing device 300 may be conducted with a single antenna configured for multiple purposes (e.g., cellular, transactions, GPS, etc.), or with further interfaces (e.g., three, four, or more separate interfaces).

The computing device 300 can also include at least one computer-readable medium 346 coupled to the processor 336, which stores application programs and other computer code instructions for operating the device, such as an operating system (OS) 348. The mobile application 351 may be stored in the memory 334 and/or computer-readable media 346. The computer-readable medium 346 can include a sensing application 346(a) to gather and/or process any suitable information regarding the advisee in accordance with various embodiments, including, for example, data gathered from sensors of the computing device 300. In certain embodiments, the sensing application 346(a) can automatically run each time that a user accesses the mobile application 351. In some embodiments, the sensing application 346(a) can run continuously (e.g., in the background) or at other times, such as when the mobile application 351 is initiated by a user. With some embodiments, the sensing application 346(a) is separate from the mobile application 351. In other embodiments, the mobile application 351 may include the sensing application 346(a). In some embodiments, the mobile application 351 and/or the sensing application 346(a) can include a customizable user interface (UI), which can be determined by the user's preferences through application-level programming.

In some embodiments, advertisements are presented to a user via the mobile application 351 such that the mobile application 351 is configured to gather tracking information about those advertisements. In some embodiments, calls are placed or at least initiated via the mobile application 351 such that the mobile application 351 is configured to gather tracking information about those calls. In some embodiments, the mobile application 351 receives, pulls, extracts, and/or listens to information from one or more applications of the computing device 300 to gather tracking information, where advertisements are presented via the one or more applications and/or calls are placed or at least initiated via the one or more applications. In some embodiments, tracking information may include call information gathered from a phone application of the computing device 300.

The call information could include information indicating a successfully connected call, a call duration, an indication that a call was not connected, information indicating a call was missed by the callee, an indication that a busy tone was received, an indication that a call was dropped, and/or the like. The call information could include a callee communication reference. For example without limitation, callee communication reference information could include one or more of a telephone number, IP address, etc. of the business/service provider/representative linked to the advertisement and/or the like.

In some embodiments, the application 351 may be configured to gather call information about call-backs from advertiser representatives. Having logged the callee communication reference, the mobile application 351 could identify an incoming call from the previously called representative. In various embodiments, in the same or similar manner with respect to tracking information for calls initiated by the user, any suitable tracking information about the call-back may be collected.

In some embodiments, any one or combination of features discussed with reference to the computing device of the advisee could likewise apply to the device of the advisor, which could have installed thereon an application 300 to facilitate the features.

In some embodiments, the computing device 300 configured with the mobile application computing device 300 may provide a softphone dedicated to the device that facilitates communications with advertiser representatives and the information handling system 106, as well as call tracking, via the data network 104. In some embodiments, the computing device 300 configured with the mobile application 351 may send provisioning information to the information handling system 106 that may indicate captured data, as discussed herein.

In some embodiments, to make a voice connection responsive to a click-to-call selection by the user of the computing device 300, one or more IP messages may be sent via one or more access points to one or more servers/switches of the information handling system 106. The one or more IP messages may indicate the communication reference information, the identification information, and/or another identifier (which could be an authentication token/key, in some embodiments) from which phone number information of the computing device 300 may be identified and/or determined. The one or more IP messages could indicate the phone number information for an advertiser representative corresponding to the advertisement selected. Alternatively, an identifier of the advertiser representative and/or advertisement could be indicated, and the information handling system 106 could determine the phone number information for the corresponding advertiser representative, e.g., based on information stored for the advertiser.

In some embodiments, one or more SIP requests may be sent via one or more access points to one or more servers/switches of the information handling system 106. By routing of the messaging to the information handling system 106, other telecommunication carriers could be excluded.

In some embodiments, the information handling system 106 can place separate VoIP calls over the IP network(s) 104 to the advertiser representative and the caller, and then bridge the calls. Accordingly, each of the advertiser representative and the caller receives an inbound call placed via the packet switched network 104, and the information handling system 106 joins the separate calls. In some embodiments, the two calls are merged responsive to the each of the caller and the advertiser representative accepting the call.

In some embodiments, to make a voice connection responsive to a click-to-call selection by the user of the computing device 300, the information handling system 106 can route a VoIP call established with the caller over the IP network(s) 104 to the advertiser representative. Accordingly, only the advertiser representative receives an inbound call. For example without limitation, a SIP request from the computing device 300 could be reconfigured and redirected based at least in part on the phone number of the advertiser representative. A SIP request could be configured so that response messaging is routed to the computing device 300 and/or the information handling system 106. In some embodiments, the call from the caller is connected to the advertiser representative responsive to the advertiser representative accepting the call.

In various embodiments, the information handling system 106 may interface with the caller and/or the advertiser representative using one or more suitable types of internet telephony systems, such as, for example, SIP-based internet telephony, H.323-based internet telephony, and/or the like. Accordingly, various embodiments of the information handling system 106 may support multiple, different types of internet telephony systems. In some embodiments, the information handling system 106 may include one or more servers and one or more controllers, which may be SIP servers and session border controllers, in order to interface with the IP network(s) 104, control messaging, and facilitate set-up, voice conversation, and tear-down of VoIP calls to or from the information handling system 106. The one or more controller could handle processing and routing of incoming requests from the computing device 300.

In various embodiments, the mobile application 351 and/or the information handling system 106 may track information about calls, which information may include any suitable about particular advertisements, as discussed herein. For example without limitation, the mobile application 351 and/or the information handling system 106 may be configured to track information relating to advertisements and calls to facilitate the gathering, processing, evaluating, and presenting of information for an advertiser interface, as discussed in the following. In some embodiments, certain features discussed with reference to computing device 300 could likewise apply to the communication device 112, which could have installed thereon an application 351 to facilitate the features.

The computer-readable medium 346 can also include an image-processing engine 346(b). The image-processing engine 346(b) can capture an image and compress the image in a format readable by a central processing server. The computing device 300 can additionally include one or more imaging elements 350, such as an integrated camera, capable of capturing images and/or video, and output elements 352. In certain embodiments, the computing device 300 may include a non-transitory computer-readable storage medium, e.g., memory 334, for storing images captured with the one or more imaging elements 350. In alternative embodiments, the computing device 300 receives image data from an image capture device that is not integrated with the computing device 300 and stores those images on the aforementioned non-transitory storage medium.

In some embodiments, image information is captured using at least one imaging element computing device. In some embodiments, the image information includes image information for at least a portion of a user of the computing device. The image information in some embodiments includes a brightness level of an area around the electronic device. In some embodiments, the image information may include video and/or still images. The one or more imaging elements 350 may include one or more IR sensors, cameras, iris detectors, heat sensors, ambient light sensor, or other image capturing technology for capturing the image information. In some embodiments, computing device 300 may use one or a combination of different imaging elements to capture the image information. Some embodiments may capture the image information continuously or periodically (e.g., every few seconds).

The display screen of some embodiments displays information to the viewer facing the display screen (e.g., on the same side of the computing device as the display screen). The computing device in this example can include one or more imaging elements, in this example including image capture elements on the front of the device and image capture elements on the back of the device. It should be understood, however, that image capture elements could also, or alternatively, be placed on the sides or corners of the device, and that there can be any appropriate number of capture elements of similar or different types. The imaging elements also can be of similar or different types.

In some embodiments, one or more IR detectors may be able to capture the infrared radiation that is reflected back from a surface, such as a viewer's retinas, in a direction that is substantially orthogonal and/or at other angles to the capture plane of the detector. In some embodiments, a computing device may utilize one or more IR emitters (e.g., IR light emitting diodes (LEDs), IR laser diodes, or other such components), to illuminate an advisee's face, with light, including the light that is then reflected light and captured by a IR sensor.

In some embodiments, the platform may provide a graphical user interface, and may display images that may include one or more selectable items included in the graphical user interface. An input device may be movable in free space and may be configured to point to the selectable items. In some examples, an input device such as a stylus, a pen, finger contact, etc. may be used to write or mark-up the image, by for example making notations, or sketching, or the like on the displayed image. In some embodiments, the platform may provide a graphical user interface with a whiteboard feature, allowing an advisor and/or advisee to write or draw on the whiteboard.

Figure 4:
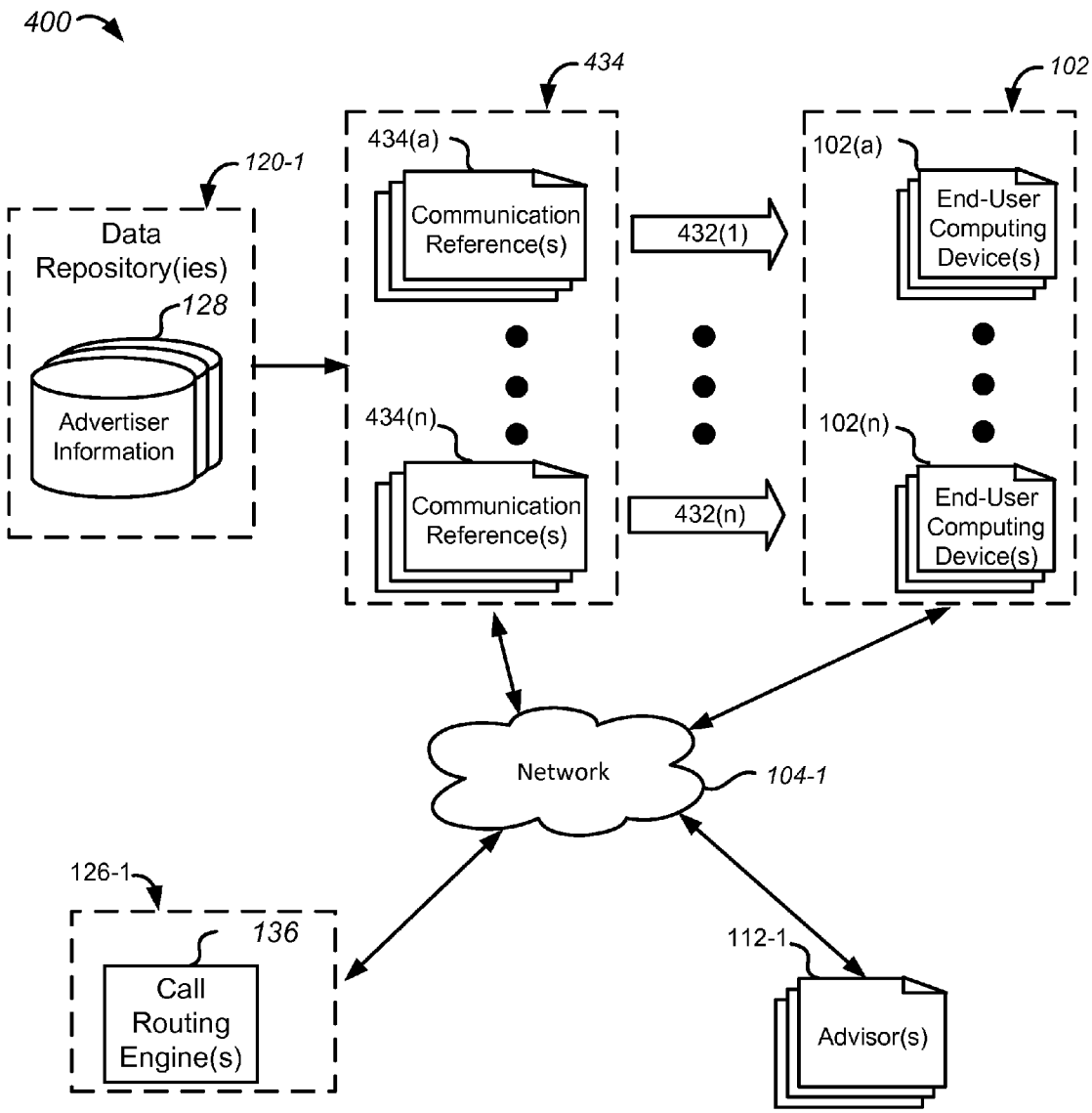
FIG. 4 shows a diagram of a system for call handling, in accordance with certain embodiments of the present disclosure.

FIG. 4 shows a diagram of a system 400 for call handling, in accordance with certain embodiments of the present disclosure. The system 400 may correspond to certain embodiments addressed with respect to other figures herein. The system 400 may include one or more data repositories 120-1. In some embodiments, the one or more data repositories 120-1 may include one or more advertiser information repositories 128. In some embodiments, the advertiser information repositories 128 may correspond to the advisor information repositories of FIG. 2. The advertiser information repository 128 may contain phone numbers of target phones. Typically, the target phones belong to advertisers, which may correspond to one or more of institutions, businesses, individuals, etc. that seek publicity through various media channels 432, such as web servers, WAP servers, short messaging services, etc., which may or may not use the network 104-1.

In some embodiments, communication references 434 may be provided to the end-user computing devices 102. The communication references 434 may allow routing of calls from end-user devices at least partially based on location in accordance with certain embodiments of this disclosure. In various embodiments, the communication references 434 may be delivered with content information (e.g., web page, WAP page, short message, television programs, news articles, etc.) to end-user computing devices 102. In some embodiments, a communication reference 434 may be a phone number. The phone number may correspond to a set of advertisers. The phone number could indicate a category of advertisers. In some embodiments, a communication reference 434 may facilitate a click-to-call feature. In some embodiments, communication reference 434 may be an encoded target phone number. Encoded target phone numbers may allow the association of additional information with the target phone numbers, such as the media channels used, special promotions, etc.

In embodiments where an end-user computing device 102 is a mobile device, content information, including advertisements, may be transferred to the device through wireless communication connections, such as cellular communication links, wireless access points for wireless local area network, etc. In some embodiments, an end-user computing device 102 can receive content information from multiple types of media channels 432 (e.g., a web server, a WAP server, a SMSC, etc.). In some embodiments, an end-user computing device 102 may be able to initiate a phone call (e.g., automatically dialing according to the encoded phone number embedded in the content information when a user selects the number). Alternatively, a user may dial a phone call using another phone, separate from the end-user computing device 102.

In some embodiments, dialing at least a portion of a phone number corresponding to a communication reference 434 may connect the phone call to a call handling module 126-1. The call handling module 126-1 may include one or more call routing engines 136-1. The call routing engine 136-1 may include one or both of a router and a decoder. In some embodiments, based at least partially on the communication reference selected, such as a phone number dialed and/or a call button selected, the call routing engine 136-1 may determine one or more corresponding target communication references using the advertiser information repository 128 and may connect the phone call to one or more target advisors 112-1 through the network 104-1.

The network 104-1 may correspond to the network 104 in some embodiments. In some embodiments, the network 104-1 can be and/or can include a telephone network. In some embodiments, a telephone network 104-1 may overlap at least a portion of the network 104. The telephone network 104-1 may be circuit switched, package switched, or partially circuit switched and partially package switched. For example, the telephone network may partially use the Internet to carry the phone call (e.g., through VoIP). For example, a connection between an end-user device 102 and the call routing engine 136-1 may be carried using VoIP; and the connection between a router and a decoder of the call routing engine 136-1 may be carried using a land-line based, circuit-switched telephone network.

Figure 5:
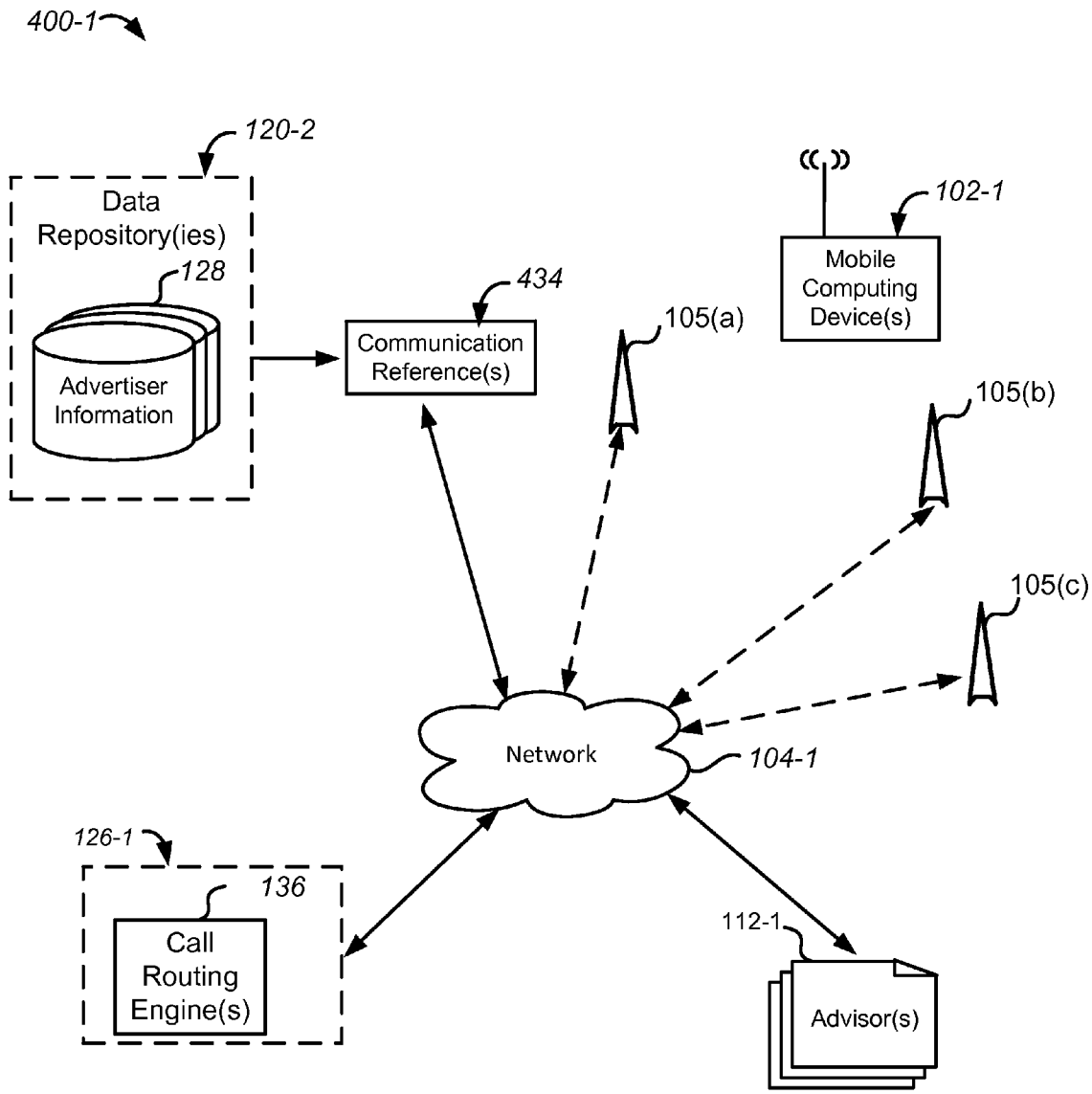
FIG. 5 shows a diagram of a system for call handling, in accordance with certain embodiments of the present disclosure.

FIG. 5 shows a diagram of a system 400-1 for call handling, in accordance with certain embodiments of the present disclosure. The system 400-1 may correspond to the system 400 for certain embodiments where the end-user computing devices 102 are mobile computing devices 102-1. The mobile computing device(s) 102-1 may access the network 104-1 through a wireless link to an access point. For example, the mobile computing device(s) 102-1 may access the network 104-1 through one or more of access point 105(a), access point 105(b), access point 105(c), and/or any other suitable access point(s). The access points 105 may be of any suitable type or types. For example, an access point 105 may be a cellular base station, an access point for wireless local area network (e.g., a WiFi access point), an access point for wireless personal area network (e.g., a Bluetooth access point), etc. The access point 105 may connect the mobile computing device 102 to the network 104-1, which may include the Internet, an intranet, a local area network, a public switched telephone network (PSTN), private communication networks, etc. In some embodiments, access point(s) may be used in obtaining location information for the mobile computing device 102, as described further herein.

Figure 6:
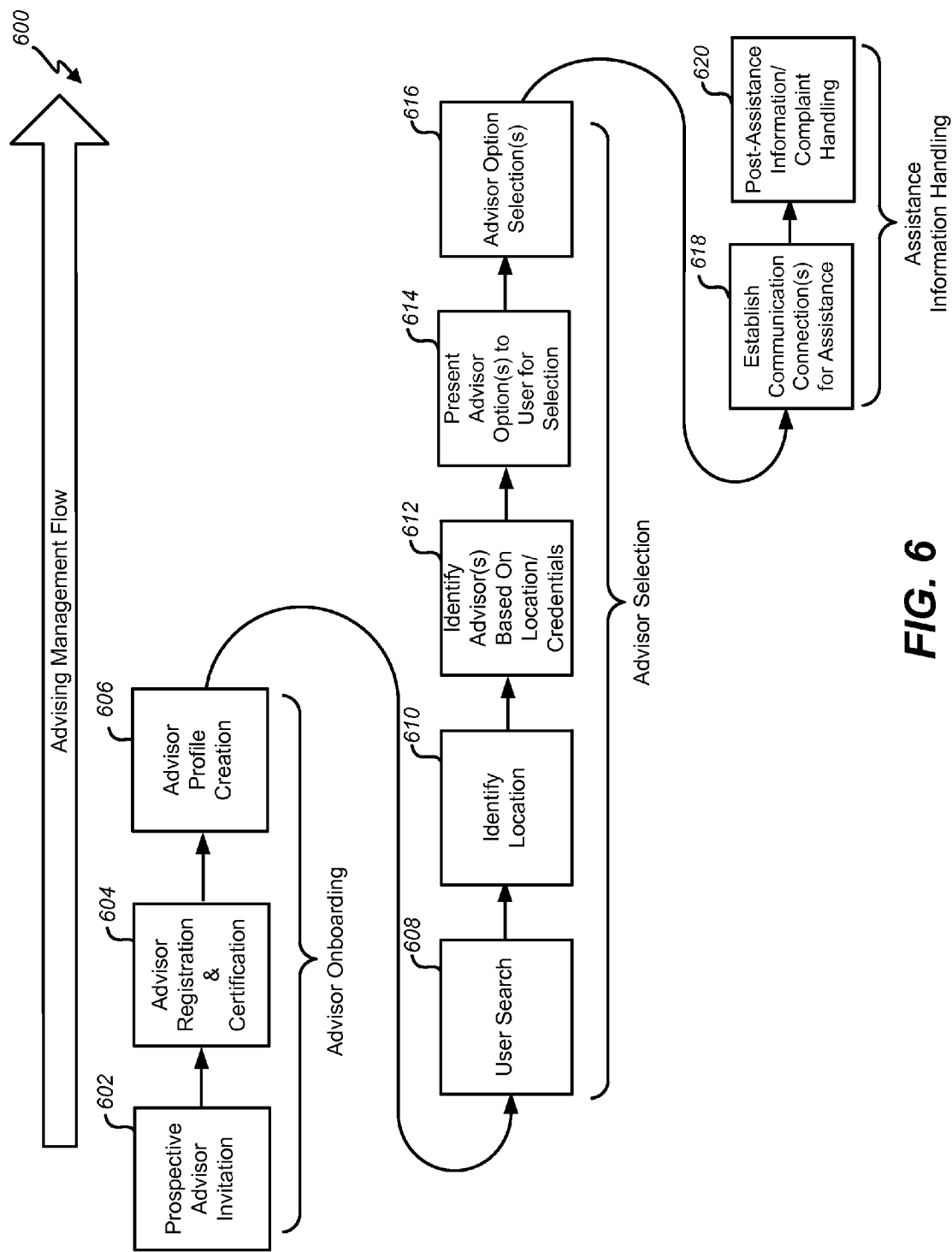
FIG. 6 is a block diagram that illustrates certain aspects of an advising management lifecycle, in accordance with certain embodiments of the present disclosure.

FIG. 6 is a block diagram 600 that illustrates certain aspects of an advising management lifecycle, in accordance with certain embodiments of the present disclosure. Diagram 600 may represent an overview of certain aspects of such a lifecycle, including overall flows involved. Teachings of the present disclosure may be implemented in a variety of configurations. As such, the order of the aspects comprising the lifecycle may be shuffled in any suitable manner and may depend on the implementation chosen. Moreover, while the following aspects may be separated for the sake of description, it should be understood that certain steps may be performed simultaneously or substantially simultaneously.

One aspect of the life cycle may correspond to a set of interactions with a prospective advisor in an onboarding phase. A prospective advisor may include an advisor that has not yet been approved for participating in an advisor program according to certain embodiments. A prospective advisor may include an advisor that has yet to pass a certification process in order to participate in the program. The advisor interface provided by the platform may facilitate the onboarding phase. In various embodiments, an advisor interface may include providing one or more display screens that may each include one or more user interface elements. An advisor interface may include any text, image, and/or device that can be displayed on a display screen for providing information to a user and/or for receiving user input. An advisor interface may include one or more widgets, text, text boxes, text fields, tables, grids, charts, maps, hyperlinks, buttons, lists, combo boxes, checkboxes, radio buttons, and/or the like.

In some embodiments, the onboarding phase of the life cycle may include a prospective advisor invitation stage, as indicated by block 602. In some embodiments, the onboarding phase of the life cycle may include an advisor registration and certification stage, as indicated by block 604. In some embodiments, one or more automated process flows may facilitate the provisioning of prospective advisors with accounts and registration. Advisor accounts may be created in various ways in various embodiments. For example, account creation may be initiated by the system. The system could initiate onboarding by automatically identifying the advisor and presenting a prospective advisor a communication reference, such as a link, inviting the prospective advisor to register and create an account.

Certain embodiments may provide for a certification process that is automatically triggered by registration. Certification may include one or more of background checks, criminal record checks, validating identities, e.g., via social security numbers, sex offender background check, validating insurance, validating certifications/licenses, and/or the like. A certification process could be performed at least in part by a third party, in some embodiments. Once the certification process has been triggered by registration, the system 106 may automatically generate one or more messages, seeking one or more of various certification checks from the one or more data sources 108, 111. In some embodiments, one or more page flows may be provided for conveying results of the certification checks to the system 106. In some embodiments, the system 106 may be configured to extract pertinent information from a data source repository and/or message sent to the system 106. According to certain embodiments, data may be actively gathered and/or pulled from one or more data sources 108, 110, for example, by accessing a third party repository and/or by "crawling"various repositories. With some embodiments, certain of the data pulled and/or pushed from one or more of the data sources 108, 110 may be made available by the advising information handling system 106 for user(s) of the advisee interfaces 102 and/or advisor interfaces 112.

Once a prospective advisor has passed the certification process, the certified advisor may be able to participate in the program. The certified advisor may be indicated in the system 106 as being certified. For example, a business relationship attribute may be defined, stored in the system 106, and associated with the advisor may be updated accordingly. In some cases, manual intervention may be required for final review and approval before participation is allowed. For instance, a notification could be automatically generated and sent to an administrator responsive to the business relationship being updated to certified status.

The onboarding phase of the life cycle may include an advisor profile stage, as indicated by block 606. The advisor profile stage may include a process of ensuring that an advisor fills out a provider profile completely. An advisor profile may include information regarding an advisor's certifications, permits, licenses, experience, hours of availability, specialties, proficiencies, types of payments that are receivable, contact information, notification preferences, device configurations/capabilities, billing information, certification information, information on locations, and/or the like. An advisor profile may include persistent information that is maintained about an advisor. An advisor profile may include any data stored in an advisor information repository whether or not it is part of the profile as shown to an advisor via an advisor portal. With the advisor profile, an advisor may be able to indicate specific services for which the advisor is to provide service. The advisor could also indicate, implicitly or explicitly, specific services which the advisor does not provide.

In some embodiments, the advisor profile may include a notification profile. The notification profile may specify parameters for notifying the advisor, and could also specify parameters for advisor responses to notifications from the system, such as a notification regarding an incomplete profile or issues with certification, insurance, and/or the like. In some embodiments, the platform may send a notification to an advisor, which notification, for example, could be provided via an advisor dashboard provided via the platform. However, any suitable means of notification may be employed. For example, text, voice, e-mail, alerts with the application, and/or the like could be sent. The notification could include a link or other communication reference referring back to the platform, prompting the advisor to respond. For example, the notification could provide a link for users to log into the platform to respond. In some embodiments, the advisor may respond via the same medium in which the notification was sent (e.g., text, voice, e-mail, etc.), and the system 106 may process the response, extracting requested information.

In some embodiments, certain price constraints may be specified for certain advisors. The price constraints may be specified for certain services. A constraint could be imposed on advisors to maintain certain prices for certain services. Advantageously, in some embodiments, such price constraints can, in some embodiments, be configured so that if an advising need arises, an available advisor would accept the advertising task at the constrained price. In some embodiments, consequent to consumer selection of an advisor, a transaction may be processed automatically on behalf of an advisor according to an advisor profile wherein an advisor commits to certain prices for certain services when the advisor is available to provide service. The price constraints could be specified in the advisor profile. Charges could differ depending on the advisee. For example, an advisor may charge differently if advising a room full of people, say, via a conference call, as contrasted with advising an individual via an individually dedicated call. Additionally, certain rates, fees, and cuts between the advisor and the business employing the platform may be specified.

One aspect of the life cycle may correspond to an advisor selection phase. The platform may identify a set of available advisors corresponding to the user's need. In some embodiments, the platform may present a set of available advisors corresponding to the user's need to may allow the user to select an advisor. The advisor selection phase of the life cycle may include a stage directed to consumer searching, as indicated by block 608. A user interface may be presented to the consumer to facilitate searching. With the consumer interface, the consumer may input search criteria corresponding to an advising need. The search criteria may indicate a desired service and a location for the requested rendering of service.

In various embodiments, a consumer interface may include providing one or more display screens that may each include one or more user interface elements. A consumer interface may include any text, image, and/or device that can be displayed on a display screen for providing information to a user and/or for receiving user input. A consumer interface may include one or more widgets, text, text boxes, text fields, tables, grids, charts, maps, hyperlinks, buttons, lists, combo boxes, checkboxes, radio buttons, and/or the like.

The advisor selection phase of the life cycle may include a stage directed to location identification, as indicated by block 610. In some embodiments, the consumer may input search criteria corresponding to a location of the advising need. The consumer could search based on service type, keyword, and/or select predetermined search options to indicate search criteria. The consumer interface could include a location selection option. In embodiments where the user's current location is automatically identified, that current location could be presented to the user as default location such that the user need not specify a location if the user's current location corresponds to the location for desired service. In various embodiments, the location could have any suitable level of specificity, e.g., including a county, a municipality, a zip code, a street, or an address. In the case that another location is desired, the page flow may present any suitable options so that the user may indicate the location, e.g., textually by way of a text entry field and/or graphically by way of selection with a map rendered on the user's computing device.

In some embodiments, the location may be automatically determined, for example, by way of the user's computing device. For example, a user may be interested in requesting a locksmith to come to a particular location and provide locksmith services, and the user's current location may be gathered via the user's computing device. Having automatically identified the user's current location, the user's current location could be presented to the user as a default location such that the user need not specify a location in the future. In the case that another location is desired, the user may indicate the location in any suitable manner, e.g., textually by way of a text entry field and/or graphically by way of selection with a map rendered on the user's computing device.

In some embodiments, user-selectable options for further specifying the advising need may be triggered by the initial search and presented to the consumer. In some embodiments where a date and/or time selection option has not already been presented, the option may be presented along with the set of advisors corresponding to the search criteria. In some embodiments, a set of pre-determined options to facilitate diagnosing a problem or otherwise characterizing/categorizing a need may be identified by the system based on the initial search. The options may be based on a decision tree, whereby characterizing/categorizing options may flow from more general classifications to more specific subclassifications to any suitable degree of specificity. In some embodiments, the consumer interface could include a description field for the user to enter a description of the advising need. For example, a text entry field could allow the user to textually describe the need and provide any information the user desires to enter and/or is prompted to enter by the user interface.

The advisor selection phase of the life cycle may include an advisor identification stage, as indicated by block 612. One or more advisors may be identified as having expertise with respect to the need and as having the appropriate accreditation/credentials for the need and the location of the user. One or more of advisor information, regulatory information, insurance information, location information, and/or advisor profiles may be searched for indications of corresponding accreditation/credentials. A set of rules may be used for matching a user/caller and with one or more counselors, based at least in part on things for which particular advisors are qualified and licensed. In some embodiments, a user/caller profile may indicate the pertinent jurisdiction. In some embodiments, the jurisdiction pertinent to the user/caller may be based on the location from which the call is originated (e.g., if a profile is not already set up for the caller).

The advisor selection phase of the life cycle may include an advisor option presentation stage, as indicated by block 614. The platform may present a set of available advisors corresponding to the user's advising need from which the advisee may select an advisor. Any suitable advisor listing information could be made available to the user for informative selection, including expertise identification and ratings, customer ratings, relevancy scores, credential information, links to third party provided credential information, links to corresponding advisor profiles, reviews, videos, etc. Insurance coverage could be presented to an advisee as added information for consideration. Exposing insurance information and additional details while keeping advisors anonymous may provide value to the advisee and the advisor. Other details, such as how many years an advisor has been available on the platform, how many years an advisor has been in practice, etc., may be provided.

The set of available advisors could be ranked according to one or more such bases and presented in a ranked order. Various sorting options may be presented to the user for sorting the list of advisors so that the list could be sorted according to any suitable basis. The advisor selection phase of the life cycle may include an advisor option selection stage, as indicated by block 616. A user may select a particular advisor by selecting one or more user-selectable options which may be presented in any suitable way.

One aspect of the life cycle may correspond to a set of interactions with a selected advisor in an assistance information handling phase. The assistance information handling phase of the life cycle may include a communication connection establishing stage, as indicated by block 618. As discussed herein, communication between an advisee and an advisor may be established via telephonic connection, chat connection, game voice chat, private chat, video chat, videoconferencing, videophone calls, web conferencing, and/or the like so that the advisee may indicate an advising need and so that the advisor may assist. In various embodiments, any suitable means of communication may be employed to enable an advisor and advisee to hold a dialogue in order to both identify the advisee's need and provide the best response to it. The advisor and/or advisee may obtain an image, a video, a live stream, etc. to facilitate communication. This may include provision of a communication reference for establishing communication with an advisor and/or initiates a flow that leads to a communication session with an advisor. In some embodiments, a communication reference may include a link that, when selected, launches a browser (or browser window) and retrieves content available on the web. In some embodiments, a communication reference may include link to establish communication via telephonic connection, chat connection, game voice chat, private chat, video chat, videoconferencing, videophone calls, web conferencing, and/or the like. The communication references may allow routing of communications between end-user devices. In various embodiments, a communication reference may include a text number, a click-to-text option, a phone number, a click-to-call option, an email address, a click-to-email option, and/or the like. In some embodiments, a service may include a feature that allows an advisor to view at least a portion of the screen display that an advisee is viewing.

The assistance information handling phase of the life cycle may include a stage directed to post-assistance information handling for a selected advisor and an advisee, as indicated by block 620. In some embodiments, a time tracking indicator could indicate time associated with a service provided to the advisee. A financial engine associated with the advisee's account and/or the assistance advisor's account can track the advisee's selections, session durations, and/or the like for one or more sessions. Purchases can be charged to the advisee's account, and compensation can be credited to the advisor's account. The financial engine may be configured to perform some or all the functionality associated with financial transactions with services provided.

After the advising session has been completed, in some embodiments, the advisor may confirm the service completion via the advisor interface either on the advisor's initiative and/or responsive to a follow-up message sent by the platform. In some embodiments, the platform may automatically send a follow-up message to the advisor, requesting confirmation of whether a service was completed. In some embodiments, the platform may automatically determine that an advising session has been completed based on whether a duration of the communications has met a particular time threshold.

In some embodiments, an indication of advising session completion may trigger a notification to the advisee. The platform may automatically send a notification prompting the advisee to provide a review of the advisor. The advisee may follow an included communication reference to the platform and provide the review, or, in some embodiments, the advisee may provide the review by replying to the message via the same means. A submission of a review may automatically trigger the allotting of a reward to the advisee.

The post-assistance information handling may include complaint handling. In some embodiments, a complaint channel could be provided via the platform. The complaint channel could be a separate communication channel to capture complaint data and could be different from the communication channel for reviews. The system could include a complaint handling engine to process complaint information, handle complaint processing, process associated workflow, and handling sending/receiving of complaint-related notifications. A user-selectable complaint option could be presented to the advisee. The user-selectable complaint option could be distinct from an ordinary customer review option. The user-selectable complaint option could be, in some embodiments, presented along with the ordinary customer review option. The user-selectable complaint option could be presented after a negative customer review has been received in some embodiments.

In some embodiments, indication(s) of a problem could be conveyed to the appropriate licensing authority. The system could relay complaints. For example, after receiving a threshold number of complaints having threshold gravity, the system could relay complaints the appropriate licensing authority. This could be automatic, or a notification could be triggered to be sent to an administrator for manual review. The system could have a repository for complaints, which could correspond to the advisor information repository.

Responsive to a complaint, an automated workflow could confirm that the complaining advisee actually had communications with the complained about advisor via the system. Any of various specifics surrounding the communications could be tracked, confirmed, compiled, and conveyed. For example, such specifics could include the date and duration of the advising session, the advising need, how much was charged, etc.

In some embodiments, a complaining advisee could receive an automatic refund. The workflow could automatically refund all or a portion of the amount that the advisee was charged. For example, the advisee could be automatically refunded a portion that may correspond to the amount over that which the advisor was compensated, that is, the portion of the charged amount that was received by the business providing the platform. In some embodiments, the refund could be triggered by the gravity of the complaint. In some embodiments, complaining advisees could be tracked so that an advisee may not take undue advantage of the refund process. In some embodiments, after a threshold number of complaints are received by a particular advisee, a notification to an administrator could be triggered so that manual review of a complaint may be facilitated.

In some embodiments, a complaint and/or a number of complaints meeting a number/type/gravity threshold may automatically an information hold. The information hold may alter current information retention settings of the platform. Whereas information retention settings may normally provide for certain data recycling procedures, the information hold may selectively deactivate those procedures for a particular advisor and/or advisee. Information related to the particular advisor and/or advisee may thereafter be retained for possible review and/or transfer to an appropriate authority pursuant to actions based on the complaint(s).

Figure 7:
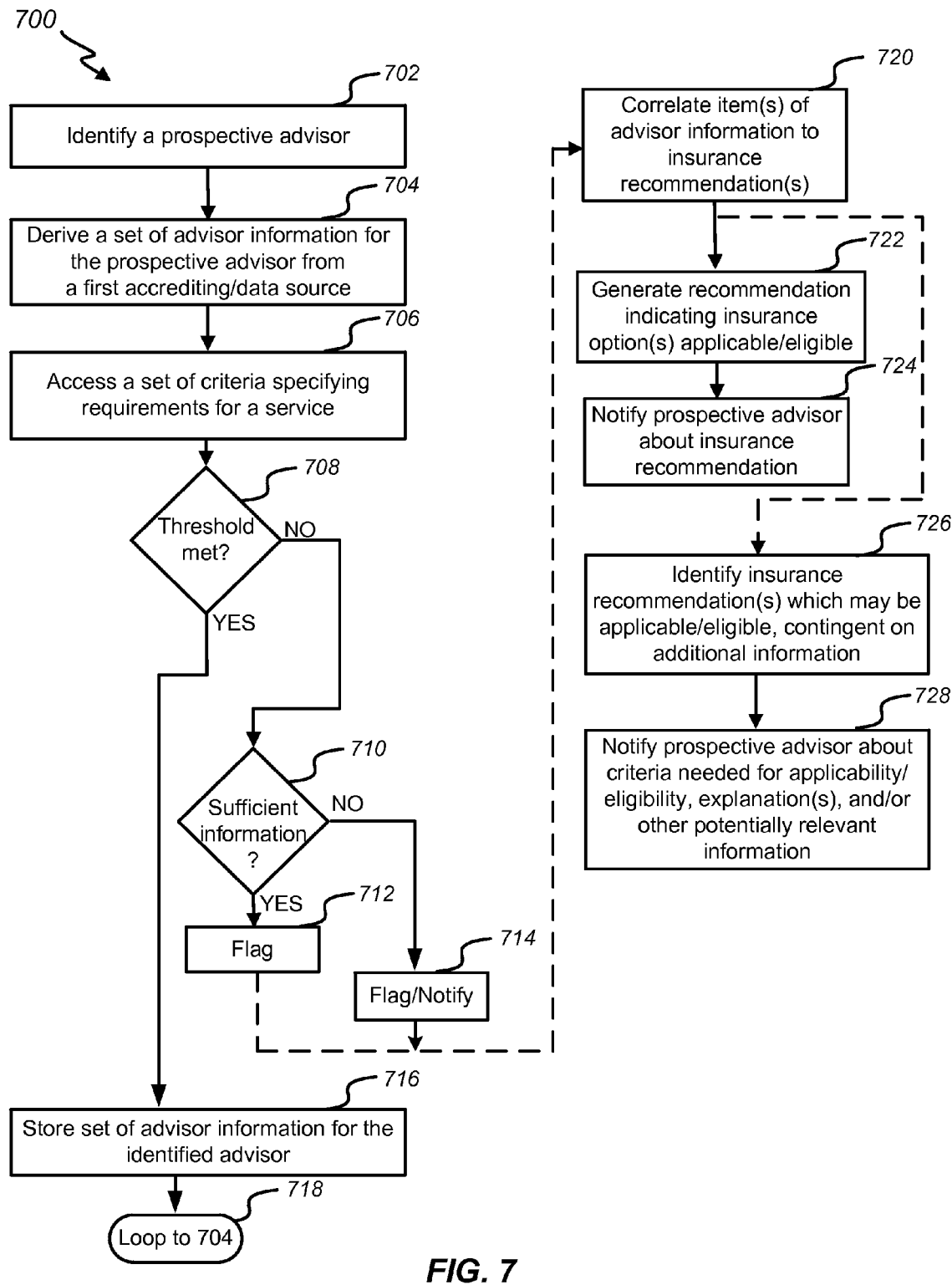
FIG. 7 illustrates an example method of handling advisor information, in accordance with certain embodiments of the present disclosure.

FIG. 7 illustrates an example method 700 of handling advisor information, in accordance with certain embodiments of the present disclosure. Teachings of the present disclosure may be implemented in a variety of configurations that may correspond to the systems disclosed herein. As such, certain steps of the method 700, and the other methods disclosed herein, may be omitted, and the order of the steps may be shuffled in any suitable manner and may depend on the implementation chosen. Moreover, while the following steps of the method 700, and those of the other methods disclosed herein, may be separated for the sake of description, it should be understood that certain steps may be performed simultaneously or substantially simultaneously.

According to one embodiment, the method 700 may begin as indicated by block 702. As indicated by block 702, a prospective advisor may be identified. As indicated by block 704, a first set of advisor information for the prospective advisor may be derived from a first accrediting and/or other data source. The advisor information may correspond to information relating to certification process that may include one or more of background checks, criminal record checks, validating identities, e.g., via social security numbers, sex offender background check, validating insurance, validating certifications/licenses, and/or the like. The derivation of such information could be performed in conjunction with information provided by a prospective advisor, such as information provided in setting up an advisor profile. As discussed herein, data may be actively gathered and/or pulled from one or more sources, for non-limiting example, by accessing a third party repository. Data could be gathered by "crawling" the various repositories in some embodiments. With some embodiments, sites of data sources may be linked with the system 106 so that updates available through the linked sites may be periodically found. In some embodiments, a web site/portal corresponding to a repository may be linked to the system 106 to facilitate notice and/or transfer of updated information. In addition or in the alternative, data may be pushed from one or more data sources to the system 106.

As indicated by block 706, a set of criteria specifying requirements for a service may be accessed. The set of criteria may correspond to any suitable information related to certification, licensing, and/or permit information. The information may include rules for professions, businesses, positions, practices, and/or services, associated with certification, licensing, and/or permit requirements and accreditation data sources, and associated with various jurisdictions.

The advisor information may be filtered with the set of criteria to identify pertinent requirements for the prospective advisor to provide services. One or more thresholds for advisor information may be identified based on the set of criteria for the prospective advisor. The threshold may be compared to the advisor information. As indicated by block 708, it may be determined whether the threshold has been met. If the threshold is met, the flow may continue to block 716 wherein the set of advisor information for the identified advisor is stored. After the advisor information is stored, the method 700 proceeds to block 718. As indicated by block 718, the flow may loop to block 704, as appropriate, with respect to handling additional information.

Returning again to decision state 708, if the threshold is not met, the method 700 proceeds to decision state 710, wherein it is determined whether sufficient information is available to make the threshold determination. If sufficient information is available, the method 700 proceeds to block 712, wherein the condition is flagged. In such instances, the prospective advisor may simply not be eligible for participation in the programs for one or more reasons. Returning again to decision state 710, if sufficient information is not available, the method 700 proceeds to block 714 wherein the information gap may be flagged. In certain embodiments, the prospective advisor may be notified. Thus, where there are gaps in information, the gap instances are noted in order to prompt for getting that information.

As indicated by block 720, item(s) of advisor information may be correlated to insurance recommendation(s). In the case that the prospective advisor does not have insurance coverage or in the case that the advisor's coverage status is unknown, insurance recommendations may be determined. The system could confirm whether advisor has a certain amount and/or type of insurance coverage.

As indicated by block 722, a recommendation may be generated to indicate which insurance option(s) are applicable and for which the advisor is eligible. In the case that an amount and/or type of insurance coverage is insufficient, the system may determine insurance recommendations for the prospective advisor. The recommendations may indicate a certain amount and/or type of insurance that the advisor needs in order to participate in the program.

In some embodiments, one or more insurance recommendations may include an offer for insurance coverage. Insurance cost could be discounted because the advisor could remain anonymous when providing advice through the platform. Offered insurance coverage could be a value-add that allows an advisor to start off with very little liability. The advisor could work from home, and insurance could be provided by through the business implementing the platform. In some embodiments, the advisor may not be charged for the insurance until a threshold of advisor charges has been reached, with the system tracking advisor charges and determining when the threshold is met. Group rates could be used to provide insurance at discounts, for example, for groups of advisors. As indicated by block 724, the prospective advisor may be notified about the insurance recommendation.

As indicated by block 726, in some cases, additional advisor information may be needed to determine an insurance recommendation. In some embodiments, an insurance recommendation which may be applicable and/or for which the prospective advisor may be eligible may be identified. As indicated by block 728, the prospective advisor may be notified about the criteria needed for applicability/eligibility, explanation(s), and/or other potentially relevant information.

Figure 8:
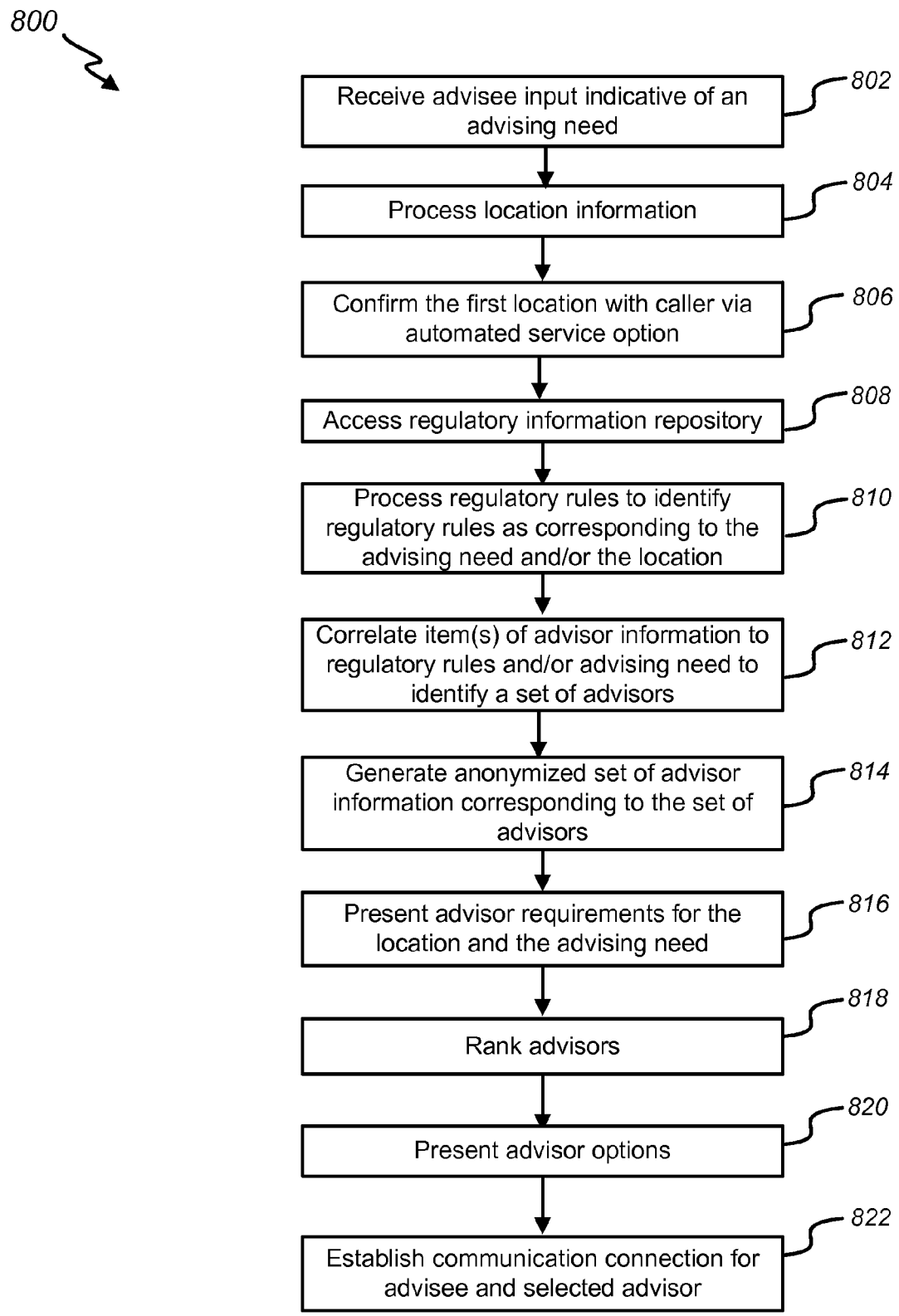
FIG. 8 illustrates an example method of advisor and advisee handling, in accordance with certain embodiments of the present disclosure.

FIG. 8 illustrates an example method 800 of advisor and advisee handling, in accordance with certain embodiments of the present disclosure. According to some embodiments, the method 800 may begin at block 802 wherein advisee input indicative of an advising need is received. Teachings of the present disclosure may be implemented in a variety of configurations that may correspond to systems described herein. As such, the order of the steps comprising the method 800 may be shuffled in any suitable manner and may depend on the implementation chosen. Moreover, while the following steps may be separated for the sake of description, it should be understood that certain steps may be performed simultaneously or substantially simultaneously.

The method 800 could allow for user identification of search criteria at any one or more of various suitable points in the process flow, according to various embodiments. By way of example without limitation, the user may identify search criteria prior to, contemporaneous with, and/or after any one or more of the method steps. In some embodiments, the search criteria may be set as a default, for example, for a user profile, an application, a mobile application, and/or an account associated with the user/user device. With some embodiments, an application and/or a mobile application may automatically perform one or more of the method steps.

Though not depicted in FIG. 8, in some embodiments, a mobile application 151, which is configured to run on a computing device 102, may be provided. The mobile application 151 may be provided in any suitable way. For non-limiting example, the mobile application 151 may be made available from the information handling system 106 or any website for download to the computing device 102; alternatively, it may be pre-installed on the mobile computing device. The mobile application 151 may be stored in the memory 134 and/or computer-readable media 146.

As indicated by block 802, advisee input may be received. The advisee input could correspond to a search query in some embodiments. A user interface may be presented to the consumer to facilitate searching. With the consumer interface, the consumer may input search criteria corresponding to an advising need. The search criteria may indicate a desired service and a location for the requested rendering of service.

The input could, in some embodiments, correspond to a telephone call to a telephone number. The telephone call may correspond to an advertisement for an advisor. The call could have been initiated in any suitable way. For example, the call could have been initiated by an end user dialing a telephone number that was displayed in an advertisement. In some embodiments, a telephone number may be presented in content information in a format such that, when the user selects a communication reference, the user device (e.g., a cellular phone or a computer) dials a telephone number corresponding to the communication reference. For example, the call could have been initiated by end user selecting a click-to-call option displayed via the user device. The user selection may be in the form of a keyboard/keypad input, a touch pad input, a track ball input, a mouse input, a voice command, etc. In some embodiments, user devices can automatically dial the telephone number. For example, a cellular phone, a computer or a PDA can dial a phone number using a Dual Tone Multi-Frequency (DTMF) generator. In some embodiments, the user device may initiate the phone call through a VoIP system.

In some embodiments, a type of call may be determined. It may be determined, for example, if the call is from one or more of a landline phone, a cellular phone, a portable number, and/or another line type. For example, in some embodiments, a received telephony message may be analyzed to determine a line type.

As indicated by block 804, location information corresponding to the advisee may be processed. The location information may indicate a location of the advisee. The information may be processed at, by, and/or with the computing device 102 and/or the information handling system 106. In some embodiments, the location engine may process location information. The information may be automatically gathered and may correspond to the location of the computing device 102. In some embodiments, the computing device 102 automatically determines its current position (e.g., via a satellite positioning system, or a cellular positioning system) and transmits the determined or estimated position to the location engine. The computing device 102 could provide the position in response to a request from the location engine.

For example, in the case of a cellular number, the user device may be a wireless mobile device, and the location of the wireless mobile device can be determined in a number of ways. For example, the computing device 102 may include one or more GPS receivers, one or more accelerometers, one or more magnetometers, and/or one or more gyroscopes that enable determination of its position based on data provided by these components and/or signals received by these components, such as received satellite signals. In certain embodiments, triangulation methods (e.g., triangulation based on cellular towers, Wi-Fi-based location, carrier-provided location, or any suitable cloud-based location method, service, source, and/or technique) may be employed to identify the location of the computing device. In the case of GPS, the GPS receiver may facilitate the identification of GPS coordinates.

In some embodiments, location information may be obtained from a cellular positioning system. An indication of a location from which the call originates may be derived at least in from base stations in relation to mobile computing device. In some embodiments, a cellular communication system may determine the location of a cellular phone. In some embodiments, a location of a cellular phone may be determined using a method known as Time Difference of Arrival (TDOA) in which the reception times of a cellular signal from a mobile station are measured at several base stations to determine the position of the cellular phone. Alternatively, a method known as Advanced Forward Link Trilateration (AFLT), or Enhanced Observed Time Difference (EOTD), can be used, which measures the reception times of cellular signals from several base stations to the cellular phone.

In some embodiments, the cellular site in which the mobile device can communicate to a based station can be used to determine a rough position of the cellular phone. In general, any method used by a cellular phone provider to get location information (e.g., for emergency service) can be used. An access point for a wireless local area network or a wireless personal area network typically has a small coverage area. Based on the location of the access point, location information (e.g., the city, or more precise location information) can be obtained. Location information may be obtained from a cellular location server, in some embodiments. The location may be based at least in part on and/or determined at the mobile station or determined at a server station. In some embodiments, a third party data source 108, such as a cellular advertiser, may provide indication of a location from which the call originates.

In some embodiments, the location of the mobile device may be determined via a satellite positioning system or a pseudolite positioning system. The location of the mobile device may be determined automatically through a Global Positioning System (GPS) receiver that is connected to, or built within, the mobile device. Pseudolites are ground-based transmitters that generate signals similar to a GPS. Pseudolites are useful in situations where signals from an orbiting satellite might be unavailable, such as tunnels, mines, buildings or other enclosed areas. A satellite/pseudolite signal receiver may determine its location and transmit the location through the cellular phone to a cellular communication system, or transmit the received signals to a location server which computes the location.

If a call comes from a landline phone, then an area associated with the phone number of the calling device may be indicated and with the calling device. For example without limitation, the area code of the number may indicate an area associated with the calling device. The first six digits may more specifically indicate an area associated with the calling device. This may indicate a location of the caller. For example without limitation, this may indicate a location of the caller within a radius of 15 miles, depending on the particular area.

In some embodiments, a geographic area associated with the phone number may be determined via a look-up in any suitable database using the telephone number of the caller. In some embodiments, a portable number may be identified at least partially based on cross-referencing one or more of portable telephone numbers, portable number databases, customer records, subscriber databases, operator databases, centralized databases, donor databases, and/or the like.

In some embodiments, the telephone number of the caller may be determined through Automatic Number Identification (ANI). For example, a call routing engine may determine the phone number of the user through ANI, which is a phone system feature that provides the billing number of the person making the phone call. Thus, the user phone number can be automatically determined through ANI, and ANI can be used to determine location information. Although the location information determined from ANI may not represent a correct position of a mobile device, content information about the location determined from ANI may still be of interest to the user.

In some embodiments, IP address of computing device, for example, a mobile computing device such as tablet, may be a basis for location information. In the case that the user device is accessing the Internet through an Internet Service Provider, location information for the user device can be obtained automatically from the Internet Service Provider.

In addition or in the alternative to automatically-gathered location information, a user may enter location information with the computing device 102. The user may identify any location interest by entering location information into the mobile computing device. The user may enter an address, a partial address, a city, a zip code, a location keyword, or any suitable location-indicating information.

In some embodiments, location information can be obtained from user preference/profile data. In some embodiments, when the user searches for information without explicitly specifying a geographic area, the geographic area of interest can be determined based on typical geographic radius of interest on the topic and the location of the user. In some embodiments, information associated with particular communication reference/phone number, such as the media channel used to provide the communication reference/phone number to the user, is decoded/retrieved using the advertiser information repository. Thus, the information associated with the communication reference/phone number can be tracked/stored, and location information can be inferred from the tracked information.

As indicated by block 806, some embodiments may include an option where a location may be confirmed with the caller. At any suitable point after a location has been identified, the location may be confirmed via an automated check. For example, an automated service option could be directed to the caller, saying, "We see you are calling from around Bakersfield, Calif. We presume that you are seeking advice as it pertains to California. Is that right? If that is not right, state the correct location or press 2."

If the first location is correct, the process flow may continue based on that first location. If the first location is incorrect, a different location may be identified. For example, a response by the caller indicating the different location may be identified with the voice recognition system and the call handling engine. The different location could be entered by the caller via the computing device in any suitable way. With the different location identified, the process flow may continue based on that different location as the "first location." Accordingly, while the first location may be guessed with proximity techniques, if the guess is wrong, the call is not misdirected to advisors that are not licensed, certified, and/or permitted to serve that particular location.

As indicated by block 808, a regulatory rules repository may be accessed. As indicated by block 810, one or more regulatory rules may be processed. A set of regulatory rules may be identified as corresponding to one or more of the advising need and/or the location. The set of rules may govern the certifications, licenses, and/or permits that are required for the jurisdiction corresponding to the location and the advising need.

As indicated by block 812, item(s) of a set of advisor information may be correlated to the identified rules and/or the advising need. A set of advisor information may be processed. The set of advisor information may correspond to a set of identified advisors. The advisor information may be stored in one or more data repositories.

A set of one or more advisors may be selected based on a correlation of advisor information with the set of one or more identified rules such that the set of advisors have credentials that satisfy requirements indicated by the set of rules for the jurisdiction and the advising need. In some embodiments, the first set of advisor information may be selected based at least in part on an advising service type. In some embodiments, the first set of advisor information may be selected responsive to a user selection of search criteria for advisor information. In some embodiments, the first set of advisor information may be selected based at least in part on the location. For example, those advisors meeting the jurisdictional requirements, having the required certification, licenses, and/or permits to provide the type of advice corresponding to the advisee's need, may be included in the first set.

In some embodiments, a set of advisors corresponding to the advising need may be identified prior to correlation to the identified rules, such as at a previous point in the flow; in some embodiments, a set of advisors corresponding to the identified rules may be identified prior to correlation to the advising need, such as at a previous point in the flow. In some embodiments, step 812 is performed prior to and/or independent of any user selection of search criteria for advisor information. In various embodiments, step 812 may be performed at, by, and/or with the computing device 102 and/or the search engine.

In some embodiments, an area proximal to the location may be identified. The area proximal to the location may correspond to a search area. In other words, the area may be the prime area in which to search for advisors. According to some embodiments, the information handling system 106 identifies the area proximal to the location. According to other embodiments, the mobile application executed on the computing device 102 identifies an area proximal to the location. In some embodiments, the area selector identifies an area proximal to the location.

In some embodiments, a subset of advisor information out of the set of advisor information may be processed. The subset of advisor information may correspond to a subset of identified advisors. In some embodiments, the subset of advisor information may be selected based at least in part on the area proximal to the first location. For example, those advisors located within the area proximal to the first location may be identified, and the subset of advisor information may correspond to those advisors.

As indicated by block 814, an anonymized set of advisor information corresponding to one or more of the set of one or more advisors may be generated. As discussed herein, the extent and application of anonymization may depend on various factors.

As indicated by block 816, advisor requirement information may be presented to the advisee. The requirement information could correspond to the location and the advising need. For example, information on licensure and/or other requirements that are required for an advisor corresponding to the advisee's need to advise in a particular jurisdiction may be presented. An explanation, such as an FAQ, may be presented to explain, say, here is what is needed to do X. The requirement information may be presented consequent to confirmation of the location and/or advising need in some embodiments.

As indicated by block 818, identified advisors may be ranked. Any suitable criteria may be used for the ranking. In some embodiments, the ranking of the advertisement candidates is partially based on the degree of matching of advisor to the advising need. In some embodiments, advisors may be ranked based at least in part on customer ratings.

As indicated by block 820, advisor option(s) may be presented to the advisee, as discussed herein. For example, the first set of advisor information may include any suitable listings, location, credential information, a link to an anonymous blog spot provided to advisor by the platform, and/or other advisor information (any of which could be anonymized) corresponding to any number of advisors. As indicated by block 822, responsive to user selection, a communication connection for the advisee and a selected advisor may be established, as discussed herein.

In some embodiments, a phone number for the selected advisor may be determined. For example, in some embodiments, the call routing engine may determine the phone number for the selected advisor using the advisor information repository. A phone call may be routed/connected to the phone number for the selected advisor. For example, in some embodiments, the call routing engine may connect the phone call, as discussed herein. The call routing engine could direct the call to the telephone number of the advisor. In some embodiments, a phone router may transfer the call to the telephone number of the advisor. In some embodiments, the telephone number of the advisor may be provided to the user device, and the user device may initiate the phone call. In some embodiments, a phone router may be used to initiate phone calls both to the user device (or a separate user phone) and the target phone and then join the phone calls to connect the user to the target phone. In some embodiments, the selection of the target phone number is transmitted to the corresponding media channel, which forwards the request for making the phone call to a server (e.g., a web server) connected to the phone router. Alternatively, the content information can be formatted so that the selection is sent directly to the server that is connected to the phone router.

Figure 9:
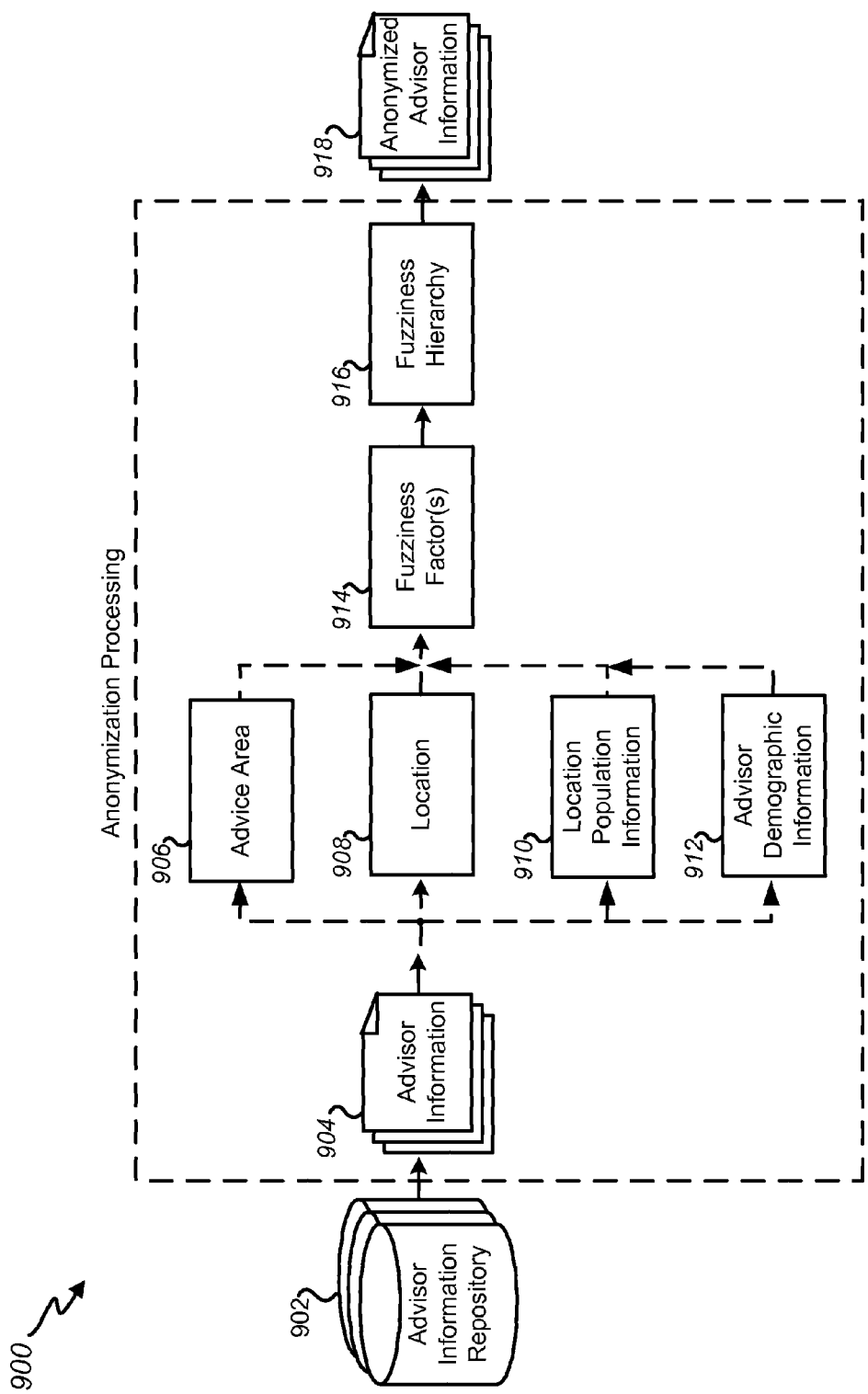
FIG. 9 is a simplified illustration of content handling, in accordance with certain embodiments of the present disclosure.

FIG. 9 is a simplified illustration of content handling, in accordance with certain embodiments of the present disclosure. In some embodiments, advisor information corresponding to the set of advisors may be anonymized. This may allow for sites for advisors who have their credentials verified, so that the consumer need not go through any undesired research. This also may allow for some protection for advisors. With certain embodiments, certain anonymized credential information may be exposed to an advisee. With certain embodiments, fuzziness may be applied to data if the data category is thin in order to facilitate anonymity. Fuzzying of data may include one or more of hiding information, removing information, obscuring information, and/or replacing information with generic terms, general references, and/or characterizations. Depending on the specifics of various cases, varying degrees of fuzziness may be applied to data in order to avoid exposing so many specifics so as to allow determination of advisor identity. Fuzziness may be applied according to a sliding scale so that enough information for an advisor's identity to be determinable may not be given to an advisee.

In some embodiments, an anonymization engine may process advisor information 904 from an advisor information repository 902 and may determine a fuzziness factor 914 for the information 904 according to a fuzziness scale. A fuzziness factor 914 may correspond to an extent to which items of advisor information 902 is to be fuzzied prior to presentation to the advisee. For example, a fuzziness factor 914 may correspond to a percentage which may indicate a percentage of the advisor information 902 that should be fuzziness for presentation. A fuzziness scale may include any suitable scale that allows for variable extents of fuzzing advisor information 904 to ensure anonymity of an advisor based at least in part on the location 908 and the particular advisor. This may accommodate the varying circumstances for particular advisors, particular advice areas 906, and/or particular locations. For instance, an advisor who is the lone advisor option in a particular advice area 906 for a particular location 908 that has a small population may need more fuzzying of the advisor's information to ensure anonymity than would an advisor who has comparatively greater numbers of competing advisors in an advice area 906 and in a high population area 910. As one specific hypothetical example, an iridology expert in North Dakota may need more fuzzying of information than would a marriage counselor in Southern California.

In some embodiments, a fuzziness factor 914 may be based at least in part on advisor demographic information 912 gathered from one or more data sources from which may be derived indication of a number of advisors corresponding to a particular advice area 906 and a particular location 908. In some embodiments, a set of one or more advisors may be determined to correspond to a percentage of an overall set of advisors for an advice area 906 for a location 908. For example, a set of advisors may correspond to ten advisers out of a total population of one hundred advisers in an advice area 906 for a particular location 908. In some embodiments, a higher percentage may correspond to a higher fuzziness factor 914. In some embodiments, a fuzziness factor 914 may be based at least in part on a ratio of a particular advisor to a set of available advisors via the platform, and/or a set of advisors for a location regardless of whether the advisers use the platform. In some embodiments, a fuzziness factor 914 may be based at least in part on a population density for the location. For example, a weighting table may be used to adjust a fuzziness factor 914; the table may include various adjustments accorded to various ranges of populations.

In some embodiments, at a minimum, an advisor's name may be anonymized. The advisor may be assigned an alias. The fuzziness factor 914 may be used to determine a number of advisor information items 904 that need to be obscured prior to presentation to an advisee. For example, if the fuzziness factor 914 indicates that 50% of the advisor's information items should be obscured, then half of the information items may be replaced with generic terms. For example, the name of the school to which an advisor went may be replaced with a generic reference to the school or type of school. Dates, such as dates of certification and/or graduation from schools, may be removed, obscured, and replaced with general references. Specific references to cities could be removed, obscured, or replaced with general references. Specific names of past employers in the advisor's experience profile could be removed, obscured, or replaced with generic terms or generic references to an industry.

In some embodiments, fuzzying can be applied according to a hierarchy 916. The hierarchy 916 could indicate an order of information items that defines the order in which certain types of information items should be fuzzied. For example, it may be desirable to fuzzy certain information items before others. City names could be fuzzied before employment references, employment references could be fuzzied before school references, school references could be fuzzied before date references, etc. Any suitable or desirable hierarchy 916 could be employed.

In some embodiments, fuzzying and fuzziness factors 914 may be determined on an information item basis. For example, in some embodiments, for each of various information items for a particular advisor can be compared to corresponding items of advisor population information for peer advisors. For example, a particular advisor may have iridology as an advice area 906 having graduated from a school in North Dakota. The system may search the advisor demographic information 912 for other iridology experts having graduated from a school in North Dakota. If only two iridology advisors are found to have graduated from a school in North Dakota, a high fuzziness factor may be accorded to the school identification information for the particular advisor. The school information may not be given or may be indicated generally as a school in the Midwest, for example.

Accordingly, a set of anonymized advisor information 918 may be generated. The anonymized advisor information 918 may be presented to an advisee in response to a user query. Thus, certain embodiments according to the present disclosure may provide for a fundamentally new advising experience by anonymizing an advisor, yet verifying his/her credentials, exposing credentials to the user, verifying insurance, providing insurance, and/or having connections with legal authorities to provide assurances, so that a consumer may avoid headaches in seeking assistance from an advisor. Certain embodiments may allow for increased trust and confidence in an advising platform and particular advisors facilitated by the platform. Certain embodiments may allow for coordination of information with legal entities, licensing authorities, certification authorities, and/or the like.

Figure 10:
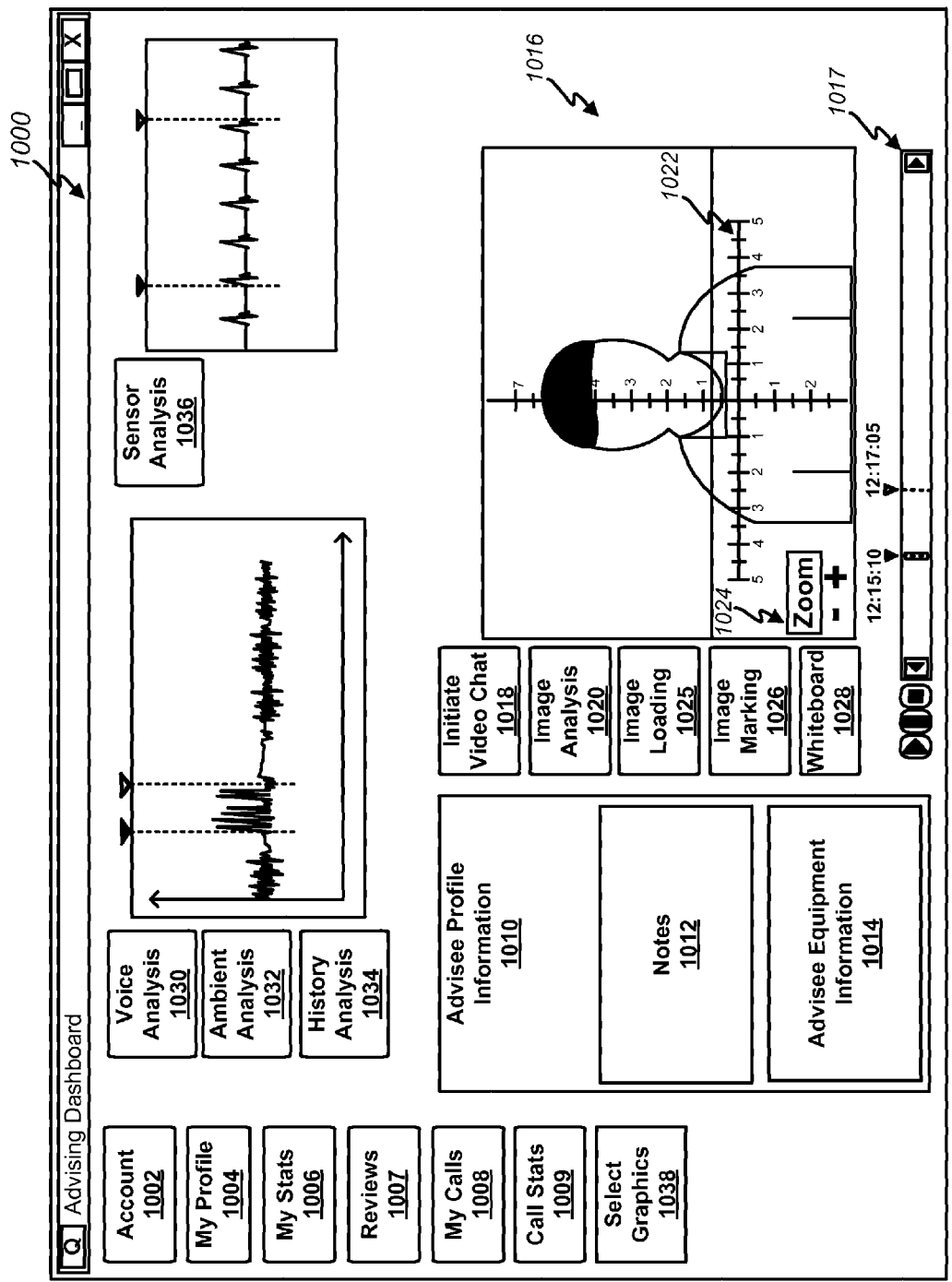
FIG. 10 illustrates one embodiment of an advisor interface for an advising platform, in accordance with certain embodiments of the present disclosure.

FIG. 10 illustrates one embodiment of an advisor interface for an advising platform, in accordance with certain embodiments of the present disclosure. Certain embodiments may provide for tracking of information regarding advisees. Tracked information could include information relating to equipment that an advisee uses and has used to interface with one or more advisors. For example, information about the specific devices, device configurations, and/or device capabilities that a give advisee uses could be tracked and retained in a repository. Such tracked information for a particular advisee could be made available to an advisor before, during, and/or after an assistance session for the advisee. In some embodiments, such advisee-related information could be provided by the advisee, the advisor, and/or via automatic detection by the system. For each advisee, a dossier could be compiled and made available to an advisor to facilitate assistance the advisee.

In various embodiments, an advisor platform may track calls, messages, billing, etc. and enable advisors to interact with the platform to retrieve, see, and use the data. A feed of information and/or a dashboard could be in a web portal and/or provided via a mobile application. The advisor could customize the dashboard and/or the feeds and what can be ignored, although default templates may be supplied.

Certain embodiments may provide for advisee history analysis. Certain embodiments may provide for an advisee history engine that manages, collects, retrieves, updates, and/or retains information relevant to a particular advisee. Certain embodiments may automatically identify a caller, correlate the caller to an advisee profile, and provide advisee profile information to the advisor to enrich the assistance session by making advisee profile information available to the advisor. Advisee profile information may provide the advisor with valuable context.

Certain embodiments may allow an advisor to record advisee information in a repository for later reference. Such provision of historical information particular to an advisee may allow the advisor to provide information appropriate for the advisee's specific needs. Certain embodiments may provide system features that automatically analyze and present historical information for an advisee, for example, via the advisor dashboard. The analysis of the information may include comparison of current information to past information for the advisee.

Certain embodiments may provide for advisee equipment configuration analysis. The particular information available to and advisor may depend on the capabilities and configuration of the media used. In some embodiments, the platform may retrieve and/or identify information about the capabilities of the advisee's computing device and/or communication medium, assess the capabilities against various analytical possibilities of a given advisor, and present capability information to the advisor.

In certain aspects, the advisor interface for the advising platform may include a dashboard 1000. For example, after an advisor logs into the platform, different data points that can be of use for the advisor may be presented to the advisor to facilitate advising. The dashboard 1000 may include any software process or module operable to present and receive information to/from an advisor 113, allow an advisor to monitor advisee information, select different types of advisee-related data, identify desired metrics, automatically generate dashboard views, customize dashboard views, and/or the like. The example of the dashboard 1000 is not limiting. In some embodiments, a dashboard 1000 may correspond to a mobile application interface.

In some embodiments, the dashboard 1000 may correspond to a page of the platform and/or an app that an advisor might see upon being connected with an advisee. The dashboard 1000 may provide a graphical user interface (GUI) that includes any number and type of user-selectable options to facilitate various embodiments. In various embodiments, one or more user-selectable options may include one or more of a screen-labeled function key, an icon, a button, a soft button, a window, a menu, a control widget, a scroll bar, a slider, a listbox, and/or the like. In various embodiments, one or more user-selectable options may be selectable via one or more of touch, push, movement-based selection, and/or any suitable navigation feature.

In various embodiments, to facilitate various aspects, the user-selectable options may include one or more of an account feature 1002, an advisor profile management feature 1004, an advisor statistics feature 1006, a call management feature 1008, and/or the like. The advisor page may allow for a high-level presentation of features that allow for drilling down into more specific features. In various embodiments, any one of the features of the dashboard 1000 may include automatically presented information. Information of interest may be automatically presented to the advisor.

In some embodiments, the advising information handling system 106 may include one or more account management modules. The account management module may be configured to allow an advisor to manage the advisor's account. Management options may be provided for the advisor to one or more of make changes to the account, contact customer service, change/update the advisor's profile, change/update the advisor's preferences, create/change/update the advisor's advertisements, select various advertising products, manage call-back settings, manage alert settings, and/or the like.

An advisor account management module may include logic to retrieve, process, derive, compile, aggregate, handle, store, report, and/or present information about items of interest associated with advisor accounts. For example, items of interest could include important activities associated with an advisor account. Items of interest could include whether an advisor is missing calls from consumers and other information associated with the missed calls, such as details surrounding the missed (e.g., number of calls, times of calls, numbers called, caller information, location information, and/or the like). Items of interest could include any billing information associated with the account. Items of interest could include any messages/calls associated with the account, such as messages from customer service, from advisee, and/or the like.

In some embodiments, a ratings/reviews feature 1007 may be configured to present access to details regarding ratings and/or reviews associated with an advisor's services. The ratings and/or reviews may correspond to advisee feedback per surveys and/or any suitable feedback gathering tool.

In some embodiments, a call statistics feature 1009 may be configured to present access to details regarding any of the advisor's calls. Options for presenting access to details about any of the advisor's calls can include providing details relating to one or several call, providing detail relating to the particular location of one or several call, providing details relating to one or several numbers used in making one or several calls, providing details relating to calls of interest, which calls of interest may be based on any suitable additional information, such as intelligence a particular caller of interest, a particular location of interest, etc., providing detailing relating to calls that were successfully connected, missed calls, dropped calls/calls receiving a busy tone, call-back statistics, call lengths, and/or the like. For instance, the call of interest feature could identify a number of calls from a particular call in a particular time period as an indication of interest. As another example, the call-back statistics features could indicate an advisor's average time to call an advisee back.

In some embodiments, advisee profile information 1010 may be presented. Certain embodiments may automatically identify a caller, correlate the caller to an advisee profile, and provide advisee profile information 1010 to the advisor to enrich the advising session. The advisee profile information 1010 may provide the advisor with valuable context. The advisee profile information 1010 may include information about a particular advisee, such as information relating to advisee location, biographical data, health conditions, life conditions, problems, advice provided, etc. The advisee profile information 1010 may include tracked information and retained pursuant to one or more previous advising sessions. In some embodiments, such advisee-related information could be provided by the advisee, the advisor, and/or via automatic detection by the system. Certain embodiments may provide for an advisee history engine that manages, collects, retrieves, updates, and/or retains information relevant to a particular advisee. For example, such tracked information may include information about an advisee's facial expressions, which may include micro-expressions, voice, speaking, body language, gestures, emotional indicia, writing, environmental context, and/or the like. Such tracked information for a particular advisee could be made available to an advisor before, during, and/or after an advising session for the advisee. Accordingly, for each advisee, a dossier could be compiled and made available to an advisor to facilitate advising the advisee.

The advisor may have the ability to annotate 1012 the advisee profile according to the advisor's judgment and such information may be retained for subsequent reference and comparison. The advisor may record advisee information for later reference. Such provision of historical information particular to an advisee may allow the advisor to provide information appropriate for the advisee's specific needs.

In some embodiments, information relating to equipment 1014 that an advisee uses and has used to interface with one or more advisors may be presented. For example, information about the specific devices, device configurations, and/or device capabilities that a given advisee uses could be detected and/or tracked, and presented to the advisor so that the advisor is aware of the capabilities of the advisee. The particular information available to and advisor may depend on the capabilities and configuration of the media used. In some embodiments, the platform may retrieve and/or identify information about the capabilities of the advisee's computing device and/or communication medium, assess the capabilities against various analytical possibilities of a given advisor, and present capability information to the advisor. For example, a computing device with a voice over IP capabilities may enable analysis of voice and speaking. For example, based on the advisee's configuration information, it may or may not be possible for certain aspects of the advisee's facial expressions, which may include micro-expressions, voice, speaking, body language, gestures, emotional indicia, writing, environmental context, etc. to be analyzed. For example, the resolution of the camera on the advisee's computing device may limit the extent to which certain image-based aspects may be analyzed. An analysis of the advisee's iris may require a minimum threshold of resolution for effective analysis, for instance. The advisee's computing device may or may not have writing capabilities to allow for the advisee's writing to be readily analyzed. For example, the advisee's computing device may allow the advisee to write on the device screen with a finger, stylus, or other tool of the advisee.

In some embodiments, a video interface 1016 may be provided. The video interface 1016 may provide for one- or two-way video communication between advisor and advisee. In some embodiments, a video chat session could be established between advisor and advisee. An option to initiate a video chat session 1018 could be presented. In some embodiments, the video interface 1016 may include navigation features 1017. Video content could be buffered and/or recorded to facilitate navigation and advising. The navigation features 1017 could include options to pause, play, stop, fast-forward, rewind, skip forward, skip backward, skip to certain times, and/or the like. The options could include a selectable navigation bar. In some embodiments, the video interface 1016 may allow for saving of video for further reference and/or analysis. In some embodiments, the video interface 1016 may allow for retrieving and replay of previous video content, e.g., from a previous video session. This may allow for enhanced advising.

In some embodiments, image analysis features 1020 may be provided. In some embodiments, an advisor and/or the system may utilize face, biometric and/or similar recognition/analysis (e.g., using pattern classification techniques) to determine characteristics of the advisee. Certain embodiments may provide for parsing techniques that identify and measure movements and/or various physical aspects of the imagery. For example, movements and/or various physical aspects of the advisee's face, eyes, and/or the like may be identified and measured. Physical aspects could be correlated to the geometrical shapes, recorded, and measured against reference information—whether it be previous information for the same subject and/or other reference information.

Captured image information may be analyzed to determine a state and/or a characteristic of an advisee. In some embodiments, image information may include a portion of the advisee, such as the advisee's face, eyes, hands, chest, etc. By analyzing the captured image information, the advisor and/or the system may determine state and/or a characteristic. Image information may be analyzed to determine whether there is a change in the advisor's states. In some embodiments, any one or combination of triggers may be detected (e.g., rapid change in eye movement and/or facial movement). Upon detecting the trigger(s), the advisor and/or the system may determine various characteristics. In one example, information of the advisee's chest may be analyzed to determine that the advisee's breathing rate has slowed down beyond a threshold value or increased beyond a threshold value, indicating various states/responses of stress, agitation, emotion, anxiety, excitement, etc. In another example, captured information of the advisee's blood vessel(s)/veins may be analyzed to determine that the advisee's heart rate has sped up or slowed down, indicating various states/responses of stress, agitation, emotion, anxiety, excitement, etc. Some embodiments may also analyze information of the advisee's eyes (e.g., eyelids, pupils) to determine various indicia of states/responses.

In some embodiments, reference indicia 1022, such as cross-hairs and/or target aperture, so that the advisor may focus the video with zoom features 1024 on various aspects of the subject imagery provided by the advisee, such as the advisee's face or other physical aspects. For example, the advisor may wish to closely examine any suitable physical feature of the advisee to facilitate the advising session. An advisor in the area of iridology, for instance, may wish to closely focus on the iris of the subject in order to analyze and/or explain aspects based on thereon. In some embodiments, reference indicia 1022 may allow for selection of certain aspects of imagery for focused image analysis of those aspects by the system.

In some embodiments, image loading features 1025 may be provided to view, upload, download, or otherwise handle still images. An image viewing and/or editing could be provided in addition to or in alternative to the view interface 1016. In some embodiments, image editing/marking features 1026 may be provided. One or more selectable items included in the graphical user interface to allow writing and/or marking the image, by for example making notations, or sketching, or the like on the displayed image. In some embodiments, the platform may provide a graphical user interface with a whiteboard feature 1028. The whiteboard feature 1028 allowing an advisor and/or advisee to write or draw on a whiteboard that could be provided in addition to or in alternative to the view interface 1016.

In some embodiments, voice analysis features 1030 may be provided for a voice and/or language analysis of voice input provided by the advisee. As previously noted, certain embodiments may provide for detecting and characterizing an advisee's voice. Spectral analysis techniques may be applied to indicate, for example, an advisee's emotional state. The platform could analyze the advisee's voice and present certain analysis results to the advisor, for example, with graphics. For example, such information may be presented to the advisor via an advisor dashboard. Any suitable voice analysis techniques may be employed. In some embodiments, various alternative and well-established analysis techniques may be presented as options to the advisor such the advisor may choose one or more of the techniques to be employed for a particular advisee. In some embodiments, an analysis for an advisee may be compared to data retained from one or more past advising sessions for the advisee. The detected voice data may be assigned a score and compared to reference information for the advisee and/or other reference information.

In some embodiments, environmental analysis features 1032 may be provided for detecting and characterizing an advisee's environment. As previously noted, in some embodiments, an environmental analysis for an advisee may be compared to data retained from one or more past advising sessions for the advisee. A normal environmental state may be identified for an advisee. Changes with the respect to the normal state may be identified and presented to the advisor, for example, via the dashboard. Environmental information may be detected through the media used. For example, background noise may be detected and measured and/or characterized during a phone call or video session. The background noise may be assigned a score and compared to reference information for the advisee and/or other reference information. Environmental information may be more specifically identified. For example, noise from a TV, other people, traffic, sirens, trains, pets, etc. may be more particularly identified. The advisor may have the ability to annotate the advisee profile according to the advisor's judgment and such information may be retained and for subsequent reference and comparison.

In some embodiments, advisee history analysis features 1034 may be provided for analyzing and presenting any suitable historical information. The analysis of the information may include comparison of current information to past information for the advisee. Past information may be graphically compared with current information via the dashboard 1000.

The system may include a threshold detection component that may analyze any advisee related information (voice, movements, or any sensed input, for example) in reference to any suitable threshold. When a threshold has been met or exceeded, a notification may be presented to advisor via the dashboard. The threshold may be predetermined and/or customizable by the advisor. The threshold may be set by the system as a default. The threshold may be based on system analysis of past information for the advisee. For example, past voice analysis may indicate certain norms, averages, ranges, and/or other characteristics of an individual advisee's voice pattern. One or more thresholds may be based on such past characteristics. For example, input signal amplitude exceeding or falling below a threshold for an amount of time may be flagged. Thus, when an advisee exhibited uncharacteristic voices aspects that exceeded the one or more thresholds, a notification may be graphically indicated to advisor via the dashboard.

In some embodiments, sensor analysis features 1036 may be provided. The sensor analysis features 1036 may be based on input elements that include one or more of the following physiological sensors: bioimpedance, respiration, respiration rate variability, heart rate (average, minimum, maximum), heart rhythm, heart rate variability, respiratory sounds, blood pressure, activity, posture, and/or temperature/heat flux. The input elements may include an activity sensor that may be one or more of the following: a ball switch, an accelerometer, a heart rate sensor, a bioimpedance noise sensor, a skin temperature/heat flux sensor, a blood pressure sensor, a muscle noise sensor, and/or a posture sensor. In some embodiments, heart rate or other physiological aspects may be detected in conjunction with the flash of the camera. For example, an advisee could place his finger over the flash so that heart rate may be detected.

A graphic selection feature 1038 may be configured to present access to details of advising information and/or any suitable data according various embodiments herein in any suitable format with any suitable graphics. By way of example without limitation, pie charts, bar graphs, line graphs, tables, with features allowing ordering and/or filtering of data according to any suitable criteria, matrices, Venn diagrams, images, photos, and/or the like may be implemented according to various embodiments. In some embodiments, the graphic selection feature 1038 may allow for advisor customization and/or manipulations of graphics presented with the dashboard 1000.

It is to be understood that the depicted dashboard 1000 is for example purposes only. Accordingly, the dashboard 1000 may provide a GUI that may include or present data for an advisor interface of an advising platform in any suitable format with any suitable layout of any suitable sets/subsets of features, along with any desired graphical depiction of information, to facilitate features of various embodiments of the present disclosure.

The advising information handling system 106 may include one or more logging modules. The logging module(s) may be configured to perform logging processes to receive and log data of interest for advising sessions. An advisee analytics module(s) may include logic to retrieve, process, derive, compile, aggregate, handle, store, report, and/or present information relating to data associated with advisees. The advisee analytics module may be configured to present any desirable information in any desirable manner. With respect to a particular advisor, the logging module and analytics module may facilitate various features of an advisor interface for an advising platform, in accordance with certain embodiments herein.

The logging module may include tracking logic to track calls, in accordance with certain embodiments. In some embodiments, the logging module may be configured to identify whether a caller is successfully connected with an advisor, whether the call is missed, whether the call is dropped/disconnected/receives a busy tone, whether the call is routed to voicemail, and/or whether a voicemail is left. In some embodiments, the logging module may include ANI logic to identify numbers of callers. In some embodiments, the logging module may be configured to track the length of calls. In some embodiments, the logging module may be configured to record calls.

In some embodiments, the advisee analytics module may be configured to present comparative data. For example, current advisee data may be compared to past advisee data. Any type of advisee data may be compared. An advisor may have user selectable options to select different types of statistics for comparison and order by different types of statistics.

Figure 11:
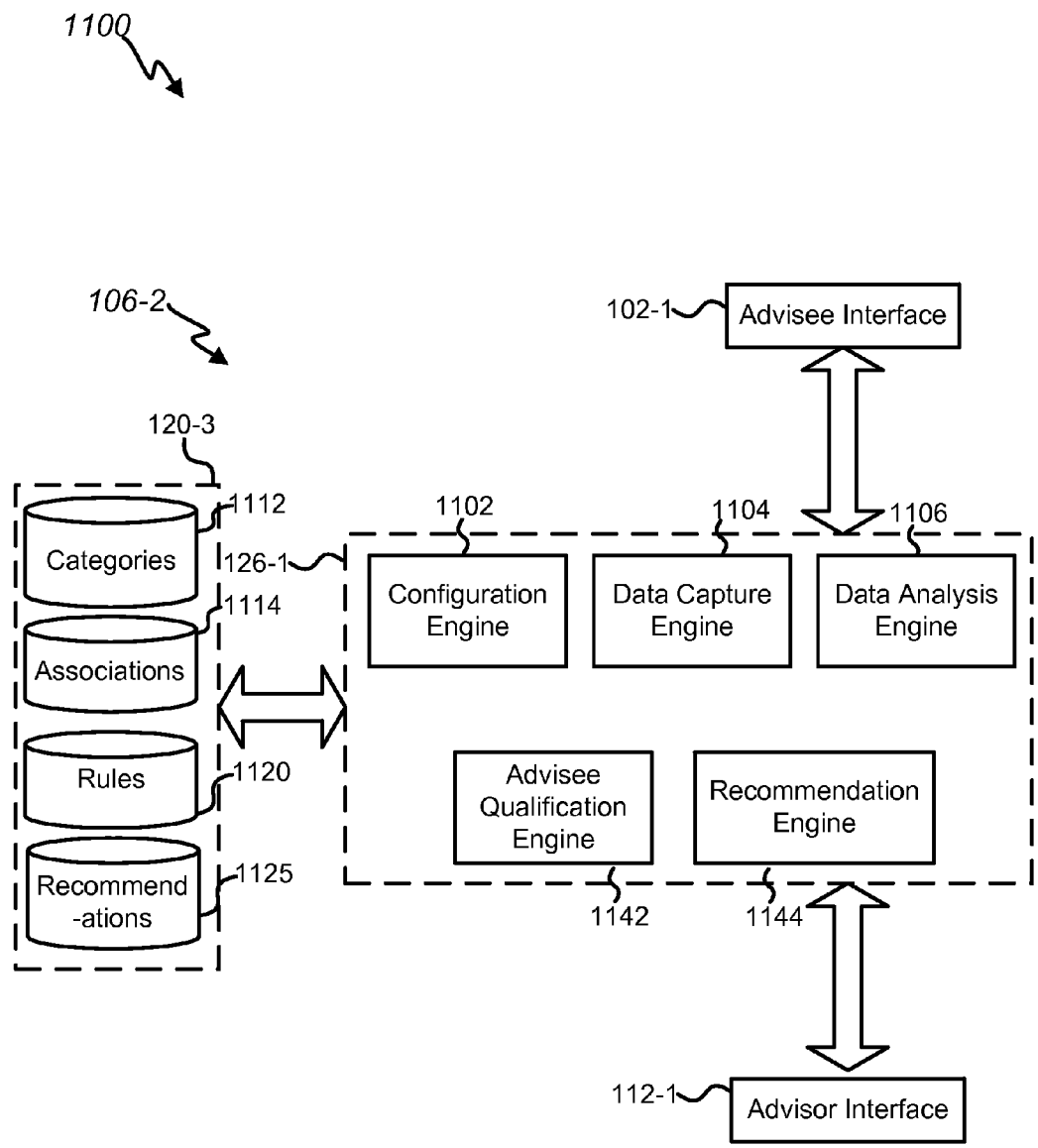
FIG. 11 depicts a block diagram of an embodiment of a system configured for advising management, in accordance with certain embodiments of the present disclosure.

FIG. 11 depicts a block diagram of an embodiment of a system 1100 configured for advising management, in accordance with certain embodiments of the present disclosure. The information handling system 106-2 may include a configuration engine 1102. According to some embodiments, the configuration engine 1102 may be configured to perform any one or combination of features directed to facilitating configuration of advisee and/or advisor equipment, gathering and assessing information pertaining to the equipment, determining options/limitations based on the equipment, suggesting and/or making available options based on the equipment, and/or the like. The data capture engine 1104 and the data analysis engine 1106 may be configured to perform any one or combination of features directed to facilitating data capture and analysis disclosed herein. The advisee qualification engine 1142 may be configured to perform any one or combination of features directed to facilitating advisee qualification disclosed herein. The recommendation engine 1144 may be configured to perform any one or combination of features directed to facilitating recommendations for the advisor disclosed herein. The repositories 120-3, which may include category information repository 1112, association information repository 1114, rules information repository 1116, and recommendation information repository 1116 may retain any suitable information to facilitate certain features disclosed herein. By way of example without limitation, various aspects of the system 1100 may facilitate corresponding features described with the following.

Figure 12:
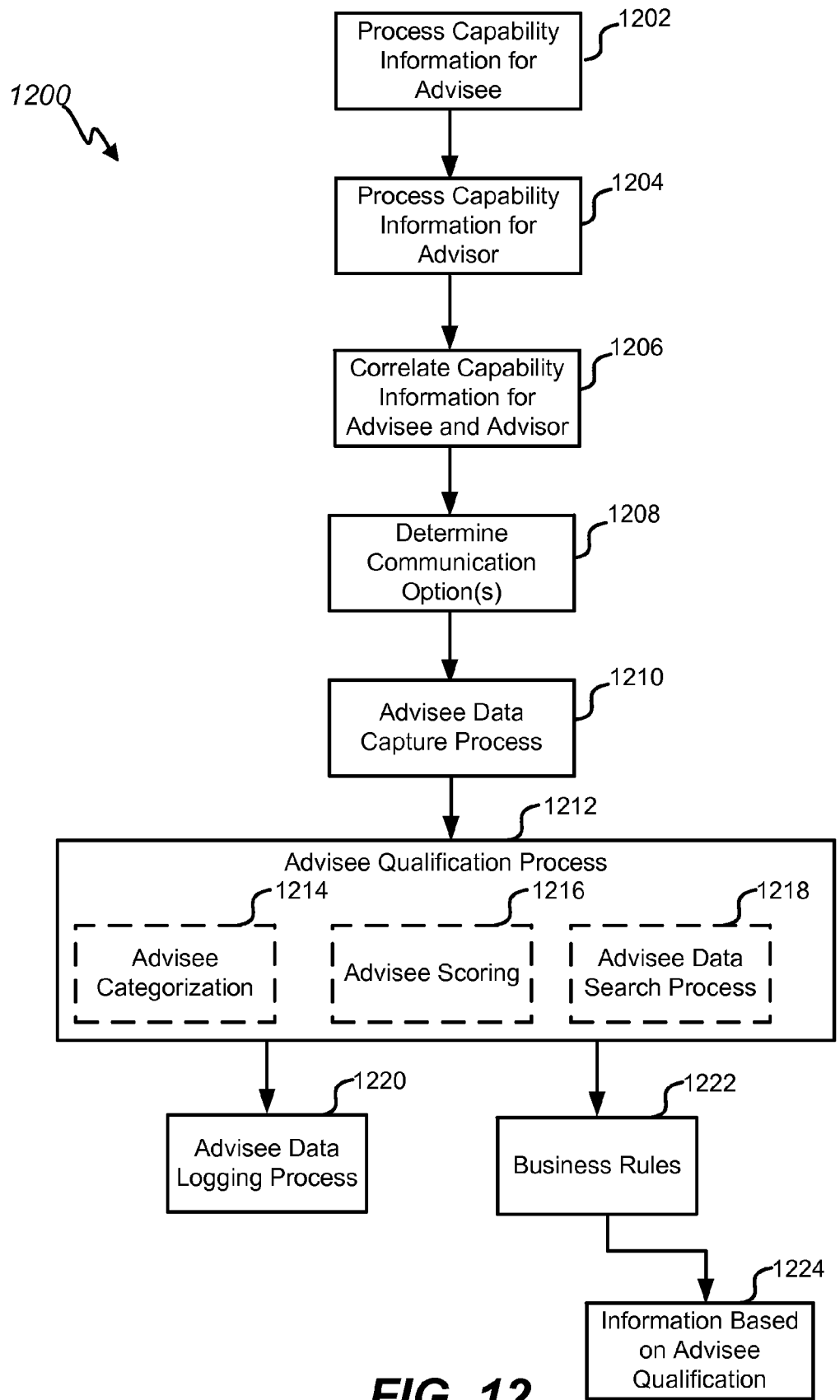
FIG. 12 depicts a functional block diagram of certain aspects of advisee qualification, in accordance with certain embodiments of the present disclosure.

FIG. 12 depicts a functional block diagram of certain aspects of advisee qualification 1200, in accordance with certain embodiments of the present disclosure. Various embodiments may employ any one or combination of various methods of qualifying advisees. As part of the qualifying, an advisee may be characterized in one or more ways, and any suitable characterization may be attributed to an advisee in various embodiments. By way of example without limitation, characterizations could include any one or combination of stressed, agitated, emotional, anxious, excited, angry, happy, nervous, tense, relaxed, calm, guarded, pensive, non-English accent, ethnicity, good lead, neutral, non-lead, and/or the like. Characterizations could correspond to one or more categories of advisees scores attributed to advisees, advisee metrics, and/or the like. As disclosed herein, various embodiments may provide for any one or combination of facial expression analysis, determination of a state, a characteristic, and/or change of an advisee, voice and/or language analysis, environmental analysis, advisee history analysis, and/or the like.

As additionally disclosed herein, certain embodiments may provide for advisee equipment configuration analysis. As indicated by block 1202, in some embodiments, information about the capabilities of the advisee's computing device and/or communication medium may be processed. In various embodiments, the platform may retrieve, push, pull, and/or otherwise identify information about the capabilities of the advisee's computing device and/or communication medium. For example, the platform may request information from the advisee's communication device. With some embodiments, such information could be provided at least partially by way of the client application on the communication device. In some cases, such information could be available at least partially through another application that indicates communication options such as video communication in conjunction with telephone communication. In some embodiments, the advisee may be prompted for at least part of such information preliminary to communication with a particular advisee or at a time corresponding to communication with a particular advisee.

As indicated by block 1204, in some embodiments, information about the capabilities of the advisor's computing device and/or communication medium may be processed. Such information could be retrieved from one or more repositories of the system, the information having been previously acquired for particular advisors. For example, as part of the advisor onboarding process, the platform may retrieve, push, pull, and/or otherwise identify information about the capabilities of the adviser's computing device and/or communication medium. In some embodiments, the advisor may be prompted for at least part of such information as part of onboarding. In some embodiments, information previously acquired particular advisors could be verified periodically and/or at a time corresponding to communication with a particular advisee. In some embodiments, such information may not have been previously acquired, but may be acquired at a time corresponding to communication with a particular advisee.

As indicated by block 1206, in some embodiments, the information about the advisee-side capabilities may be correlated to the information about the advisor-side capabilities. Comparing and matching capabilities may determine the various options available to the advisor and advisee. As indicated by block 1208, communication options may be determined. The communication options available may be determined based at least in part on the capabilities of the advisor and/or advisee. For example, the capabilities common to both the advisor and the advisee may dictate a set of available communication options. Such a set of available communication options may be refined in some cases. The communication options available may be determined based at least in part on a set of options appropriate for the particular advisor based at least in part on an advisor category pertinent to the advisor. In some cases, the set of appropriate category-specific options and the set of available communication options may be refined to identify communication options that are both available and appropriate for the particular advisor based on one or more advisor categories. Having identified one or more categories pertinent to the advisor based on category and association information retained in the one or more repositories, category information may include information about appropriate communication options for the category. For example, such category information for a plumber may indicate that basic communication options are appropriate, such as voice, perhaps in conjunction with video and/or messaging. Category information for other types of advisors may indicate the need for more advanced communication options. For example, it may be appropriate for a therapist to have not only video conferencing, but also higher resolution video capabilities (e.g., to allow for more sensitive expression analysis), biofeedback capabilities, and/or the like. In some embodiments, communication options may be automatically selected; in some embodiments, communication options may be presented for user selection by one or both of advisor and advisee.

As indicated by block 1210, data about advisees may be captured. Such data may include any suitable information that may be captured to indicate, infer, and/or determine attributes of advisees. Various non-limiting examples are disclosed herein. By way of example without limitation, such data may include any one or combination of voice data, ambient sound data, location data, demographic data, video/image data, equipment data, physiological sensor data, activity sensor data, and/or the like.

As indicated by block 1212, captured data may be used to qualify advisees. Communication data, such as data associated with a phone call or any other means by which an advisee contacts an advisor, depending on the embodiment, can be broken down and assessed based on any one or combination of various factors, such as, for example, distance of the caller from the business associated with the callee, demographic information of the caller, a voice analysis, video/image analysis, environmental analysis, and/or the like. Based on such indicia, an advisee can be qualified.

Certain embodiments may employ communication references 434 that can be used as call tracking numbers, as discussed herein. Based in part on the call tracking number received by the system, monitoring of the call may be performed. As discussed herein, certain embodiments may use a client application 351 installed on the mobile computing device 102 to facilitate data capture. In some embodiments, the client application 351 may qualify captured data in part or in whole and/or send captured data to the information handling system 106 for qualification. As discussed herein, certain embodiments may route calls and/or provide communication connections, which may facilitate data capture. In various embodiments, calls may be recorded, monitored, selectively/partially sampled, and/or the like via the client application 351 and/or the information handling system 106 on the backend.

The information handling system 106, which may be or include an advertising platform, may be configured to qualify advisees. In some embodiments, the processes for qualifying advisees may be performed in whole or in part by the information handling system 106. Though certain aspects of advisee qualification may be performed by the information handling system 106, the processes for qualifying advisees may be performed in whole or in part by a client application 351 installed on the end-user communication device 102 and/or the advertiser communication device 122 in some embodiments. In some embodiments, a client application 351 installed on the mobile communication device 102 and/or 122 may facilitate an advisee data capture process. The advisee data capture process may include any one or combination of various embodiments as discussed herein that track information and/or the like. The information handling system 106 may receive and process data regarding an end user in implementing the advisee data capture process. And, having advisee data, the information handling system 106 may implement an advisee qualification process 1212.

Some embodiments may qualify an advisee according to a graduated lead scale. Any suitable scale may be used in various embodiments. In some embodiments, a scale could entail a categorization scheme 1214, with categories such as stressed, agitated, emotional, anxious, excited, angry, happy, nervous, tense, relaxed, calm, guarded, pensive, non-English accent, ethnicity, good lead, neutral, and non-lead, or any suitable categories. In some embodiments, a scale could entail an advisee scoring system 1216. The advisee scoring system 1216 could be correlated to the category scheme in some embodiments, such that certain scores correspond to certain categories. For example, in some embodiments, an advisee calling a representative of a service provider may be evaluated for lead potential. A lead score may be an assessment of a caller's potential to be a good lead, i.e., a likelihood to conduct business or otherwise bring in business. Accordingly, a lead score may indicate which callers are more likely than others to bring in business, thus providing a quantitative estimate of the probability that a given caller will provide business. As another example, in some embodiments, an advisee's voice volume and/or modulation may be evaluated, with a volume score and/or a modulation score being correlated to certain categories. As some possible examples out of many possibilities, higher volumes could be indicative of emotion, anger, etc.; lower volumes could be indicative of timidity, lack of confidence, guardedness, etc.; higher modulation could be indicative of happiness or other positive states, etc.

Some embodiments may score an advisee with a numerical expression, for example, with respect to certain categories. By way of example without limitation, a scale could include a range of scores from 0 to 100, or from 0 to 1,000, with the high end of the scale indicating greater probability. Some embodiments may use methods of statistical analysis to derive a score that is indicative of one or more categories. Various embodiments may determine one or more scores based on any one or more suitable quantifiers.

In some embodiments, the information handling system 106 may implement an advisee data logging process 1220. Information about an advisee may be retained as an advisee profile. An advisee profile may include indication of the corresponding advisee as having a record qualified by the system. The qualification process 1212 could take into account previously logged advisee data about a particular advisee. Thus, the information handling system 106 may implement an advisee data search process 1218. Accordingly, certain embodiments may provide for reliable identity matching and qualifying in view of historical data about advisees.

Figure 13:
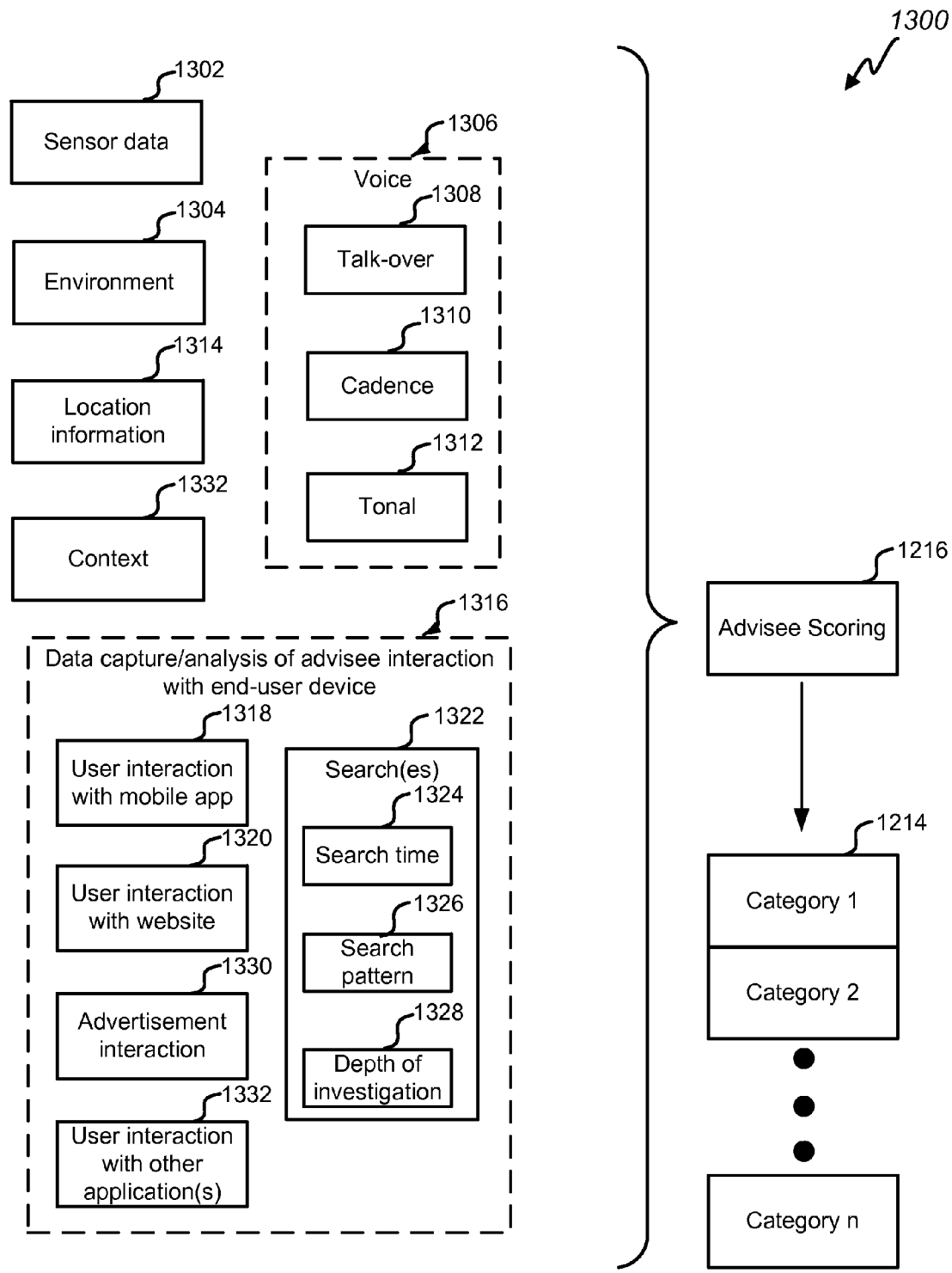
FIG. 13 depicts a functional block diagram of certain aspects of advisee data capture and qualification, in accordance with certain embodiments of the present disclosure.

FIG. 13 depicts a functional block diagram of certain aspects of advisee data capture and qualification 1300, which may correspond to certain aspects of the advisee data capture process 1210 and the advisee qualification process 1212, in accordance with certain embodiments of the present disclosure. Some embodiments may employ a decision tree, checklist, workflow, and/or the like to capture various aspects of advisee data and assess those aspects to infer advisee qualification. Such a decision tree, checklist, and/or workflow may incorporate any one or combination of the depicted aspects and/or similar aspects in any desired order, according to various embodiments.

In various embodiments, sensor data analysis 1302 may be provided for sensor data captured in accordance with any one or combination of the sensor embodiments disclosed herein. Advisee data, which may include sensor data, can be consolidated and processed to yield an advisee score 1216. Any one or combination of types of advisee data may be captured and qualified. The scores 1216 may be correlated with one or more categories 1214, which could correspond to one or more characterizations. The platform may perform a category-specific assessment to determine whether a cumulative score meets or exceeds a category-specific threshold.

In addition to or alternative to sensor data analysis 1302, some embodiments may employ an environmental analysis 1304 and/or a voice analysis 1306, which are disclosed herein. Additionally, the voice analysis could include talk-over analysis 1308. Instances of an advisee talking over and/or interrupting the advisor may be taken as indicative of high emotional levels. For example, an advisee that talks over the advisor may be upset, angry, etc. However, which such characteristics may be indicative of emotional states, it may not always be dispositive, and thus may be taken into account in conjunction with other indicia in determining whether a particular characterization is to be attributed to a particular advisee. Instances of talk-over/interruption may be correlated to one or more scores, with greater extents of talk-over/interruption being correlated with greater scores.

In some embodiments, a voice analysis could include cadence analysis 1310. Indicia of cadence characteristics may be correlated to scores, thresholds, and/or categories. For example, an advisee with one or more certain cadence characteristics such as speaking in a manner that is one or more of halting, choppy, abrupt, not smooth, pause-ridden, etc. may indicate tension, such as nervousness. Slowness of speech could be considered as indicative of pensiveness. Silence on the part of the advisee for a certain minimum time period after the advisor has spoken could be taken as indication of emotion. In some embodiments, a voice analysis could include tonal analysis 1312. For example, tonal characteristics such as relatively high modulation could be taken as indicative of more positive mental/emotional states, such as happiness. A monotone quality could be taken indicia of lower states. In some embodiments, different scores, thresholds, and/or categories could be implemented based on the gender of the advisee. For example, female-specific analysis may allow for higher voice pitches relative to male-specific analysis. In some embodiments, different scores, thresholds, and/or categories could be implemented based on accent of the advisee. For example, accent-specific analysis may allow for higher or lower speaking paces based on certain accents and corresponding ethnicities.

As indicated by block 1314, in some embodiments, location information may be captured to provide an indication of the end-user's location. As discussed herein, various embodiments may employ any one or combination of methods of capturing location information, including but not limited to, gathering location information via any one or combination of the communication device 102, 122, such as the device GPS capabilities, access points, third parties, determining the area code associated with the device, differentiating between whether a caller uses a landline or wireless network, receiving explicit location information with one or more search requests, inferring location information from one or more search requests, identifying a caller/user profile that includes location information and is associated with an end-user, and/or the like. Gathering of location information may be facilitated by the application 351 of the end-user device sending tracking information to the information handling system 106. In some embodiments, gathering of location information may be performed before an end-user places a call, for example, via the mobile application. In addition or in the alternative, gathering of location information may be performed concurrent with a call and/or after a call. Various location quantifiers could be assigned to a user based on the service provider of interest. For example, with some service providers, proximate location of a callee is important, say, for a plumber for example. With other service providers, proximate location of a callee may not be so important. As an example, a number of points could be assigned to the caller based on an identification of the importance of proximity to the advisor/category of interest and the location information gathered for the caller.

In some embodiments, as indicated by block 1316, an end-user's interaction on the mobile communication device may be captured as advisee data of interest. For example, as indicated by blocks 1318 and 1320, in some embodiments, advisee interaction with the mobile application 351 and/or website provided by the system may be captured. As indicated by block 1322, the advisee interaction may involve one or more searches. An advisee, for example, may spend significant time searching for an advisor. Say the user spends 10 minutes searching for a plumber in a certain geographic area, say Glendale, Calif., before contacting a particular plumber. As indicated by block 1324, the amount of time may be taken into account as an indicator of relatively greater interest. The time spent searching a particular category of advisors could be correlated to an increased indicator of interest in any suitable manner. Merely by way of example, a number of points could be assigned to an advisee based on the time spent searching. Various interest quantifiers could be assigned to an advisee based on search time in a proportionate manner. For example, a number of points could be assigned for every minute of search time. Various interest quantifiers could be assigned to a user based on the advisee meeting any one or combination of various thresholds of search time. As an example, a number of points could be assigned after the advisee accrues 5 minutes of search time.

As indicated by block 1326, in some embodiments, a search pattern may be taken into account as advisee data of interest. The search focus or non-focus may be considered. Certain embodiments could differentiate between searches to detect a pattern of searches corresponding to a given category of searches. For example, a user might spend 5 minutes of searching, viewing results, linking to provider websites, reading reviews, etc., all related to a particular category of advisors, say plumbers in a particular geographic area. Such search time could be distinguished from non-focused searching, such as searching related to various categories, which might not be related. In such cases, no additional points or lower number points may be assigned.

As indicated by block 1328, in some embodiments, a depth of investigation may be taken into account as advisee data of interest. Stated otherwise, the depth of searching may be taken as an increased level of interest. For example, an advisee that seems to scrutinize advisor reviews may be assigned a greater number of points than an advisee who does not. Scrutiny of reviews could be assessed by not only accessing review information, but also time spent viewing review information and/or the advisee selecting one or more options indicating that one or more advisor reviews were helpful, where such user selectable options are available (e.g., "yes"/"no" options selected in answer to the presented question of "Was this review helpful?").

As indicated by block 1330, in some embodiments, advisee interaction with advertisements may be taken into account as advisee data of interest. An advisee's interaction with one or more other advertisers could be captured as the mobile application 351 may be configured to gather tracking information about an advisee's interaction with advertisements are presented to an advisee via the mobile application 351 and/or other applications of the mobile communication device 102, as indicated by block 1332. In some embodiments, the mobile application receives, pulls, extracts, and/or listens to information from one or more other applications of the mobile communication device 102 to gather tracking information.

Some embodiments may capture previous indications of pertinent interests by advisees which may be related to interacting with advertisements, shopping, and/or browsing. For example, certain purchases made by an advisee with the mobile communication device may be relevant to certain advisor categories. As one possible example, an advisee may purchase a new showerhead or lavatory online, which purchases could be correlated to an advisor category of, say, plumbing, home remodeling/repair, handymen, and/or the like. As another possible example, an advisee could be browsing offerings of such products, and such browsing could likewise be associated with an indication of interest. Any one or combination of the foregoing bases could be used to increase an advisee score 1216 with respect to one or more categories 1214.

As indicated by block 1334, in some embodiments, context of the advisee may be inferred or otherwise determined. Such context as information about the area of an advisee, demographic data about the area/advisee, history for a particular area, history for particular advisees, and/or the like. The context information could be correlated to an advisee category to gauge relevance of the context information to the advisor category, and to adjust an advisee score 1216 accordingly. For example, certain area distinctions may be indicia of a good lead. For example, a certain area of town could be known to generally have a lot of plumbing issues. Say a plumber receives a call from the area, the knowledge of the area correlated to the service provider business could indicate that the call is likely to be a good lead. Information about various areas could be gathered by the information handling system, for example, by analysis of call data, crawling for information, feedback from advisors, from third party providers, and/or the like.

Referring again to FIG. 12, in some embodiments, the information handling system 106 may implement business rules 1222 to take action based at least in part on the qualification and expose or otherwise notify the advisor of pertinent information, for example, via the advisor interface. The business rules 1222 may be based at least in part on a set of rules appropriate for the particular advisor based at least in part on an advisor category pertinent to the advisor. As indicated by block 1224, information based at least in part on the advisee qualification may be provided. In various embodiments, the information may include any one or combination of captured advisee data, advisee categorization information, advisee scoring information, other advisee qualification data, advisee history information, advisee location information, advisee demographic information, one or more metrics relating to the advisee, sensor data, recommendation, and/or the like. In some embodiments, one or more action items, explanations, and/or other potentially relevant information may be identified. Having identified one or more characterizations of the advisee, specific action items pertaining to the one or more characterizations may be identified. Explanations and/or other potentially relevant information pertinent to the scoring, the categories, the action items, and/or the like could be selected by the system and modified with specific analysis particulars to accompany the action items in order to provide context and insight to the advisor for consideration in view of the advisee.

In some cases, the set of appropriate category-specific rules and the qualification may be used to identify one or more recommendations for the advisor. For example, say an advisee contacts the advisor that is an HVAC provider, the voice analysis indicates stress the voice of the advisee, the category-specific rules may correlate that stress indication to a person possibly in urgent need of service, and may provide for indication of such to the advisor in any suitable fashion, for example, by indicating that stress is detected and that the person may be in need. Continuing the example, the environmental analysis may detect ambient noise correlate it to children crying in the background and a context of stress. The category-specific rules may correlate that stress indication to a person possibly in urgent need of service, and may provide for indication of such to the advisor in any suitable fashion. Continuing further, the location analysis and the category-specific rules may indicate that the particular neighborhood of the advisee has been experiencing HVAC problems in a recent time period. This may also be indicated to the advisor. One or more recommendations can be formulated based on the category-specific rules and the qualification. The recommendation could take the form of providing any suitable information to the advisor regarding the advisee. The recommendation could be a suggestion as to how to handle the advisee. For example, the HVAC service provider could be informed that the advisee may be in a stressful state, may be in need of urgent service, may be a strong lead, and should be handled with a calm and reassuring manner. Other types of suggested action items could include things for the advisor to mention, such as extended hours, emergency services, offers, catchphrases (e.g., appropriate words to address the advisee's situation or to sell the advisor's services in view of the advisee's situation), referrals (e.g., to another provider in the case of the advisor not being able to assist in timely fashion), and/or the like, which could be tailored to the advisee based at least in part on the advisee qualification. Other types of suggested action items could include certain communication and/or analysis options that would benefit the advisee and/or advisor. For example, certain advisors could benefit from video communication to allow for more analysis of the advisee; certain advisors could benefit from image options for capturing images, say, of plumbing problems, kitchen remodel ideas that could be pulled from other websites, for example, for mutual viewing and possibly markup/annotation by advisor and/or advisee; certain advisors could benefit from biometric sensor data of the advisee's communication device; etc. In some embodiments, a decision tree for the advisor may be generated based at least in part on ranked recommendations. In certain cases, there may be a multiplicity of potential action items that an advisor may take based on the advisee qualification. The potential action items could be ranked based on the positive impact that each action item would likely have on the advisee. Additionally or alternatively, the potential action items could be ranked based on cost/ease of the action items. For example, things to mention could be identified as no-cost action items that may improve the interaction, whereas communication and/or analysis options could be available at a cost. The easiest/no-cost/low-cost action items could be identified in the decision tree before the more involved and higher-cost action items. The decision tree could rank actions and sub-actions. For example, certain sub-actions may only be appropriate if certain actions (say, image analysis options) are selected.

Certain embodiments according to the present disclosure may provide for on-demand gaming assistance. Certain embodiments may provide gaming assistance from a game assistance provider via audio and/or video communications means. In some embodiments, an audio/video plugin may be provided to a remote interaction system, such as an online gaming environment. In the example of online gaming, such features may allow a remote game assistance provider, such as a gamer master, to be an instant helper to a player of a video game. A game player may have difficulty advancing beyond a particular game stage. With certain embodiments, the gamer master and the player could have a sidebar discussion and/or presentation, for instance, to individually assist the player to advance beyond the player's current stage in the game. Certain embodiments may provide portals for game assistance providers to assist game players.

Certain embodiments provide for means to collect and retain informative content regarding a player. Certain embodiments may include a game assistance provider platform that may provide service-valuable information for viewing by a game assistance provider. Certain embodiments may provide service-valuable information in real time. Certain embodiments may provide features that allow a game assistance provider to manage a communication flow with a player and player context to facilitate identification of a player's need and provision of advice regarding the player's need.

Various embodiments will now be discussed in greater detail with reference to the accompanying figures, beginning with FIG. 14.

Figure 14:
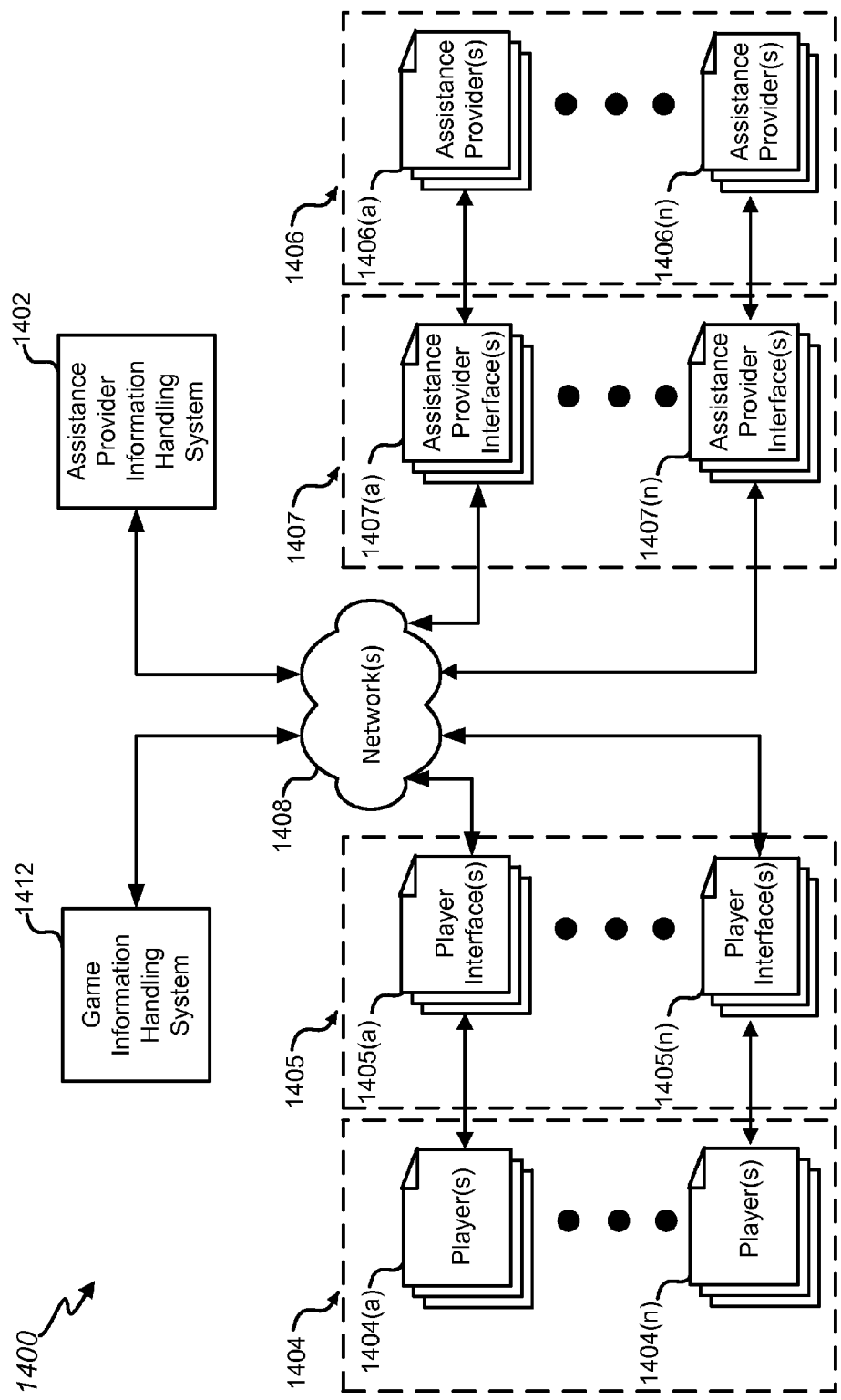
FIG. 14 depicts a high-level block diagram of a system, in accordance with certain embodiments of the present disclosure

FIG. 14 depicts a high-level block diagram of a gaming system 1400, in accordance with certain embodiments of the present disclosure. The example depicted provides one high-level configuration, but, in light of the present disclosure, various embodiments may be used with systems having different configurations and/or different components. The components illustrated may represent physical and/or functional components or groupings of components in the gaming systems 1400. In various embodiments, the gaming system 1400 may allow for interaction between two or more of player interface(s) 1405, player(s) 1404, game assistance provider interface(s) 1407, game assistance provider(s) 1406, an assistance provider information handling system 1402, and/or a game information handing system 1412. As depicted, various elements of the gaming system 1400 may be communicatively coupled or couplable to a network.

With various embodiments of the present disclosure, gaming assistance features may be provided for various types of video games, including console-based video games and/or online video games. The providing of assistance for various types of video games can be facilitated by one or more elements of the gaming system 1400. For example, the video games could include one or more of: action games, such as shooter games, first-person shooter games, third-person shooter games, massively multiplayer online games, and fighting games; adventure games; action-adventure games; sports games; strategy games; role-playing games; simulation games; social simulation games; puzzle games; educational games; and/or the like. In some embodiments, the gaming system 1400 may provide online gaming services. An on-line gaming service may include one or more of site(s), server(s), and/or service(s) that provide or facilitate video game play. On-line games can range from rather simplistic games to complex games involving sophisticated graphics and virtual worlds populated by many players simultaneously. Online communities may be associated with certain on-line games.

The one or more networks may be any suitable means to facilitate data transfer in the system 1400. In various non-limiting embodiments, the network may be implemented with one or more of the Internet, a wide area network (WAN), a local area network (LAN), a wireless local area network (WLAN), a metropolitan area network (MAN), a cellular network, such as through 4G, 3G, GSM, etc., another wireless network, a gateway, a conventional telephone network, or any other appropriate architecture or system that facilitates the communication of signals, data, and/or message. The network may transmit data using any suitable communication protocol. The network and its various components may be implemented using hardware, software, and communications media such as wires, optical fibers, microwaves, radio waves, and other electromagnetic and/or optical carriers; and/or any combination of the foregoing. The player interface(s) 1405, player(s) 1404, game assistance provider interface(s) 1407, game assistance provider(s) 1406, a assistance provider information handling system 1402, and/or a game information handing system 1412 may be communicatively coupled or couplable to the network via any suitable communication paths that support the communication protocol(s) used in the various embodiments. In some embodiments, any combination of the components of system 1400 may be communicatively coupled directly or otherwise via separate and/or direct communication paths of the one or more networks 1408.

In some embodiments, the game information handing system 1412 may include one or more network-connected servers that control and/or facilitate game operations. In some embodiments, the game information handling system 1412 may control interactions among certain components of game system 1400. The game information handling system 1412 may transmit game content to one or more player interfaces 1405. The game content may include one or more of graphics, executable program code, game data, and other information related to a particular game. The game information handing system 1412 may include one or more game controllers that instruct one or more game servers to provide content for one or more games to the player interfaces 1405. In some embodiments, the game information handing system 1412 may host one or more players 1404. In some embodiments, the game information handing system 1412 may simultaneously host players 1404 to allow game system 1400 to be used to support one or more online multiplayer games. In various embodiments, the game information handing system 1412 may be separate from or integrated with the assistance provider information handling system 1402. Thus, in some embodiments, the game information handing system 1412 may include the assistance provider information handling system 1402, or vice versa.

In certain embodiments, a player interface 1405 and/or a game assistance provider interface 1407 may include any computing device of a player 1404 and/or a game assistance provider 1406 suitable for sending and receiving information over a network in accordance with embodiments described herein. The one or more player interfaces 1405 may include a network-enabled consumer electronic device configured to execute a set of software applications that enable a user to play a video game. In some embodiments, a player interface 1405 may include a computing device having a video display output. In some embodiments such one or more computing devices can include, for example, one or more video game consoles, desktop computers, mobile phones, cellular telephones, smartphones, handheld mobile devices, tablet computers, web pads, personal digital assistants (PDA), notebook computers, handheld computers, laptop computers, and/or the like. In some embodiments, a player interface 1405 may include at least a portion of software required to execute one or more games stored on removable media, such as a CD-ROM, DVD-ROM, magnetic disk, and/or the like. In some embodiments, software required to execute one or more games may be stored in persistent memory installed in the computing device, such as a magnetic or optical disk drive, a read-only memory (ROM) or a flash memory. In some embodiments, at least a portion of the software required to execute one or more games may be accessed by computing device from one or more servers and may be downloaded to the computing device. Further, a player interface 1405 and/or a game assistance provider interface 1407 may include any suitable components to facilitate communication in accordance with various embodiments disclosed herein. Thus, by way of non-limiting example, a player interface 1405 and/or a game assistance provider interface 1407 may include components to facilitate videoconferencing, such as, for example, video input components (e.g., a video camera, webcam, and/or the like), video output components, audio input components (e.g., a microphone and/or the like), audio output components (e.g., speakers and/or the like), etc.

In various embodiments, the player interface(s) 1405 and/or game assistance provider interface(s) 1407 may include any suitable input/output module or other system/device operable to serve as an interface between game assistance providers 1406, players 1404, the game information handling system 1410, and/or the assistance provider information handling system 1402. The player interfaces 1405 and/or game assistance provider interfaces 1407 may facilitate communication over the network via any suitable transmission protocol and/or standard. In various embodiments, the assistance provider information handling system 1402 may include, provide, and/or be configured for operation with the player interfaces 1405 and/or game assistance provider interfaces 1407, for example, by making available and/or communicating with one or more of a website, a web page, a web portal, a web application, a mobile application, enterprise software, and/or any suitable application software. In some embodiments, a player interface 1405 and/or game assistance provider interface 1407 may include an application programming interface (API).

In some embodiments, a player interface 1405 and/or a game assistance provider interface 1407 may include a web interface. In some embodiments, the player interface 1405 and/or game assistance provider interface 1407 may include or work with an application made available to one or more interfaces 1405, 1407. In some embodiments, the player interface 1405 and/or game assistance provider interface 1407 may cause a web page to be displayed on a browser of a game assistance provider 1406. The web page(s) may display output and receive input from a user (e.g., by using Web-based forms, via hyperlinks, electronic buttons, etc.). A variety of techniques can be used to create the web pages and/or display/receive information, such as JavaScript, Java applications or applets, dynamic HTML and/or AJAX technologies. Accordingly, the assistance provider information handling system 1402 may have web site/portals giving access to information, such as a game assistance provider portal.

In various embodiments, a player interface 1405 and/or a game assistance provider interface 1407 may include providing one or more display screens that may each include one or more user interface elements. A user interface may include any feature configured to provide information to and/or receive information from a user. In some embodiments, for example, the user interface can be configured to provide an output to the user in any desired form including, for example, text and/or image. The user interface may include one or more widgets, text, text boxes, text fields, tables, grids, charts, hyperlinks, buttons, lists, combo boxes, checkboxes, radio buttons, and/or the like.

According to certain embodiments, the assistance provider information handling system 1402 may be or include a game assistance platform. A game assistance provider 1406 may access the assistance provider information handling system 1402 via a game assistance provider interface 1407. The player 1404 may access the assistance provider information handling system 1402 via the player interface 1405. The assistance provider information handling system 1402 may facilitate searching of one or more information repositories in response to information received over the network from the player interfaces 1405 and/or game assistance provider interfaces 1407. In various embodiments, the assistance provider information handling system 1402 may include any device or set of devices configured to process, send, receive, retrieve, detect, generate, compute, organize, categorize, qualify, store, display, present, handle, or use any form of information and/or data suitable for the embodiments described herein.

The assistance provider information handling system 1402 may include a single computing device or multiple computing devices, which, in some embodiments, may be implemented in or with a distributed computing and/or cloud computing environment. The assistance provider information handling system 1402 may include one or more processing resources communicatively coupled to one or more storage media, random access memory (RAM), read-only memory (ROM), and/or other types of memory. The assistance provider information handling system 1402 may include any one or combination of various input and output (I/O) devices, network ports, and display devices.

In certain embodiments, the assistance provider information handling system 1402 may be communicatively coupled or couplable to one or more data sources (not shown). The one or more data sources may include any suitable source of data. In various embodiments, the one or more data sources may include one or more of a database, a website, any repository of data in any suitable form, and/or a third party. With some embodiments, the data sources may include one or more mobile computing device locator services that provide information regarding the location of one or more player interfaces 1405. With some embodiments, the data sources may provide various details relating to call data. With some embodiments, the data sources may provide caller name information from calling name delivery (CNAM), also known as caller identification or caller ID, which information may be used to determine particular details about the caller. With some embodiments, the data sources may provide information about the area in which the caller is located. With some embodiments, the data sources may provide demographic data about an area.

In various embodiments, the data from the one or more data sources may be retrieved and/or received by the assistance provider information handling system 1402 via the network and/or through any other suitable means of transferring data. For example, in some embodiments, the assistance provider information handling system 1402 and the data sources could use any suitable means for direct communication.

According to certain embodiments, data may be actively gathered and/or pulled from one or more data sources, for example, by accessing a third party repository and/or by "crawling" various repositories. With some embodiments, the data pulled and/or pushed from the one or more data sources may be made available to the assistance provider information handling system 1402 for user(s) of the player interfaces 1405 and/or game assistance provider interfaces 1407. In alternative embodiments, data from the one or more data sources may be made available directly to the player interfaces 1405 and/or game assistance provider interfaces 1407.

In some embodiments, game assistance providers 1407 and players 1404 may communicate via Voice Over Internet Protocol (VoIP) technology with their respective interfaces. A player 1404 and a game assistance provider 1406 may be communicatively coupled through switches of the network 108, which may, in some embodiments, include switches of a public telephone network. In some embodiments, one or more game assistance providers 1406 could be contacted by a player 1404 and/or the assistance provider information handling system 1402 via various media channels, such as email, chat, instant message, etc., and in some embodiments, a game assistance provider 1406 could respond via various media channels including, for example, email, chat, instant message, etc.

The assistance provider information handling system 1402 may include one or more processors communicatively coupled to one or more memories. The assistance provider information handling system 1402 may include one or more network interfaces communicatively coupled to the one or more processors. The one or more network interfaces may include any suitable input/output module(s) or other system(s)/device(s) operable to serve as one or more interfaces between the assistance provider information handling system 1402 and the network 108. The assistance provider information handling system 1402 may use the one or more network interfaces to communicate over the network 108 using any suitable transmission protocol(s) and/or standard(s).

In some embodiments, one computer system implements one or more of the components of the system 1406. Alternatively, in one embodiment, different processes running on one or more shared computers may implement some of the components of the system 1406. In one embodiment, for example, one computing module, thread, or process may implement multiple of the components of the system 1406. In some embodiments, special purpose data processing systems implement the one or more of the components of the system 1406. In some embodiments, processes running according to software instructions on general purpose data processing systems, such as general purpose personal computers or server computers, can implement the components of the system 1406. Thus, the implementations are not limited to particular hardware, software, or particular combinations of hardware and software.

The assistance provider information handling system 1402 may include one or more communication servers. The one or more communication servers may include one or more web servers, one or more email gateways, one or more instant messaging gateways, one or more telephone gateways, one or more other gateways, such as television gateways, and/or one or more of any other types of servers, such as, for example, an application gateway to interface with different servers. Some embodiments may use one type of communication server, such as a web server, to receive search requests and another type of communication server to provide the search results. Some embodiments may use different types of communication servers to service different types of player interfaces 1405.

In some embodiments, the assistance provider information handling system 1402 may provide for the selection and provision of advertisements to one or more of player interfaces 1405. The assistance provider information handling system 1402 may include one or more advertising servers that may transmit advertising data to one or more player interfaces 1405. In certain embodiments, one or more game assistance providers 1406 may have advertisements that may be placed in-game and made available to one or more player interfaces 1405. The placement of the advertisements may be in accordance with one or more of paid placement arrangements and one or more advertising models.

In some embodiments, a server may communicate with a computing devices 1405 and/or 1407 via HyperText Transfer Protocol (HTTP) and/or other types of communication protocols, such as File Transfer Protocol (FTP), Wireless Application Protocol (WAP), etc. A web server may provide static web pages, dynamic web pages, and/or web services. In some embodiments, a web server may provide web applications to a computing device 1405, 1407 for execution in a web browser running on the computing device 1405, 1407; and the web applications may include scripts for execution within an isolated environment in a browser. In some embodiments, the web server may provide rich-client applications to the computing device 1405, 1407; and the rich-client application may be programmed to have access to functions of the operating system running on the computing device 1405, 1407.

The assistance provider information handling system 1402 may include one or more data repositories. In some embodiments, data repository(ies) may include one or more player information repositories. In some embodiments, a computing device 1405 may store player information. In some embodiments, both the computing device 1405 and the online data repository(ies) can store the player information for a particular player 1404. In some embodiments, when there is a data communication connection between the computing device 1405 and the online data repository(ies), the computing device 1405 and the online data repository(ies) may synchronize their copies of the player information for the player 1404. The player information may be associated with the corresponding players 1404. In some embodiments, a player 1404 may create corresponding player information. The one or more data repositories may include data reflecting account information for game assistance providers, account information for game players, assistance provided by game assistance providers, compensation/incentives/rewards allotted to game assistance providers, payment due from assisted game players, and/or the like.

In some embodiments, data repository(ies) may include one or more game assistance provider information repositories. In some embodiments, a computing device 1407 may store game assistance provider information, including, for example, game assistance provider profiles. The provider information may be associated with the corresponding providers 1406. In some embodiments, both the computing device 1407 and the online data repository(ies) store the provider information for a particular provider 1406. In some embodiments, when there is a data communication connection between the computing device 1407 and the online data repository(ies), the computing device 1407 and the online data repository(ies) may synchronize their copies of the provider information for the provider 1406. In some embodiments, a provider 1406 may create corresponding provider information.

The data repository(ies) may be implemented in various ways in different embodiments. In one embodiment, for example, one or more data processing systems may store player and/or provider information. For example, one or more relational or object-oriented databases, or flat files on one or more computers or networked storage devices, may store player and/or provider information. In some embodiments, a centralized system stores player and/or provider information; alternatively, a distributed/cloud system or network-based system, such as is implemented with a peer-to-peer network or Internet, may store information.

In some embodiments, the assistance provider information handling system 1402 may include one or more call handling modules. The call handling module(s) may be configured to one or more of decode, route, and redirect calls from end users to game assistance providers. Aspects of the call handling module(s) are discussed in further detail herein. In some embodiments, a search engine may retrieve information from the data repository(ies) according to a search request from a game assistance provider and/or a phone call or other communication from a player.

In various embodiments, one or more of a location engine, the call handling module(s), and/or other modules, such as a voice recognition system and/or other modules implementing features disclosed herein, may be stored in the one or more memories and may include one or more software applications, executable by the processors, for receiving and processing data. In some embodiments, one or more of the location engine, the call handling module(s), and/or other modules, such as a voice recognition system and/or other modules disclosed herein, may comprise one or more servers communicating with the communication server(s). The server communication may be over a network, such as a local area network, a wide area network, an intranet, Internet, and/or the like. Any one or combination of the various servers may run on common or separate computers. In some embodiments, there may be one or more layers of application servers between the communication server and the data repository(ies) to process the business logic and data access of the rich client applications. Alternatively, application servers may be integrated with the communication servers, such as the web servers. Certain embodiments are not limited to a particular type of connections among the communication servers, the location engine, search engine, the data repository(ies), and/or other modules.

In some embodiments, the assistance provider information handling system 1402 may include one or more location engine(s). The location engine can be configured to determine the location of the user. An indication of a location corresponding to a player 1404 may be used to determine an appropriate game assistance provider for the player's geographic location. For example, a Spanish-speaking game assistance provider may be matched with a player located in a Spanish-speaking region. An indication of a location corresponding to a player 1404 could also be used to determine an appropriate means of communication, such as determining an appropriate telephone connection for a particular region. In some embodiments, the location engine(s) may include one or more engines and may use GPS coordinates, cellular tower triangulation techniques, Wi-Fi-based location information, carrier-provided location information, and/or other location determination systems to identify a location of the computing device 1405. In some embodiments, the location engine determines a location corresponding to the player 1404 related to a phone call initiated with the computing device 1405. The location may be based on a location of the computing device 1405. In some embodiments, a location may be based on player information stored for a particular player 1404 and associated with identification information of the player 1404 or the computing device 1405. In some embodiments, the player 1404 may provide some or all of the player information used in determining the location.

In some embodiments, the location engine may automatically identify the player location based on determining the current location of the computing device 1405 that is used to submit a search request and/or initiate a phone call. For example, the location engine may determine the location of the computing device 1405 based on a connection point the computing device 1405 used to access the network (e.g., based on the location of a wireless network access point, a base station of a cellular communication system, or a connection point to a wired network). In some embodiments, the computing device 1405 automatically determines its current position (e.g., via a satellite positioning system, or a cellular positioning system) and transmits the determined or estimated position to the web server with the search request, or provides the position in response to a request from the location engine.

Figure 15:
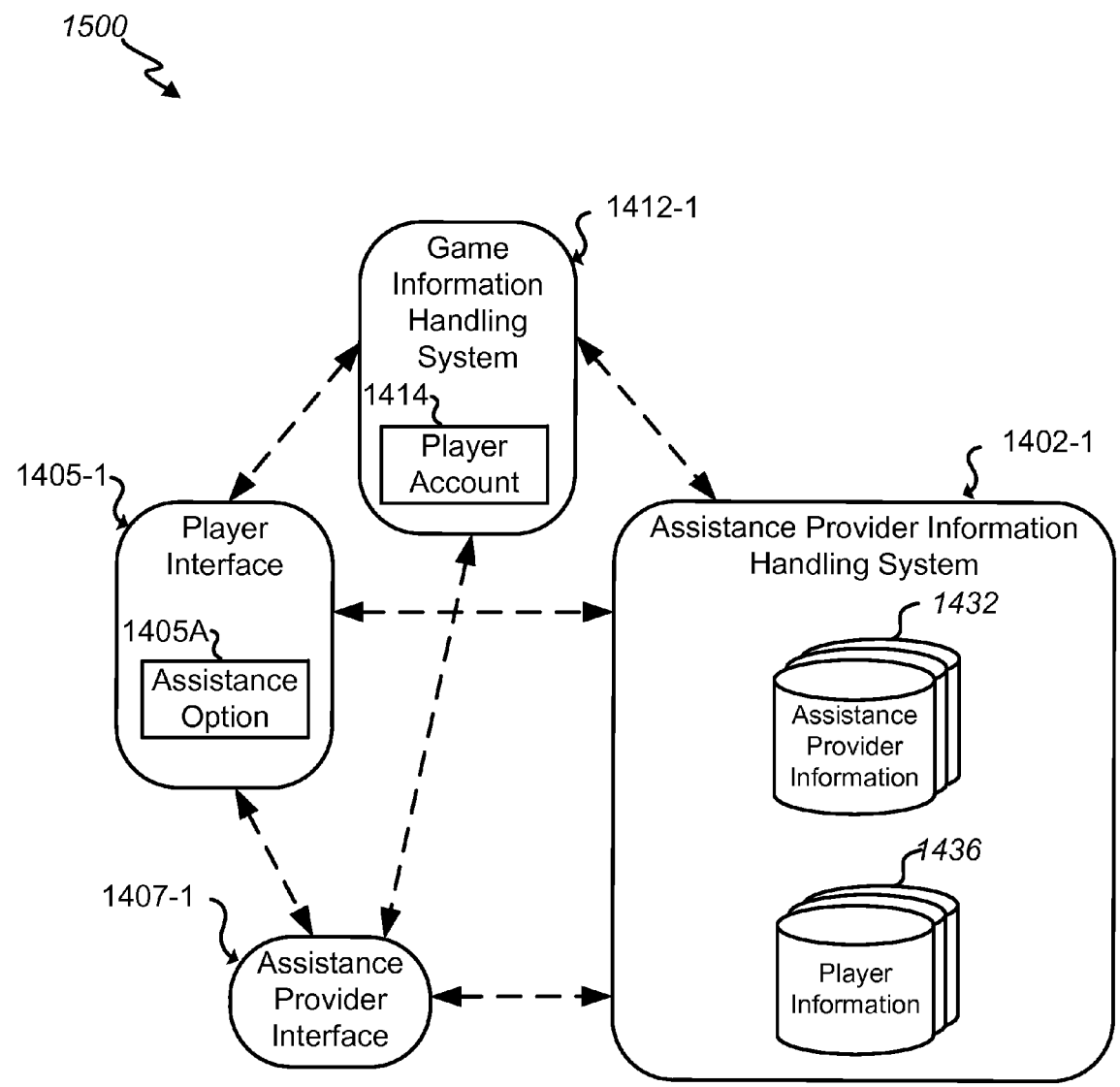
FIG. 15 depicts a high-level block diagram of a system, in accordance with certain embodiments of the present disclosure.

FIG. 15 is a diagram of a system 1500, in accordance with certain embodiments of the present disclosure. A player interface 1405 may include one or more assistance options 1405A. An assistance option 1405A may include one or more of a user-selectable option and/or an advertisement. In some embodiments, the assistance provider information handling system 1402 may receive messages from the game information handling system 1412 and/or the player interface 1405 based on events that occur at the player interface 105, such as game information and/or a player selecting a user-selectable option.

The assistance option 1405A may facilitate the provision of gaming services to a player. Gaming services that a game assistance provider may provide according to various embodiments may include any suitable service or combination of services according to various embodiments. Some embodiments may allow a game assistance provider to provide advice to the game player. Some embodiments may allow a game assistance provider to provide demonstrations to the game player. Some embodiments may allow a game assistance provider to remotely view and/or control a player's interface. Some embodiments may allow a game assistance provider to provide guidance via a sidebar chat between the game assistance provider and the player. In some embodiments, for example, video/chat connections could be provided on-demand. Some embodiments may facilitate a game assistance provider entering a game to assist the player as a companion character and/or guide. Some embodiments may facilitate a game assistance provider's linking to recorded video game tutorials, which could include captured clips of demonstrations by the game assistance provider or others. Communication between a player and a game assistance provider may be established via telephonic connection, chat connection, game voice chat, private chat, video chat, videoconferencing, videophone calls, web conferencing, and/or the like so that the player may indicate a service need and so that the service may assist.

Certain embodiments may provide for one- or two-way video communication between a game assistance provider and a player. In some embodiments, a video chat session could be established between the game assistance provider and the player. A video chat session may include a two-way, interactive live communication stream in which images from at least one camera on one computing device are sent for display to an opposite end of the communication path in order to be displayed. A video chat session can include one- or two-way video that can provide live communication. In one embodiment, a video chat session can include, for example, audio, voice, or text messaging.

In some embodiments, a live stream video or a still image of a game assistance provider or player could be provided to the player or game assistance provider. In some embodiments, the live stream video or still image of the game assistance provider or player can be presented in an overlay or window in conjunction with the video game view. The player or game assistance provider can, in some embodiments, view the live stream video or still image prior to a two-way chat session or other two-way communication session. In some embodiments, the communication and/or initiation between game assistance provider and player may involve sending an electronic mail message, text (SMS) messages, social media messages, text chat, voice chat, video chat, and/or the like as a message with the interface element to initiate the video chat session. Consequent to user selection, a message can be sent from the computing device through the network, which can include, for example, cellular telephone stations, web servers, etc. A web server could open a new port of communication between a video conferencing server and the computing device so that live video of the game assistance provider and player may be exchanged.

In some embodiments, any one or combination of various gaming services may be presented to a player, which services can be associated with the same or varying prices. In some embodiments, the price of the services can vary based on the amount of service provided, the amount of time of provided service, the type of provided service, the result of the provided service, available assistance resources, the type of connection associated with the service, and/or any other desired factor. In some embodiments, a time tracking indicator could be presented to a player to indicate time associated with a service provided to the player. In some embodiments, a set of one or more price levels corresponding to different media connections may be dynamically determined based at least in part on one or more of available bandwidth, monitoring of connection quality, device capabilities of the player, device capabilities of the service provide, and/or the like. In some embodiments, one or more service upgrades may be presented to a player (e.g., based on device capability, bandwidth, etc.). Any suitable pricing may be tied to a service upgrade, and corresponding price/charge confirmations could be presented to a player.

A player may have a player account 1414 associated with an online store, the game information handling system 1412 (as depicted), and/or the game assistance provider information handling 1402. The player account 1414 may include or be associated with a payment account. The player could be charged for service rendered by a game assistance provider via the player's game account 1414 and/or payment account.

In some embodiments, and, in some embodiments, at a different price including, for example, a higher price, a player can request a video chat with a game assistance provider in order to facilitate more effective assistance sessions. An interface may be provided to the player so that the player can initiate a video chat session, for example, by selecting an interface element. The initiation of the chat session could correspond to a proposed chat session being indicated to the game assistance provider. The game assistance provider could be presented with a user-selectable option to accept the proposed chat session such that two-way chat can be established. A selectable option to decline a proposed video chat session could be presented to the game assistance provider.

Similarly, an interface may be provided to the game assistance provider so that the game assistance provider can initiate a video chat session, for example, by selecting an interface element. The initiation of the chat session could correspond to a proposed chat session being indicated to the player. A selectable option to decline a proposed video chat session could also be presented to the player.

In some embodiments, the user-selectable option may be to establish communication with a game assistance provider.

The user-selectable option may be provided in-game or out-of-game. In some embodiments, a user-selectable option to establish communication with a game assistance provider may be built into a game. For example, a game may come with a user-selectable option preprogrammed into the game. A game may include built-in user-selectable option capabilities, such as may be included in advertising capabilities, that may have the ability to connect to servers via a network in order to update and/or replace the user-selectable option, for example, with selected advertisements.

In some embodiments, a user-selectable option may be inserted into a game, for example, at run time. In some embodiments, the assistance provider information handling system 1402 may be configurable to send configuration information for a user-selectable option to the player interface 1405, either directly or indirectly, for example, by way of the game information handling system 1412. For example, the assistance provider information handling system 1402 could send configuration information to the game information handling system 1412 for conveyance to the player interface 1405. The configuration information may include any suitable information such as a communication reference to configure the user-selectable option so as to facilitate communication with a game assistance provider.

In some embodiments, one or more advertisements may be inserted in-game to advertise services that may be provided by a game assistance provider to a player. In some embodiments, the assistance provider information handling system 1402 may be configurable to send targeted advertising content for one or more player interfaces 1405, either directly or indirectly, for example, by way of the game information handling system 1412. For example, the assistance provider information handling system 1402 could send advertising content to the game information handling system 1412 for conveyance to the player interface 1405.

In some embodiments, additional software may be installed, for example, via download, by a game player and/or a game assistance provider to insert a user-selectable option, an advertisement, and/or facilitate communication. The additional software may be implemented according to any suitable techniques, and may facilitate communications using any suitable protocols and techniques. Selected function calls to an execution platform for the player interface can be used to provide a user-selectable option, an advertisement, and/or facilitate communication. For example, calls relating to graphics rendering, game logic processing, user input recognition, and/or the like could be selected and used. In some embodiments, a plugin may be provided to the player interface 1405. The plugin may provide the user-selectable option or may be provided in response to a selection of the user-selectable option to establish communication between the player interface 1405 and the game assistance provider interface 1407. The plug-in may include a set of software components that enable the communications.

In some embodiments, one or more advertisements may be selected and/or generated based on the game. The assistance provider information handling system 1402 could receive game information from the game information handling system 1412 and/or the player interface 1405 that may be used to select and/or generate advertisements. The game information could be updated periodically. The assistance provider information handling system 1402 could base advertising content at least in part on the game information.

In some embodiments, one or more game assistance providers may be matched to a particular game. In one exemplary embodiment, a set of game assistance providers may be selected by the system as having expertise in the game. One or more game assistance provider information repositories 1432 may retain game assistance provider information for particular game assistance providers. The repositories 1432 may retain any suitable information related to game assistance providers, including game assistance provider profiles. For example, one or more game assistance provider information repositories 1432 may retain any information related to game assistance provider identification information, game assistance provider profiles, game assistance provider certification information, game assistance provider pricing information, game assistance provider authentication information, game assistance provider statuses, game assistance provider relationships, payment methods, accounting information, credit information, location information, contact information, user account information, advertisements, announcements, and/or the like. After a game has been identified, one or more game assistance provider profiles may be searched for indications of expertise corresponding to the identified game. In some embodiments, these indications of expertise can comprise a binary indication of whether the game assistance provider is qualified to provide assistance in the identified game, and in some embodiments, these indications of expertise can comprise an indication of the game assistance provider's level of expertise in the game. In some embodiments, indications of the game assistance provider's level of expertise can advantageously be used to match the game assistance provider's abilities to the player's needs. In some embodiments, this can allow the efficient allocation of assistance resources, and can allow for differential assistance pricing based on the level of expertise of the game assistance provider's abilities. In some embodiments, one or more game assistance providers may be selected based upon a number of parameters, such as player and/or provider demographic information, player and/or provider geographic location, player and/or provider history, and/or the like.

One or more player information repositories 1436 may retain any information related to consumer identification information, consumer notification profiles, consumer requests, consumer authentication information, payment methods, accounting information, contact information, user account information, and/or the like. In some embodiments, a computing device 1405 may store the player information repository 1436. In some embodiments, both the computing device 1405 and the online data repository can store the player information stored in the player information repository 1436. In some embodiments, when there is a data communication connection between the computing device 1405 and the online data repository, the computing device 1405 and the online data repository may synchronize their copies of the player information for the player 1404.

In some embodiments, one or more advertisements may be selected and/or generated based on player's progress and/or location in the game. In some embodiments, for example, the game information received by the assistance provider information handling system 1402 can indicate a player's location and/or progress in the game. For example, game information could include one or more game state definitions that indicate or could be used to derive a point where a player is in the game and/or the player's degree of progress in the game. In some embodiments, a game state may be derived from one or more of function calls, commands, and/or user inputs made in execution of the video game, graphics data for rendering, and/or any data captured at run time. In some embodiments, for example, this game progress information can additionally be used to calculate the rate of the player's progress through the game, which rate can be compared to player information indicating the player's average rate of progress through the game and/or through games generally. Game progress information could indicate if a player is struggling with a certain portion of a game, and in some embodiments, can be used as a trigger to provide, advertise, and/or recommend game assistance services.

A user-selectable option and/or an advertisement may include a communication reference for establishing communication with a game assistance provider and/or initiating a flow that leads to a communication session with a game assistance provider. In some embodiments, a communication reference may include a link that, when selected, launches a browser (or browser window) and retrieves content available on the web. In some embodiments, a communication reference may include a link to establish communication via telephonic connection, chat connection, game voice chat, private chat, video chat, videoconferencing, videophone calls, web conferencing, and/or the like. The communication references may allow routing of communications between end-user devices. A communication reference could protect privacy with respect to normal contact information. A communication reference could include an alias to facilitate consumer-game assistance provider communication. In various embodiments, a communication reference may include a text number, a click-to-text option, a phone number, a click-to-call option, an email address, a click-to-email option, and/or the like. In some embodiments, a communication reference may facilitate a click-to-call feature presented to the player. In some embodiments, a communication reference may be an encoded target phone number. Encoded target phone numbers may allow the association of additional information with the target phone numbers, such as the media channels used, special promotions, etc. In some embodiments, an end-user computing device may be able to initiate a phone call (e.g., automatically dialing according to the encoded phone number embedded in the content information when a user selects the number).

In some embodiments, a service may include a feature that allows a game assistance provider to view at least a portion of the screen display that a game player is viewing. For example, a user-selectable option may be presented to a player for the player to allow a game assistance provider to view at least a portion of the player's viewing screen. The remote viewing of the screen by the game assistance provider may be in conjunction with any of various communication means. The game assistance provider may orally assist the player while remotely viewing the player's screen view. For example, the game assistance provider may be in audio communication with the game player via a telephonic connection or via an audio connection provided through the gaming service. For example, a game assistance provider could use audio channels provided with a game platform to provide audio connections between players of a multiplayer game. A game assistance provider could use the same or similar audio channels to communicate with the assisted game player.

In some embodiments, a game assistance provider may be have remote control of the player's computer device and/or game interface over a network, which control can be, in some embodiments, granted by the player. A game assistance provider could temporarily utilize remote control features to provide a demonstration to the player, advance the player a certain extent in the game, act as a tag-team partner for the player, and/or the like. In some embodiments, the extent of the remote control may be complete control or partial control over the game player's interaction with the video game, and/or control that is simultaneous with the game player's control over the video game. Any one or more of various user-selectable options may be presented to the game player so that the game player can allow a suitable level of control to the game assistance provider.

In various embodiments, remote control of the game for the game player could be based on any suitable application sharing protocol, application sharing API, peer-to-peer protocol, and/or the like. A game assistance provider could connect to the player's computing device for a remote session. A remote session could be established responsive to a player selection of a user-selectable option. In some embodiments, a game assistance provider may send a player a connection invitation (e.g., an invitation file, a password, etc.) to establish a remote session. Such assistance by a game assistance provider could be in conjunction with one or more other services provided by the game assistance provider. In some embodiments, a live stream video or a still image of a game assistance provider or avatar could be presented to the player as an overlay on the player's screen while the game assistance provider is assisting.

Some embodiments may allow a game assistance provider to join a multiple player game as a player and assist the game player requesting assistance. For example, after joining, the game assistance provider may team up with the player and aid the player in any suitable manner. The game assistance provider may act as a guide, a helper, a team member, partner, and/or the like to assist the game player in-game.

In some embodiments, a message may be sent to the game player and/or game assistance provider to indicate coordination information that may assist the game player and game assistance provider in virtually meeting in the video game. For example, coordination information may include identification information about the game player and/or the game assistance provider to facilitate mutual identification of the players' characters in-game. Coordination information could include location information. For example, location information could indicate a place in the virtual world where the game player and the game assistance provider could meet. The location information could give a reference point, such as, for example, by the fountain in the northwestern region of level four, as a virtual rendezvous point.

Coordination information could be conveyed via any suitable communication means, including, for example, text, chat, an audio channel of the gaming service, a push notification, a messaging channel of the gaming service, and messaging channel of the game, and messaging overlay inserted in-game, etc. Accordingly, after the game player and the game assistance provider meet, the game assistance provider may act as a guide, a helper, a team member, partner, and/or the like to assist the game player in game.

In some embodiments, a game player may be charged for the assistance, for example, based on a flat fee, a rate for the amount of time the provider assists, and/or the like. In some embodiments, a game assistance provider may be credited for the assistance, for example, based on a flat fee, a rate for the amount of time the provider assists, and/or the like.

One or more game assistance providers may be matched to the particular game, or to the point where the player is in the game. A set of game assistance providers may be selected by the system as corresponding to game assistance providers that have corresponding expertise. In some embodiments, matching game assistance providers may be compiled and presented to the player, for example, responsive to the player's selection of an option.

A game assistance provider profile could indicate a level of expertise with a gradated expertise scale. Any suitable scale may be employed. For example, a one-to-ten scale, a one-to-five scale, a one-to-four stars scale, a low-medium-high scale, and/or the like could be used to indicate expertise levels ranging from sufficient expertise with the game to consummate expertise. In some embodiments, levels of expertise could be indicated for various points in the game. A game assistance provider's expertise could be assessed for any suitable aspect of a game, including, for example, various levels, worlds, characters, abilities, settings, and/or the like.

The expertise scale could be based at least in part on a self-assessment by game assistance providers, and in some embodiments, the expertise scale could be based on objective indicators of the game assistance provider's expertise level. When a game assistance provider creates a profile, user-selectable options could be presented, allowing the provider to indicate one or more games with which the provider has expertise and to provide a self-assessment in those one or more games. The user-selectable options could present an expertise scale that allows the provider to indicate his level expertise with a particular game. In some embodiments, a game assistance provider could provide information relating to past gaming experience during the creation of his profile. In some embodiments, for example, this can include information relating to the game assistance provider's progress through one or more games, and his level of expertise in one or more games. In some embodiments, this information relating to past gaming experience can be used to select a verification sequence from the indicated one or more games that the game assistance provider can complete to verify his level of expertise.

In some embodiments, a game assistance provider's expertise could be based at least in part on customer ratings. The customer ratings could be included in the provider profile or otherwise associated with the profile. After a game assistance provider has assisted a customer, the customer may be presented with an option to review the provider. In some embodiments, a service completion could be indicated by the game assistance provider. After a service completion is confirmed, in some embodiments, the indication of service completion may trigger a notification to the consumer. The platform may automatically send a notification prompting the consumer to provide a review of the game assistance provider. The notification could be sent in-game or outside of the game at any suitable time, immediately upon completion of the service or later. Any suitable means of notification could be used, including, for example, e-mail communication, text communication, push notification, a message via the user account, web communication, voice communication, and/or the like. The consumer may follow an included communication reference to the platform and provide the review, or, in some embodiments, the consumer may provide the review by replying to the message via the same means. One or more review options may be presented to allow the consumer to rate and/or write a review of the game assistance provider. The consumer could indicate a level of expertise with a gradated expertise scale. Any suitable scale may be employed. Incentives and/or rewards may be awarded to users to provide encouragement and/or payment for providing a review on a game assistance provider.

In some embodiments, a score could be assigned to a game assistance provider that takes into account one or more of a self-assessment, objective indicators of expertise, and customer reviews. In some embodiments, these different factors can be weighted differently to place emphasis and/or bias based on either game expertise or customer experience. In one embodiment, for example, the customer reviews could be weighted more heavily than the self-assessment and the objective indicators of expertise. For example, the customer reviews could be weighted to account for a majority of the score, such as, for example, seventy-five percent of the score.

Figure 16:
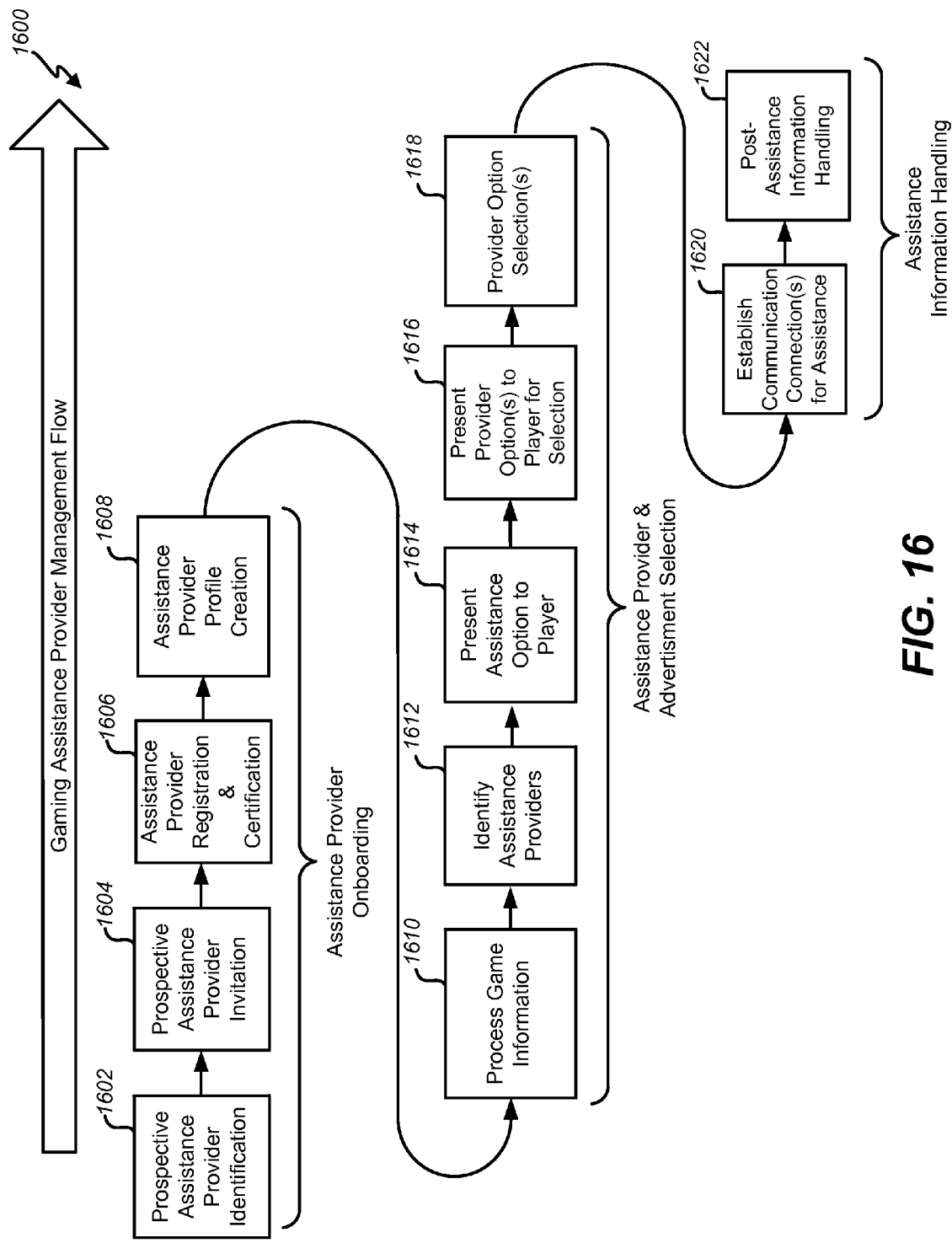
FIG. 16 is a block diagram that illustrates certain aspects of a game assistance provider management lifecycle, in accordance with certain embodiments of the present disclosure.

FIG. 16 is a block diagram 1600 that illustrates certain aspects of a game assistance provider management lifecycle, in accordance with certain embodiments of the present disclosure. Diagram 1600 may represent an overview of certain aspects of such a lifecycle, including overall flow(s) involved. Teachings of the present disclosure may be implemented in a variety of configurations. As such, the order of the aspects comprising the lifecycle may be shuffled in any suitable manner and may depend on the implementation chosen. Moreover, while the following aspects may be separated for the sake of description, it should be understood that certain steps may be performed simultaneously or substantially simultaneously.

One aspect of the life cycle may correspond to a set of interactions with a prospective game assistance provider in an onboarding phase. In some embodiments, the onboarding phase of the life cycle may include a prospective game assistance provider identification stage, as indicated by block 1602. A prospective game assistance provider may include a game assistance provider that has not yet been approved for participating in a game assistance provider program according to certain embodiments. A prospective game assistance provider may include a game assistance provider that has yet to pass a certification process in order to participate in the program. In some embodiments, a prospective game assistance provider may be identified by the system. In one embodiment, for example, the system can be configured to evaluate player information for indications of expertise in one or more games. In one embodiment, for example, the system could detect a certain amount of proficiency that a prospective game assistance provider may have with a particular game and/or a particular portion of the game. Proficiency may be determined based at least in part on one or more of a player profile exhibiting the player's experience (e.g., a player profile could indicate the player's status, record, or other history in the game), a player's current achievements (e.g., a current score recently achieved, a performance recently exhibited, such as completing a portion of the game while meeting a certain threshold of time, score, etc.), and/or the like.

In some embodiments, the onboarding phase of the life cycle may include a prospective game assistance provider invitation stage, as indicated by block 1604. For example, in some embodiments, an advertisement may be selected and/or generated based on the identification of a prospective game assistance provider, and directed to the prospective game assistance provider. The advertisement may advertise an opportunity for the prospective game assistance provider to provide gaming services. The advertisement may include a user-selectable option for the prospective game assistance provider to initiate a process of becoming a certified game assistance provider.

The onboarding phase of the life cycle may include a game assistance provider registration and certification stage, as indicated by block 1606. The game assistance provider interface provided by the platform may facilitate the onboarding phase. In various embodiments, a game assistance provider interface may provide one or more display screens that may each include one or more user interface elements. A game assistance provider interface may include any text, image, and/or device that can be displayed on a display screen for providing information to a user and/or for receiving user input. A game assistance provider interface may include one or more widgets, text, text boxes, text fields, tables, grids, charts, maps, hyperlinks, buttons, lists, combo boxes, checkboxes, radio buttons, and/or the like.

In some embodiments, one or more automated process flows may facilitate the provisioning of prospective game assistance providers with accounts and registration. Game assistance provider accounts may be created in various ways in various embodiments. For example, account creation may be initiated by the system. The system could initiate onboarding by automatically identifying the game assistance provider and presenting a prospective game assistance provider a communication reference, such as a link, inviting the prospective game assistance provider to register and create an account.

Certain embodiments may provide for a certification process that is automatically triggered by registration. Certification may include one or more of background checks, criminal record checks, validating identities, and/or the like. A certification process could be performed at least in part by a third party, in some embodiments. Once the certification process has been triggered by registration, the system 1402 may automatically generate one or messages, seeking one or more of various certification checks from one or more data sources. In some embodiments, one or more page flows may be provided for conveying results of the certification checks to the system 1402. In some embodiments, the system 1402 may be configured to extract pertinent information from a data source repository and/or message sent to the system 1402.

The certification process may include determining a legal status of a prospective game assistance provider including, for example, determining whether the prospective game assistance provider is allowed to work. In some embodiments, this determination can include determining the age and/or citizenship/immigration status of a prospective game assistance provider and determining whether the age and/or citizenship/immigration status allows the prospective game assistance provider to work. In some embodiments, compensation can vary based on, for example, the age of the prospective game assistance provider. Legal restrictions may prohibit providing underage game assistance providers certain types of compensation, incentive, and/or rewards, but not other types. For example, game credits could be given to those who cannot receive monetary compensation for their services, whereas monetary compensation could be provided to others.

In some embodiments, any one or combination of compensation, incentives, and/or rewards may be awarded to users to provide encouragement and/or payment for providing gaming assistance services. By way of non-limiting example, compensation, incentives, and/or rewards may include one or more of: money, account credit, purchasing card credit, points, lives, credits, cheat codes, unlock codes, health points, hit points, status, experience points or levels, gifts, games items (such as elixir, buildings, weapons, farm animals, and cars), decorations, trinkets, game players (e.g., draft picks) or allies, and game-related merchandise. In some embodiments, for example, in which a computer game and/or gaming platform has an associated online store or the like through which additional content, such as downloadable content and in-game items or abilities, may be purchased, the computer game or gaming platform can maintain a game account for the user which includes information about purchased content and available content for games played by the user, game progress information, such as game save data, trophy/achievement data, and other information about the games. In some embodiments, the computer game or gaming platform could likewise maintain information on compensation, incentives, and/or rewards associated with an account for a user.

Once a prospective game assistance provider has passed the certification process, the certified game assistance provider may be able to participate in the program. The certified game assistance provider may be indicated in the system 1402 as being certified. For example, a business relationship attribute stored in the system 1402 and associated with the game assistance provider may be updated accordingly. In some cases, manual intervention may be required for final review and approval before participation is allowed. For instance, a notification could be automatically generated and sent to an administrator responsive to the business relationship being updated to certified status.

The onboarding phase of the life cycle can include a game assistance provider profile creation stage, as indicated by block 1608. The game assistance provider profile creation stage may include a process of ensuring that a game assistance provider fills out a provider profile completely. A game assistance provider profile may include information regarding a game assistance provider's hours of availability, specialties, proficiencies, types of payments that are receivable, contact information, notification preferences, device configurations/capabilities, billing information, certification information, information on locations, and/or the like. A game assistance provider profile may include persistent information that is maintained about a game assistance provider. A game assistance provider profile may include any data stored in a game assistance provider information repository whether or not it is part of the profile as shown to a game assistance provider via a game assistance provider portal. In some embodiment, a game assistance provider may be able to indicate, in the provider profile, specific services that the game assistance provider provides. The game assistance provider could also indicate, implicitly or explicitly, specific services which the game assistance provider does not provide.

In some embodiments, the platform may send a notification to a game assistance provider, which notification, for example, could be provided via a game assistance provider dashboard provided via the platform. However, any suitable means of notification may be employed. For example, text, voice, e-mail, alerts with the application, and/or the like could be used. The notification could include a link or other communication reference referring back to the platform, prompting the provider to respond. For example, the notification could provide a link for users to log into the platform to respond. In some embodiments, the game assistance provider may respond via the same medium in which the notification was sent (e.g., text, voice, e-mail, etc.), and the system 1402 may process the response, extracting requested information.

In some embodiments, certain price constraints may be specified for certain providers. The price constraints may be specified for certain services. A constraint could be imposed on game assistance providers to maintain certain prices for certain services so that, if a service need arises, an available game assistance provider would be limited by the price constraint. In some embodiments, the price constraints could be specified in the provider profile.

One aspect of the life cycle may correspond to a game assistance provider and advertisement identification phase. The game assistance provider selection phase of the life cycle may include a game information processing stage, as indicated by block 1610. As discussed herein, the assistance provider information handling system 1402 could receive game information from the game information handling system 1412 and/or the player interface 1405. The game information could be updated periodically. The assistance provider information handling system 1402 could base advertising content at least in part on the game information. Game information received by the assistance provider information handling system 1402 could indicate a player's location in the game and/or the player's progress in the game. Game progress information could indicate if a player is struggling with a certain portion of a game. For example, game information could include one or more game state definitions that indicate or could be used to derive a player's location in the game and/or the player's progress in the game. In some embodiments, a game state may be derived from one or more of function calls, commands, and/or user inputs made in execution of the video game, graphics data for rendering, and/or any data captured at run time.

The game assistance provider and advertisement selection phase of the life cycle may include a game assistance provider identification stage, as indicated by block 1612. One or more game assistance providers may be matched to a particular game as having expertise with respect to the game or, more specifically, a certain aspect of the gamer that a player is struggling with. The game information may be used to identify appropriate game assistance providers. One or more game assistance provider profiles may be searched for indications of expertise corresponding to the identified game. In some embodiments, one or more game assistance providers may be selected based upon a number of parameters, such as player and/or provider demographic information, player and/or provider geographic location, player and/or provider history, and/or the like. As discussed herein, a game assistance provider profile and/or customer ratings could indicate a level of expertise with a gradated expertise scale and could be bases for identifying a game assistance provider.

In some embodiments, a game assistance provider interface may include a user-selectable availability option to indicate whether the game assistance provider is available or not available to respond to service requests. The availability option may include a real-time toggle option enabling the game assistance provider to toggle between being available or unavailable on demand. The availability option may include calendaring features that enable the game assistance provider to calendar any suitable time period as available or unavailable. Accordingly, only those game assistance providers that are indicated as available may be identified in some embodiments.

The game assistance provider and advertisement selection phase of the life cycle may include an assistance option presentation stage, as indicated by block 1614. As discussed herein, an assistance option may include one or more of a user-selectable option and/or an advertisement. In some embodiments, an assistance option may be selected and/or generated based on the game. Game information may be used to select and/or generate advertisements In some embodiments, a search interface may be presented to the player to facilitate searching for a game assistance provider. For example, the player could pause the game to search for a game assistance provider. With the search interface, the player may input search criteria corresponding to a service need, and game information may be based at least in part on the criteria. In various embodiments, a search interface may include providing one or more display screens that may each include one or more user interface elements. A search interface may include any text, image, and/or device that can be displayed on a display screen for providing information to a user and/or for receiving user input. A search interface may include one or more widgets, text, text boxes, text fields, tables, grids, charts, maps, hyperlinks, buttons, lists, combo boxes, checkboxes, radio buttons, and/or the like. In some embodiments, an assistance option presentation stage may be prior and/or subsequent to one or more game information processing stages.

The game assistance provider and advertisement selection phase of the life cycle may include a provider option presentation stage, as indicated by block 1616. The platform may present a set of available game assistance providers corresponding to the user's service need from which the player may select a game assistance provider. Any suitable game assistance provider listing information could be made available to the player for informative selection, including expertise identification and ratings, customer ratings, relevancy scores, etc. The set of available game assistance providers could be ranked according to one or more such bases and presented in a ranked order. Various sorting options may be presented to the user for sorting the list of game assistance providers so that the list could be sorted according to any suitable basis. The game assistance provider listings may be presented with links to corresponding game assistance provider profiles, reviews, videos, etc. In some embodiments, any one or combination of various gaming services may be presented to a player with the same or varying prices accorded to the service.

The game assistance provider and advertisement selection phase of the life cycle may include a provider option selection stage, as indicated by block 1618. A player may select a particular game assistance provider and/or services. Certain embodiments may present a list of game assistance providers and/or services to a player to allow the player make selections of one or more game assistance providers and/or services.

One aspect of the life cycle may correspond to a set of interactions with a prospective game assistance provider in an assistance information handling phase. The assistance information handling phase of the life cycle may include a communication connection establishing stage, as indicated by block 1620. As discussed herein, communication between a player and a game assistance provider may be established via telephonic connection, chat connection, game voice chat, private chat, video chat, videoconferencing, videophone calls, web conferencing, and/or the like so that the player may indicate a service need and so that the service may assist. In various embodiments, any suitable means of communication may be employed to enable a game assistance provider and player to hold a dialogue in order to both identify the player's need and provide the best response to it. The game assistance provider and/or player may obtain an image, a video, a live stream, etc. to facilitate communication. This may include provision of a communication reference for establishing communication with a game assistance provider and/or initiates a flow that leads to a communication session with a game assistance provider. In some embodiments, a communication reference may include a link that, when selected, launches a browser (or browser window) and retrieves content available on the web. In some embodiments, a communication reference may include a link to establish communication via telephonic connection, chat connection, game voice chat, private chat, video chat, videoconferencing, videophone calls, web conferencing, and/or the like. The communication references may allow routing of communications between end-user devices. In various embodiments, a communication reference may include a text number, a click-to-text option, a phone number, a click-to-call option, an email address, a click-to-email option, and/or the like. In some embodiments, a service may include a feature that allows a game assistance provider to view at least a portion of the screen display that a game player is viewing. In some embodiments, a game assistance provider may be allowed to have remote control of the player's computer device and/or game interface over a network. Some embodiments may allow a game assistance provider to join a multiple player game as a player and assist the game player requesting assistance.

The assistance information handling phase of the life cycle may include a stage directed post-assistance information handling for a selected game assistance provider and a player, as indicated by block 1622. In some embodiments, a time tracking indicator could indicate time associated with a service provided to the player. A financial engine associated with the player's account and/or the assistance provider's account can track the player's service selections, service durations, and/or the like for one or more games. Purchases can be charged to the player's account, and compensations/rewards can be credited to the assistance provider's account. The financial engine may be configured to perform some or all the functionality associated with financial transactions with services provided.

After the job has been completed, in some embodiments, the game assistance provider may confirm the service completion via the game assistance provider interface either on the game assistance provider's initiative and/or responsive to a follow-up message sent by the platform. In some embodiments, the platform may automatically send a follow-up message to the game assistance provider, requesting confirmation of whether a service was completed.

After a service completion is confirmed, in some embodiments, the indication of job completion may trigger a notification to the player. The platform may automatically send a notification prompting the player to provide a review of the game assistance provider. The player may follow an included communication reference to the platform and provide the review, or, in some embodiments, the player may provide the review by replying to the message via the same means. A submission of a review may automatically trigger the allotting of a reward to the player.

Certain embodiments may provide for tracking of information regarding players. Tracked information could include information relating to equipment that a player uses and has used to interface with one or more game assistance providers. For example, information about the specific devices, device configurations, and/or device capabilities that a give player uses could be tracked and retained in a repository. Such tracked information for a particular player could be made available to a game assistance provider before, during, and/or after an assistance session for the player. In some embodiments, such player-related information could be provided by the player, the game assistance provider, and/or via automatic detection by the system. For each player, a dossier could be compiled and made available to a game assistance provider to facilitate assistance the player.

In various embodiments, a game assistance provider platform may track calls, messages, billing, etc. and enable game assistance providers to interact with the platform to retrieve, see, and use the data. A feed of information and/or a dashboard could be in a web portal and/or provided via a mobile application. The game assistance provider could customize the dashboard and/or the feeds and what can be ignored, although default templates may be supplied.

In some embodiments, a game assistance provider and/or a player may be using a computing device executing an application module ("app") via which the computing device may communicate with the platform. A game assistance provider and/or a player could download an app to his or her computing device that can function to facilitate assistance sessions. With certain embodiments, a mobile application may be made available for execution on a mobile computing device to provide various features described herein. Various embodiments may include a specific purpose-based mobile application or a mobile application integrated with various other mobile application features.

Certain embodiments may provide for player history analysis. Certain embodiments may provide for a player history engine that manages, collects, retrieves, updates, and/or retains information relevant to a particular player. Certain embodiments may automatically identify a caller, correlate the caller to a player profile, and provide player profile information to the game assistance provider to enrich the assistance session by making player profile information available to the game assistance provider. Player profile information may provide the game assistance provider with valuable context.

Certain embodiments may allow a game assistance provider to record player information in a repository for later reference. Such provision of historical information particular to a player may allow the game assistance provider to provide information appropriate for the player's specific needs. Certain embodiments may provide system features that automatically analyze and present historical information for a player, for example, via the game assistance provider dashboard. The analysis of the information may include comparison of current information to past information for the player.

Certain embodiments may provide for player equipment configuration analysis. The particular information available to and game assistance provider may depend on the capabilities and configuration of the media used. In some embodiments, the platform may retrieve and/or identify information about the capabilities of the player's computing device and/or communication medium, assess the capabilities against various analytical possibilities of a given game assistance provider, and present capability information to the game assistance provider.

Figure 17:
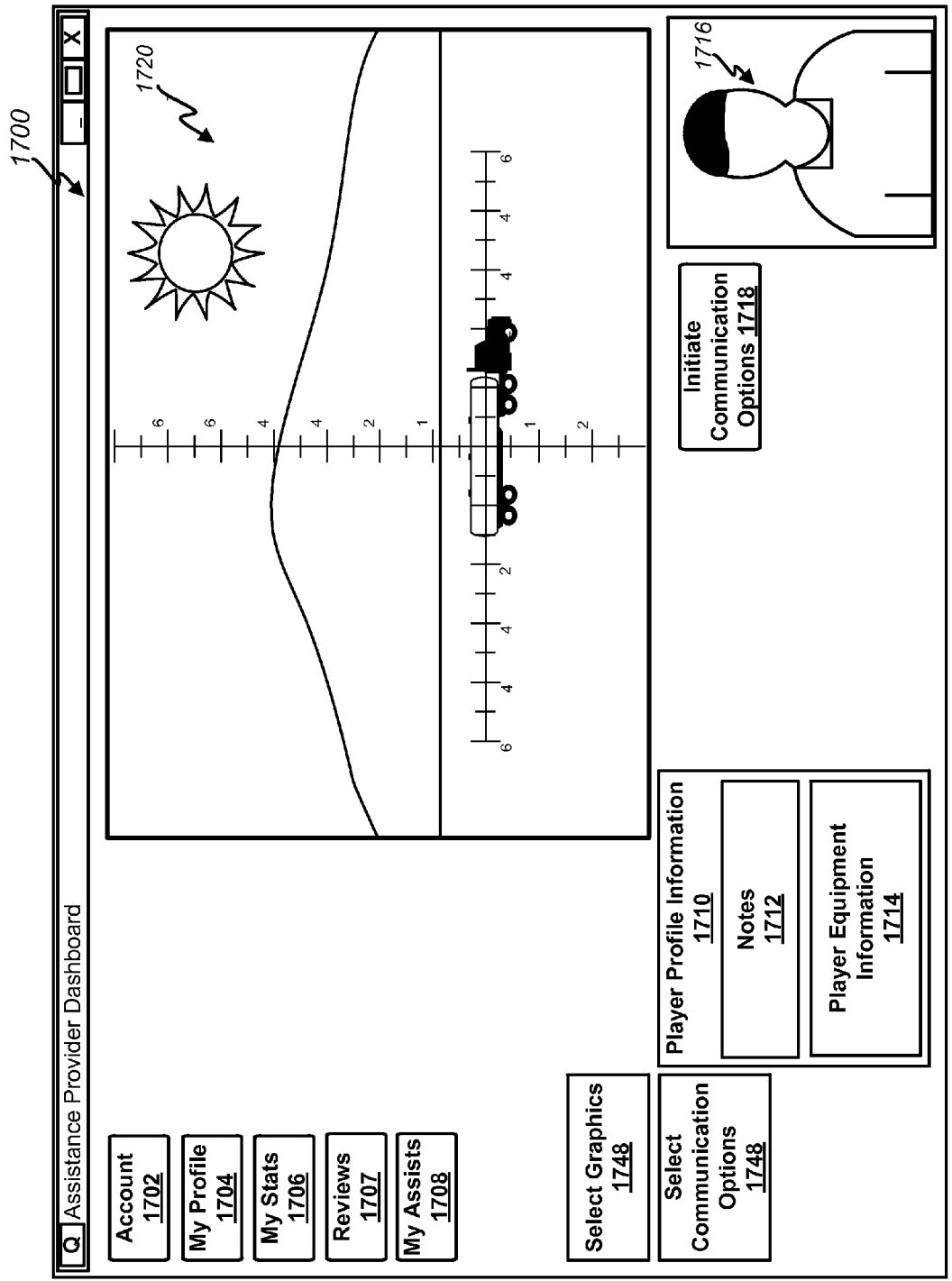
FIG. 17 illustrates one embodiment of a game assistance provider interface for an assistance platform in accordance with one embodiment of the present disclosure.

FIG. 17 illustrates one embodiment of a game assistance provider interface for an assistance platform, in accordance with certain embodiments of the present disclosure. In certain aspects, the game assistance provider interface for the assistance platform may include a dashboard 1700. For example, after a game assistance provider logs into the platform, different data points that can be of use for the game assistance provider may be presented to the game assistance provider to facilitate assistance. The dashboard 1700 may include any software process or module operable to present and receive information to/from a game assistance provider 1406, allow a game assistance provider to monitor player information, select different types of player-related data, identify desired metrics, automatically generate dashboard views, customize dashboard views, and/or the like. The example of the dashboard 1700 is not limiting. In some embodiments, a dashboard 1700 may correspond to a mobile application interface.

In some embodiments, the dashboard 1700 may correspond to a page of the platform and/or an app that a game assistance provider might see upon being connected with a player. The dashboard 1700 may provide a graphical user interface (GUI) that includes any number and type of user-selectable options to facilitate various embodiments. In various embodiments, one or more user-selectable options may include one or more of a screen-labeled function key, an icon, a button, a soft button, a window, a menu, a control widget, a scroll bar, a slider, a listbox, and/or the like. In various embodiments, one or more user-selectable options may be selectable via one or more of touch, push, movement-based selection, and/or any suitable navigation feature.

In various embodiments, to facilitate various aspects, the user-selectable options may include one or more of an account feature 1702, a provider profile management feature 1704, a provider statistics feature 1706, an assist management feature 1708, and/or the like. The game assistance provider page may allow for a high-level presentation of features that allow for drilling down into more specific features. In various embodiments, any one of the features of the dashboard 1700 may include automatically presented information. Information of interest may be automatically presented to the game assistance provider.

In some embodiments, the assistance provider information handling system 1402 may include one or more account management modules. The account management module may be configured to allow a game assistance provider to manage the game assistance provider's account. Management options may be provided for the game assistance provider to perform one or more of the following tasks including, for example, make changes to the account, contact customer service, change/update the game assistance provider's profile, change/update the game assistance provider's preferences, management connection settings, manage alert settings, and/or the like.

A game assistance provider account management module may include logic to retrieve, process, derive, compile, aggregate, handle, store, report, and/or present information about items of interest associated with game assistance provider accounts. For example, items of interest could include important activities associated with a game assistance provider account. Items of interest could include whether a game assistance provider is missing requests from players and other information associated with the missed requests. Items of interest could include any billing information associated with the account. Items of interest could include any messages/calls associated with the account, such as messages from customer service, from players, and/or the like.

In some embodiments, a ratings/reviews feature 1707 may be configured to present access to details regarding ratings and/or reviews associated with a game assistance provider's services. The ratings and/or reviews may correspond to player feedback per surveys and/or any suitable feedback gathering tool.

In some embodiments, player profile information 1710 may be presented. Certain embodiments may automatically identify a caller, correlate the caller to a player profile, and provide player profile information 1710 to the game assistance provider to enrich the assistance session. The player profile information 1710 may provide the game assistance provider with valuable context. The player profile information 1710 may include tracked information that is, for example, retained pursuant to one or more previous assistance sessions. In some embodiments, such player-related information could be provided by the player, the game assistance provider, and/or via automatic detection by the system. Certain embodiments may provide for a player history engine that manages, collects, retrieves, updates, and/or retains information relevant to a particular player. Such tracked information for a particular player could be made available to a game assistance provider before, during, and/or after an assistance session for the player. Accordingly, for each player, a dossier could be compiled and made available to a game assistance provider to facilitate assistance the player.

The game assistance provider may have the ability to annotate 1712 the player profile according to the game assistance provider's judgment and such information may be retained and for subsequent reference and comparison. The game assistance provider may record player information for later reference. Such provision of historical information particular to a player may allow the game assistance provider to provide information appropriate for the player's specific needs.

In some embodiments, information relating to equipment 1714 that a player uses and has used to interface with one or more game assistance providers may be presented. For example, information about the specific devices, device configurations, and/or device capabilities that a given player uses could be detected and/or tracked, and presented to the game assistance provider so that the game assistance provider is aware of the capabilities on the player side. The particular information available to the game assistance provider may depend on the capabilities and configuration of the media used. In some embodiments, the platform may retrieve and/or identify information about the capabilities of the player's computing device and/or communication medium, assess the capabilities against various analytical possibilities of a given game assistance provider, and present capability information to the game assistance provider.

In some embodiments, a video interface 1716 may be provided. The video interface 1716 may provide for one- or two-way video communication between game assistance provider and player. In some embodiments, a video chat session could be established between game assistance provider and player. An option to initiate communication session option(s) 1718 could be presented. As discussed herein, any suitable type of communication may be employed, including video chat and the like.

In some embodiments, a game interface 1720 may be provided. The game interface 1720 may allow the provider to view the player's screen and/or to have a window into a game to allow the provider's interaction with the game, either on the player's behalf (in a remote control of the player's interaction with the game) or on the provider's behalf (for the provider's reference, for demonstration, for joining a game to assist the player, etc.). The game interface 1720 could be adjusted to achieve any suitable extent of viewing space. Multiple game interfaces could be used simultaneously in some embodiments.

It is to be understood that the depicted dashboard 1700 is for example purposes only. Accordingly, the dashboard 1700 may provide a GUI that may include or present data for a game assistance provider interface of an assistance platform in any suitable format with any suitable layout of any suitable sets/subsets of features, along with any desired graphical depiction of information, to facilitate features of various embodiments of the present disclosure.

The assistance provider information handling system 1402 may include one or more logging modules. The logging module(s) may be configured to perform logging processes to receive and log data of interest for assistance sessions. A player analytics module(s) may include logic to retrieve, process, derive, compile, aggregate, handle, store, report, and/or present information relating to data associated with players. The player analytics module may be configured to present any desirable information in any desirable manner. With respect to a particular game assistance provider, the logging module and analytics module may facilitate various features of a game assistance provider interface for an assistance platform, in accordance with certain embodiments herein.

Figure 18:
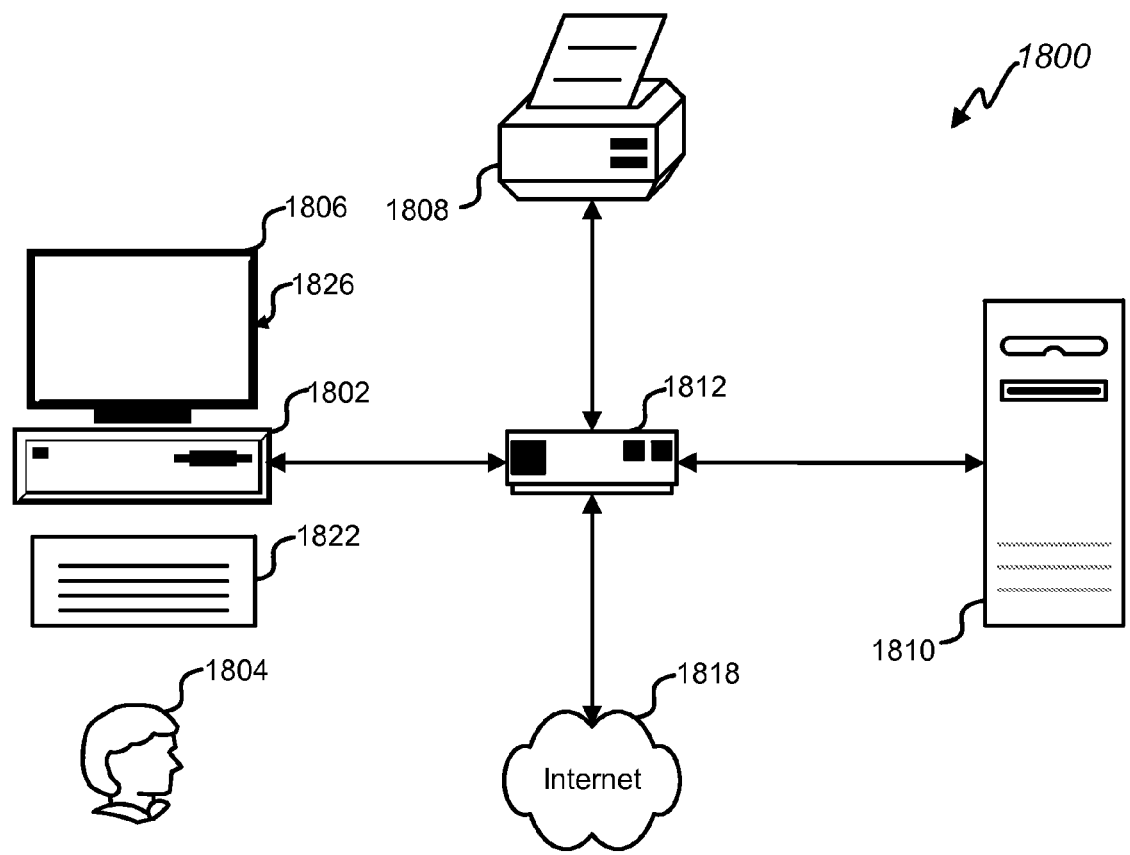
FIG. 18 depicts a block diagram of an embodiment of a computer system, in accordance with certain embodiments of the present disclosure.

Referring next to FIG. 18, an exemplary environment with which embodiments may be implemented is shown with a computer system 1800 that can be used by a designer 1804 to design, for example, electronic designs. The computer system 1800 can include a computer 1802, keyboard 1822, a network router 1812, a printer 1808, and a monitor 1806. The monitor 1806, processor 1802 and keyboard 1822 are part of a computer system 1826, which can be a laptop computer, desktop computer, handheld computer, mainframe computer, etc. The monitor 1406 can be a CRT, flat screen, etc.

A designer 1804 can input commands into the computer 1802 using various input devices, such as a mouse, keyboard 1822, track ball, touch screen, etc. If the computer system 1800 comprises a mainframe, a designer 1804 can access the computer 1802 using, for example, a terminal or terminal interface. Additionally, the computer system 1826 may be connected to a printer 1808 and a server 1810 using a network router 1812, which may connect to the Internet 1818 or a WAN.

The server 1810 may, for example, be used to store additional software programs and data. In some embodiments, software implementing the systems and methods described herein can be stored on a storage medium in the server 1810. Thus, the software can be run from the storage medium in the server 1810. In another embodiment, software implementing the systems and methods described herein can be stored on a storage medium in the computer 1802. Thus, the software can be run from the storage medium in the computer system 1826. Therefore, in this embodiment, the software can be used whether or not computer 1802 is connected to network router 1812. Printer 1808 may be connected directly to computer 1802, in which case, the computer system 1826 can print whether or not it is connected to network router 1812.

Figure 19:
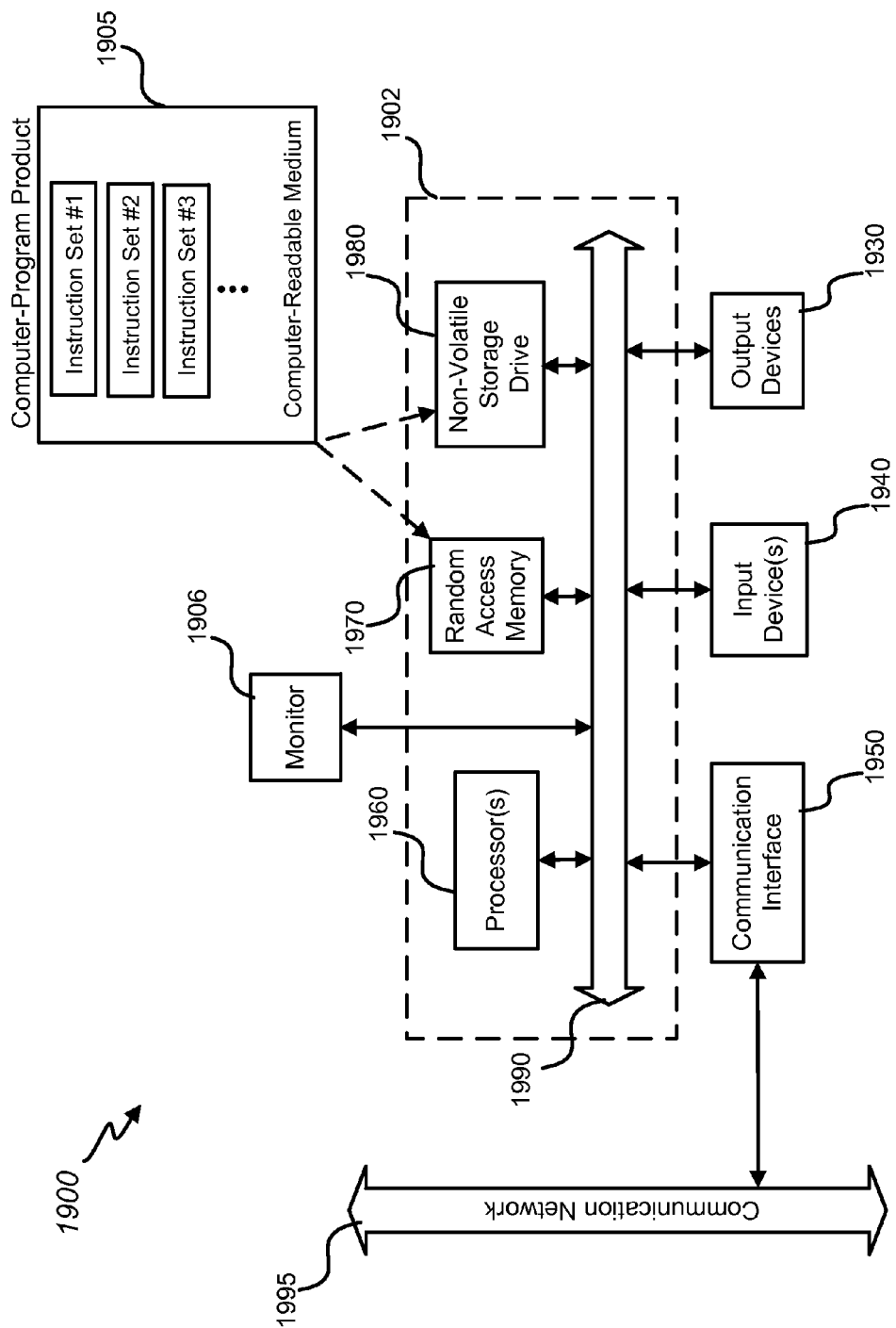
FIG. 19 depicts a block diagram of an embodiment of a special-purpose computer system, in accordance with certain embodiments of the present disclosure.

With reference to FIG. 19, an embodiment of a special-purpose computer system 1900 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1826, it is transformed into the special-purpose computer system 1900.

Special-purpose computer system 1900 comprises a computer 1902, a monitor 1906 coupled to computer 1902, one or more additional user output devices 1930 (optional) coupled to computer 1902, one or more user input devices 1940 (e.g., keyboard, mouse, track ball, touch screen) coupled to computer 1902, an optional communications interface 1950 coupled to computer 1902, a computer-program product 1905 stored in a tangible computer-readable memory in computer 1902. Computer-program product 1905 directs system 1900 to perform the above-described methods. Computer 1802 may include one or more processors 1960 that communicate with a number of peripheral devices via a bus subsystem 1990. These peripheral devices may include user output device(s) 1930, user input device(s) 1940, communications interface 1950, and a storage subsystem, such as random access memory (RAM) 1970 and non-volatile storage drive 1980 (e.g., disk drive, optical drive, solid state drive), which are forms of tangible computer-readable memory.

Computer-program product 1905 may be stored in non-volatile storage drive 1980 or another computer-readable medium accessible to computer 1902 and loaded into memory 1970. Each processor 1960 may comprise a microprocessor, such as a microprocessor from Intel® or Advanced Micro Devices, Inc.®, or the like. To support computer-program product 1905, the computer 1902 runs an operating system that handles the communications of product 1905 with the above-noted components, as well as the communications between the above-noted components in support of the computer-program product 1905. Exemplary operating systems include Windows® or the like from Microsoft® Corporation, Solaris® from Oracle®, LINUX, UNIX, and the like.

User input devices 1940 include all possible types of devices and mechanisms to input information to computer system 1902. These may include a keyboard, a keypad, a mouse, a scanner, a digital drawing pad, a touch screen incorporated into the display, audio input devices such as voice recognition systems, microphones, and other types of input devices. In various embodiments, user input devices 1940 are typically embodied as a computer mouse, a trackball, a track pad, a joystick, wireless remote, a drawing tablet, a voice command system. User input devices 1940 typically allow a user to select objects, icons, text and the like that appear on the monitor 1906 via a command such as a click of a button or the like. User output devices 1930 include all possible types of devices and mechanisms to output information from computer 1902. These may include a display (e.g., monitor 1906), printers, non-visual displays such as audio output devices, etc.

Communications interface 1950 provides an interface to other communication networks 1995 and devices and may serve as an interface to receive data from and transmit data to other systems, WANs and/or the Internet. Embodiments of communications interface 1950 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1950 may be coupled to a computer network, to a FireWire® bus, or the like. In other embodiments, communications interface 1950 may be physically integrated on the motherboard of computer 1402, and/or may be a software program, or the like.

RAM 1970 and non-volatile storage drive 1980 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1970 and non-volatile storage drive 1980 may be configured to store the basic programming and data constructs that provide the functionality of various embodiments of the present invention, as described above.

Software instruction sets that provide the functionality of the present invention may be stored in RAM 1970 and non-volatile storage drive 1980. These instruction sets or code may be executed by the processor(s) 1960. RAM 1970 and non-volatile storage drive 1980 may also provide a repository to store data and data structures used in accordance with the present invention. RAM 1970 and non-volatile storage drive 1980 may include a number of memories including a main random access memory (RAM) to store of instructions and data during program execution and a read-only memory (ROM) in which fixed instructions are stored. RAM 1970 and non-volatile storage drive 1980 may include a file storage subsystem providing persistent (non-volatile) storage of program and/or data files. RAM 1970 and non-volatile storage drive 1980 may also include removable storage systems, such as removable flash memory.

Bus subsystem 1990 provides a mechanism to allow the various components and subsystems of computer 1902 communicate with each other as intended. Although bus subsystem 1990 is shown schematically as a single bus, alternative embodiments of the bus subsystem may utilize multiple busses or communication paths within the computer 1902.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:
1. An advising management system, comprising:
one or more network interfaces configured to provide access to a network;
one or more storage media coupled to one or more processors to retain instructions;
the one or more processors coupled to the one or more network interfaces to enable communication with at least one advisor through the network, the one or more processors to execute the instructions to:
detect a location of an end-user communication device of a first advisee;
identify a geographic area proximal to the detected location in which to search for advisors;
process an indication of a selection of a user-selectable option, the indication of the selection coming via the network from an end-user communication device corresponding to the first advisee, the user-selectable option relating to communicating with a selected advisor among the advisors;
process identification information enabling identification of the first advisee;
process first data captured via the end-user communication device and received via the network, the first data corresponding to one or more sensor inputs from the end-user communication device;

access a set of qualification rules that includes a set of criteria for qualifying advisors based at least in part on (a) captured data relating to advisors, (b) jurisdiction requirements pertaining to the detected location regarding required qualifications for the advisors in the area and (c) a type of advice relating to one or more needs of the first advisee;

verify the selected advisor meets the qualification rules for the detected geolocation and that the selected advisor is authorized to provide advice on at least one advising need of the first advisee in a determined geographic area of the detected geolocation;

consequent to the indication of the selection of the user-selectable option, route a telephone call between an end-user device of the advisor and the end-user communication device of the first advisee;

perform a voice analysis by performing a cadence analysis on detected speech of the first advisee detected during the telephone call to (i) detect one or more voice cadence characteristics of the first advisee and (ii) determine voice analysis results comprising one or more states of the first advisee, during the telephone call, based on analyzing the cadence characteristics;

perform an environmental analysis during said telephone call to detect changes in an environment of said advisee during the telephone call by comparing a current environment of said advisee to environments detected during previous telephone calls with said advisee;

derive a first set of information for the first advisee based at least in part on the first data and the set of qualification rules by performing the voice analysis corresponding to the first advisee, the first set of information comprising a first characterization of the first advisee, the first characterization is based at least in part on the voice analysis; and automatically present a graphical advisor dashboard, during the routed telephone call, to a user interface of the end-user device of the advisor, the dashboard comprising:
  (i) the voice analysis results, comprising the states of the first advisee, being detected during the telephone call between the advisor and the first advisee; and
  (ii) the environmental analysis results, which comprises said current environment of said advisee and a graphical comparison of said current environment to said environments detected during the previous telephone calls.

2. The advising management system of claim 1, the one or more processors to further execute instructions to:
  identify a recommendation for the advisor, the recommendation being a function of at least the first characterization of the first advisee and a set of advisor information relating to the advisor, the set of advisor information retained for the advisor; and
  cause indication, to the end-user device of the advisor, of the recommendation.

3. The advising management system of claim 2, wherein cause the indication, to the end-user device of the advisor, of the recommendation is during the communication session of the advisor and the first advisee, wherein the recommendation is to be presented during the communication session.

4. The advising management system of claim 1, the one or more processors to further execute instructions to:
  access a second set of information for the first advisee;
  compare the first set of information for the advisee and the second set of information for the first advisee; and
  determine one or more metrics of the first advisee, based at least in part on one or more of the first set of information for the advisee, the second set of information for the first advisee, and/or the comparing of the first set of information and the second set of information.

5. The advising management system of claim 4, the one or more processors to further execute instructions to:
  cause indication, to the end-user device of the advisor, of the one or more metrics of the first advisee.

6. The advising management system of claim 1, wherein derive the first set of information for the first advisee comprises performing an environmental analysis corresponding to the first advisee, and the first characterization is based at least in part on the environmental analysis.

7. A method to facilitate advising management, the method comprising:
  detecting, by the computer system, a location of an end-user communication device of a first advisee;
  identifying, by the computer system, a geographic area proximal to the detected location in which to search for advisors;
  processing, by a computer system, an indication of a selection of a user-selectable option, the indication of the selection coming via the network from an end-user communication device corresponding to a first advisee, the user-selectable option relating to communicating with a selected advisor among the advisors;
  processing, by the computer system, identification information enabling identification of the first advisee;
  processing, by the computer system, first data captured via the end-user communication device and received via the network, the first data corresponding to one or more sensor inputs from the end-user communication device;
  accessing, by the computer system, a set of qualification rules that includes a set of criteria for qualifying advisors based at least in part on (a) captured data relating to advisors, (b) jurisdiction requirements pertaining to the detected location regarding required qualifications for the advisors in the area and (c) a type of advice relating to one or more needs of the first advisee;
  verifying, by the computer system, the selected advisor meets the qualification rules for the detected geolocation and that the selected advisor is authorized to provide advice on at least one advising need of the first advisee in a determined geographic area of the detected geolocation;
  consequent to the indication of the selection of the user-selectable option, routing, by the computer system, a telephone call between an end-user device of the advisor and the end-user communication device of the first advisee;
  performing a voice analysis by performing a cadence analysis on detected speech of the first advisee detected during the telephone call to (i) detect one or more voice cadence characteristics of the first advisee and (ii) determine voice analysis results comprising one or more states of the first advisee, during the telephone call, based on analyzing the cadence characteristics;
  performing an environmental analysis during said telephone call to detect changes in an environment of said advisee during the telephone call by comparing a current environment of said advisee to environments detected during previous telephone calls with said advisee;

deriving, by the computer system, a first set of information for the first advisee based at least in part on the first data and the set of qualification rules by performing the voice analysis corresponding to the first advisee, the first set of information comprising a first characterization of the first advisee, the first characterization is based at least in part on the voice analysis; and automatically presenting, by the computer system, a graphical advisor dashboard, during the routed telephone call, to a user interface of the end-user device of the advisor, the dashboard comprising:

(i) the voice analysis results, comprising the states of the first advisee, being detected during the telephone call between the advisor and the first advisee; and (ii) the environmental analysis results, which comprises said current environment of said advisee and a graphical comparison of said current environment to said environments detected during the previous telephone calls.

8. The method to facilitate advising management of claim 7, further comprising:

identifying a recommendation for the advisor, the recommendation being a function of at least the first characterization of the first advisee and a set of advisor information relating to the advisor, the set of advisor information retained for the advisor; and causing indication, to the end-user device of the advisor, of the recommendation.

9. The method to facilitate advising management of claim 8, wherein the causing indication, to the computing end-user device of the advisor, of the recommendation is during the communication session of the advisor and the first advisee, wherein the recommendation is to be presented during the communication session.

10. The method to facilitate advising management of claim 7, further comprising:

accessing a second set of information for the first advisee;

comparing the first set of information for the advisee and the second set of information for the first advisee; and determining one or more metrics of the first advisee, based at least in part on one or more of the first set of information for the advisee, the second set of information for the first advisee, and/or the comparing of the first set of information and the second set of information.

11. The method to facilitate advising management of claim 10, further comprising:

causing indication, to the end-user device of the advisor, of the one or more metrics of the first advisee.

12. The method to facilitate advising management of claim 10, wherein the deriving the first set of information for the first advisee comprises performing an environmental analysis corresponding to the first advisee, and the first characterization is based at least in part on the environmental analysis.

13. One or more non-transitory, machine-readable media having machine-readable instructions thereon for facilitating advising management, which instructions, when executed by one or more computers or other processing devices, cause the one or more computers or other processing devices to:

detect a location of an end-user communication device of a first advisee;

identify a geographic area proximal to the detected location in which to search for advisors;

process an indication of a selection of a user-selectable option, the indication of the selection coming via the network from an end-user communication device corresponding to a first advisee, the user-selectable option relating to cummunicating with a selected advisor among the advisors;

process identification information enabling identification of the first advisee;

process first data captured via the end-user communication device and received via the network, the first data corresponding to one or more sensor inputs from the end-user communication device;

access a set of qualification rules that includes a set of criteria for qualifying advisors based at least in part on (a) captured data relating to advisors, (b) jurisdiction requirements pertaining to the detected location regarding required qualifications for the advisors in the area and (c) a type of advice relating to one or more needs of the first advisee;

verify the selected advisor meets the qualification rules for the detected geolocation and that the selected advisor is authorized to provide advice on at least one advising need of the first advisee in a determined geographic area of the detected geolocation;

consequent to the indication of the selection of the user-selectable option, route a telephone call between an end-user device of the advisor and the end-user communication device of the first advisee;

perform a voice analysis by performing a cadence analysis on detected speech of the first advisee detected during the telephone call to (i) detect one or more voice cadence characteristics of the first advisee and (ii) determine voice analysis results comprising one or more states of the first advisee, during the telephone call, based on analyzing the cadence characteristics;

perform an environmental analysis during said telephone call to detect changes in an environment of said advisee during the telephone call by comparing a current environment of said advisee to environments detected during previous telephone calls with said advisee;

derive a first set of information for the first advisee based at least in part on the first data and the set of qualification rules by performing the voice analysis corresponding to the first advisee, the first set of information comprising a first characterization of the first advisee, the first characterization is based at least in part on the voice analysis; and automatically present a graphical advisor dashboard, during the routed telephone call, to a user interface of the end-user device of the advisor, the dashboard comprising:

(i) the voice analysis results, comprising the states of the first advisee, being detected during the telephone call between the advisor and the first advisee; and (ii) the environmental analysis results, which comprises said current environment of said advisee and a graphical comparison of said current environment to said environments detected during the previous telephone calls.

14. The one or more non-transitory, machine-readable media of claim 13, wherein the instructions, when executed by the one or more computers or other processing devices, cause the one or more computers or other processing devices to further:

identify a recommendation for the advisor, the recommendation being a function of at least the first characterization of the first advisee and a set of advisor information relating to the advisor, the set of advisor information retained for the advisor; and cause indication, to the end-user device of the advisor, of the recommendation.

15. The one or more non-transitory, machine-readable media of claim 14, wherein cause the indication, to the computing end-user device of the advisor, of the recommendation is during the communication session of the advisor and the first advisee, wherein the recommendation is to be presented during the communication session.

16. The one or more non-transitory, machine-readable media of claim 13, wherein the instructions, when executed by the one or more computers or other processing devices, cause the one or more computers or other processing devices to further:
    access a second set of information for the first advisee;
    compare the first set of information for the advisee and the second set of information for the first advisee; and
    determine one or more metrics of the first advisee, based at least in part on one or more of the first set of information for the advisee, the second set of information for the first advisee, and/or the comparing of the first set of information and the second set of information.

17. The one or more non-transitory, machine-readable media of claim 16, wherein the instructions, when executed by the one or more computers or other processing devices, cause the one or more computers or other processing devices to further:
    cause indication, to the end-user device of the advisor, of the one or more metrics of the first advisee.

* * * * *

UNITED STATES PATENT AND TRADEMARK OFFICE
CERTIFICATE OF CORRECTION

PATENT NO.         : 9,858,584 B2
APPLICATION NO.    : 14/271336
DATED              : January 2, 2018
INVENTOR(S)        : Jain It is certified that error appears in the above-identified patent and that said Letters Patent is hereby corrected as shown below:

Column 81
Line 9, "geolocation" should read --location--
Line 12, "geolocation" should read --location--
Line 25, "said advisee" should read --said first advisee--
Line 27, "said advisee" should read --said first advisee--
Line 28, "said advisee" should read --said first advisee--
Line 44, "said advisee" should read --said first advisee--
Line 59, "during the communication" should read --during a communication--
Line 65, "said advisee" should read --said first advisee--

Column 82
Line 3, "said advisee" should read --said first advisee--
Line 44, "geolocation" should read --location--
Line 48, "geolocation" should read --location--
Line 62, "of said" should read --of said first--
Line 64, "said advisee" should read --said first advisee--
Line 65, "of said" should read --of said first--

Column 83
Line 16, "said advisee" should read --said first advisee--
Line 30, delete "computing"
Line 31, "during the" should read --during a--
Line 38, "for the advisee" should read --for the first advisee--
Line 42, "for the advisee" should read --for the first advisee--

Signed and Sealed this
Third Day of July, 2018

Andrei Iancu
*Director of the United States Patent and Trademark Office*

CERTIFICATE OF CORRECTION (continued)
U.S. Pat. No. 9,858,584 B2

Column 84
Line 19, "geolocation" should read --location--
Line 22, "geolocation" should read --location--
Line 35, "said advisee" should read --said first advisee--
Line 37, "said advisee" should read --said first advisee--
Line 54, "said advisee" should read --said first advisee--

Column 85
Line 5, delete "computing"
Line 8, "during the communication" should read --during a communication--
Line 15, "the advisee" should read --the first advisee--
Line 19, "the advisee" should read --the first advisee--